United States Patent
Kim et al.

(10) Patent No.: US 10,838,228 B2
(45) Date of Patent: Nov. 17, 2020

(54) THREE-DIMENSIONAL IMAGING DEVICE AND ELECTRONIC DEVICE INCLUDING SAME

(71) Applicant: Samsung Electronics Co., Ltd., Gyeonggi-do (KR)

(72) Inventors: Hanyuool Kim, Seoul (KR); Matheus Farias Miranda, Gyeonggi-do (KR); Jong-Kon Bae, Seoul (KR); Yo-Han Lee, Seoul (KR); Dong-Kyoon Han, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 57 days.

(21) Appl. No.: 16/301,563

(22) PCT Filed: Mar. 30, 2017

(86) PCT No.: PCT/KR2017/003506
§ 371 (c)(1),
(2) Date: Nov. 14, 2018

(87) PCT Pub. No.: WO2017/200202
PCT Pub. Date: Nov. 23, 2017

(65) Prior Publication Data
US 2019/0285904 A1    Sep. 19, 2019

(30) Foreign Application Priority Data

May 16, 2016  (KR) .................. 10-2016-0059842

(51) Int. Cl.
*G02B 27/22*    (2018.01)
*G02B 30/56*    (2020.01)
(Continued)

(52) U.S. Cl.
CPC ........... *G02B 30/56* (2020.01); *G02B 7/1824* (2013.01); *G06F 3/011* (2013.01); *G06F 3/041* (2013.01);
(Continued)

(58) Field of Classification Search
CPC ...... G02B 7/1824; G02B 30/56; H04N 13/30; G09F 19/12
(Continued)

(56) References Cited

U.S. PATENT DOCUMENTS 4,509,837 A    4/1985  Kassies
5,818,642 A *  10/1998 Collette .................. G09F 19/12
                                                          359/630
(Continued)

FOREIGN PATENT DOCUMENTS

JP    2010-2894 A    1/2010
JP    2014-32600 A   2/2014
(Continued)

OTHER PUBLICATIONS

European Search Report dated Mar. 28, 2019.

*Primary Examiner* — Abdul-Samad A Adediran
(74) *Attorney, Agent, or Firm* — Cha & Reiter, LLC

(57) ABSTRACT

According to various embodiments of the present invention, a three-dimensional imaging device and/or an electronic device may comprise: a stand for supporting an electronic device including a display panel; a half mirror disposed on one surface of the stand in such a way as to slantingly face the display panel of the electronic device supported by the stand; and a retro-reflection member disposed on the stand in such a way as to incline toward the half mirror, wherein the half mirror reflects an image (hereinafter, "a first output image") output from the display panel to introduce the reflected image into the retro-reflection member, and allows
(Continued)

the image reflected by the retro-reflection member to transmit therethrough, so as to form an image (hereinafter, "a first aerial image") corresponding to the first output image, on a space at another side of the half mirror. Such an electronic device may exist in various forms according to embodiments.

18 Claims, 39 Drawing Sheets

(51) Int. Cl.
| | |
|---|---|
| *G06F 3/01* | (2006.01) |
| *G06F 3/041* | (2006.01) |
| *H04M 1/725* | (2006.01) |
| *H04N 13/302* | (2018.01) |
| *H04M 1/06* | (2006.01) |
| *H04N 13/322* | (2018.01) |
| *H04N 13/346* | (2018.01) |
| *G09F 19/12* | (2006.01) |
| *G02B 7/182* | (2006.01) |
| *H04N 13/30* | (2018.01) |
| *G02B 27/14* | (2006.01) |
| *A45C 11/00* | (2006.01) |

(52) U.S. Cl.
CPC .............. *G09F 19/12* (2013.01); *H04M 1/06* (2013.01); *H04M 1/72527* (2013.01); *H04N 13/30* (2018.05); *H04N 13/302* (2018.05); *H04N 13/322* (2018.05); *H04N 13/346* (2018.05); *A45C 2011/002* (2013.01); *G02B 27/144* (2013.01); *G06F 2203/04108* (2013.01); *H04N 2201/0058* (2013.01); *H04N 2213/001* (2013.01)

(58) Field of Classification Search
USPC ..................................... 353/10; 359/466, 630
See application file for complete search history.

(56) References Cited

U.S. PATENT DOCUMENTS

| | | | |
|---|---|---|---|
| 6,542,297 B1* | 4/2003 | Lee | ..................... G02B 7/1824 |
| | | | 359/466 |
| 2003/0043029 A1 | 3/2003 | Ichikawa et al. | |
| 2003/0053033 A1 | 3/2003 | Vrachan et al. | |
| 2005/0157398 A1 | 7/2005 | Nagaoka et al. | |
| 2009/0290126 A1 | 11/2009 | Yabui et al. | |
| 2010/0110384 A1 | 5/2010 | Maekawa | |
| 2010/0195055 A1 | 8/2010 | Maekawa | |
| 2010/0214394 A1 | 8/2010 | Maekawa | |
| 2012/0081788 A1 | 4/2012 | Maekawa et al. | |
| 2013/0049682 A1 | 2/2013 | Niec et al. | |
| 2014/0157206 A1 | 6/2014 | Ovsiannikov et al. | |
| 2015/0124222 A1* | 5/2015 | Juni | ............. H04N 13/30 |
| | | | 353/10 |
| 2015/0248014 A1 | 9/2015 | Powell et al. | |
| 2015/0301347 A1 | 10/2015 | Juni | |
| 2016/0261301 A1 | 9/2016 | Juni | |
| 2017/0261759 A1* | 9/2017 | Yamamoto | ............. G02B 30/56 |

FOREIGN PATENT DOCUMENTS

| | | |
|---|---|---|
| JP | 2014-160183 A | 9/2014 |
| JP | 2015-90370 A | 5/2015 |
| JP | 2015-230329 A | 12/2015 |
| KR | 10-1102610 B1 | 1/2012 |
| KR | 10-1136231 B1 | 4/2012 |
| KR | 10-2013-0120835 A | 11/2013 |
| KR | 10-2016-0037703 A | 4/2016 |

* cited by examiner

| USER POSITION | OUTPUT IMAGE | AERIAL IMAGE |
|---|---|---|
| UP3 | A B C | A B C |
| UP1 | A B C | A B C |
| UP2 | A B C | A B C |

FIG.5

THREE-DIMENSIONAL IMAGING DEVICE AND ELECTRONIC DEVICE INCLUDING SAME

CLAIM OF PRIORITY

This application is a U.S. National Stage application under 35 U.S.C. § 371 of an International application filed on Mar. 30, 2017 and assigned application number PCT/KR2017/003506, which claimed the benefit of a Korean patent application filed on May 16, 2016 in the Korean Intellectual Property Office and assigned Serial number 10-2016-0059842, the entire disclosure of which is hereby incorporated by reference.

TECHNICAL FIELD

The present disclosure relates to an electronic device, for example, a stereoscopic image device, for converting a plane image (e.g., a two-dimensional image) into a stereoscopic image and/or an aerial image, and/or an electronic device including a stereoscopic image device.

BACKGROUND

Typically, an electronic device is a device that performs a specific function according to a program incorporated therein, such as an electronic scheduler, a portable multimedia player, a mobile communication terminal, a tablet PC, an image/sound device, a desktop/laptop PC, or a vehicular navigation system, including home appliances. For example, the above-mentioned electronic devices may output information stored therein as sound or images. As the degree of integration of such electronic devices has increased, and super-high-speed and large-capacity wireless communication has become popular, various functions have recently been provided in a single mobile communication terminal. For example, various functions, such as entertainment functions (e.g., a game function), multimedia functions (e.g., a music/video playback function), communication and security functions for mobile banking, schedule management functions, and e-wallet functions, are integrated in a single electronic device, in addition to communication functions.

When outputting an image, a video, or the like, a stereoscopic image device forms the image in a space other than a plane, thereby providing a stereoscopic effect to the user. A user may experience such a stereoscopic image through a movie theater or a television, but the amount of stereoscopic image content is limited. The user may experience other types of stereoscopic images through, for example, an advertisement board installed in a multi-use facility.

SUMMARY

However, as mentioned above, the amount of content available for stereoscopic image devices is limited, and stereoscopic images only provide visual information or simply stimulate the curiosity of the user, which may restrict the user from actively using stereoscopic images. In addition, various types of stereoscopic image devices have been proposed. However, stereoscopic image devices are expensive to purchase and use by ordinary users, and available content is limited, thus making the usability of the stereoscopic image devices low.

Various embodiments of the present disclosure are capable of providing a stereoscopic image device, which can be used inexpensively and conveniently in daily life, and/or an electronic device including a stereoscopic image device.

The stereoscopic image device, according to various embodiments of the present disclosure, is capable of providing a user experience different from that provided by electronic devices already owned by a user by forming an image, output from a display panel and/or an electronic device, in the air.

According to various embodiments of the present disclosure, a stereoscopic image device may include:
  a cradle configured to mount thereon the electronic device including a display panel;
  a half mirror disposed on one surface of the cradle to face the display panel of the electronic device mounted on the cradle in an inclined state with respect to the display panel; and
  a retroreflective member disposed on the cradle such that it is inclined with respect to the half mirror.

The half mirror may reflect an image output from the display panel (hereinafter, referred to as a "first output image") to be incident on the retroreflective member, and may transmit an image reflected by the retroreflective member,
  so as to form an image (hereinafter, referred to as a "first aerial image") corresponding to the first output image in a space at the other side of the half mirror.

An electronic device according to various embodiments of the present disclosure may include a part or all of the stereoscopic image device described above.

For example, the electronic device may include: a housing including a front surface, a rear surface opposite the front surface, and a side wall formed to at least partially enclose a space between the front surface and the rear surface;
  a display panel including a first display area disposed in a first area of the front surface and a second display area extending obliquely from the first display area to be positioned inside the housing;
  a half mirror disposed in a second area of the front surface and adjacent to the second display area; and
  a retroreflective member disposed inside the housing such that it is inclined with respect to the half mirror.

The half mirror may reflect an image output from the second display area (hereinafter, referred to as an "output image") to be incident on the retroreflective member, and may transmit an image reflected by the retroreflective member,
  so as to form an aerial image corresponding to the image in a space outside the housing.

According to various embodiments of the present disclosure, a stereoscopic image device may include:
  a display panel mounted on or in a dashboard of a vehicle; and
  a windshield, at least a partial region of which is disposed on the dashboard.

The windshield may reflect an image output from the display panel so as to form an aerial image on the dashboard.

Advantageous Effects

A stereoscopic image device and/or an electronic device including the stereoscopic image device according to various embodiments of the present disclosure can be realized using a half mirror and a retroreflective member so as to convert a two-dimensional image output through a display panel (e.g., a flat or curved display panel) into a three-dimensional image that is formed in the air. For example, the stereoscopic image device and/or the electronic device is capable of being manufactured at low cost with only the half mirror and the retroreflective member, and is capable of providing a new experience to a user. According to various embodiments, when a touch panel is mounted on a stereoscopic image device and/or an electronic device and an image is formed in an area or space where the touch panel is capable of detecting a proximity touch input (e.g., hovering), the stereoscopic image device and/or the electronic device including the same may be provided with an input device through the image formed in the air. According to various embodiments, the touch panel may be replaced with other types of sensors (e.g., an ultrasonic sensor and an infrared sensor), and the input device may be configured through a combination of these sensors and the image formed in the air. The stereoscopic image device according to various embodiments of the present disclosure is capable of being easily used for, for example, providing an aerial image in combination with an electronic device outputting an image (e.g., a mobile communication terminal already possessed by a user), and is capable of providing various user experiences.

BRIEF DESCRIPTION OF THE DRAWINGS

FIG. 5 is a view for explaining an image output example of a stereoscopic image device and/or an electronic device according to various embodiments of the present disclosure;

DETAILED DESCRIPTION

Figure 1:
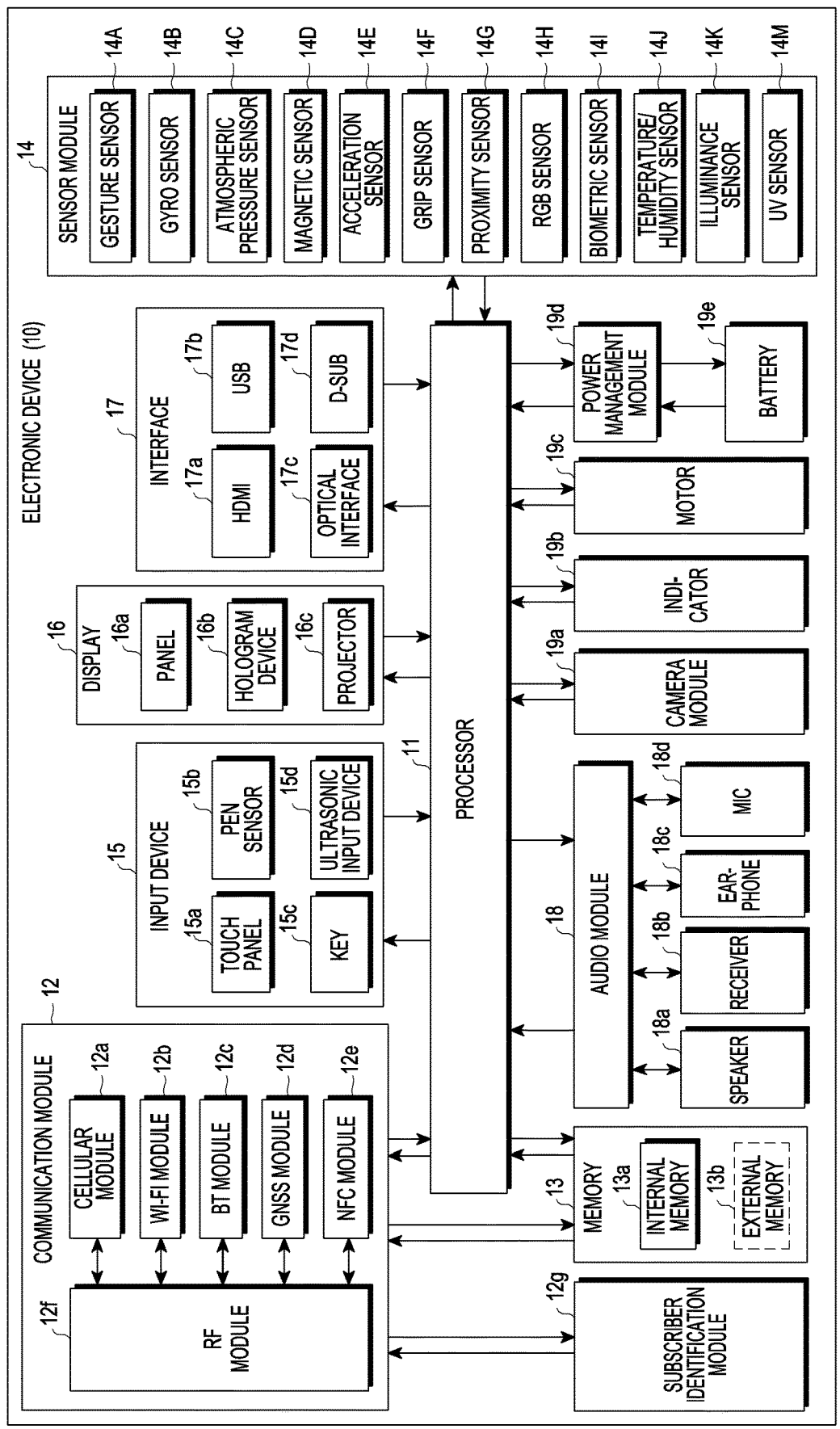
FIG. 1 is a block diagram illustrating an electronic device (and/or a stereoscopic image device) according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expressions such as "first", "second", or the like used in various embodiments of the present disclosure may modify various elements regardless of order or importance, and do not limit corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted-Device (HMD) such as electronic glasses, electronic clothes, an electronic bracelet, an electronic necklace, an electronic appcessory, electronic tattoos, or a smart watch).

In some embodiments, an electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV∩, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

FIG. 1 is a block diagram illustrating an electronic device 10 according to various embodiments of the present disclosure.

Referring to FIG. 1, the electronic device 10 may include part or all of an electronic device and/or a stereoscopic image device according to embodiment(s) to be described later. The electronic device 10 may include at least one processor (e.g., an Application Processor (AP)) 11, a communication module 12, a subscriber identification module 12g, a memory 13, a sensor module 14, an input device 15, a display 16, an interface 17, an audio module 18, a camera module 19a, a power management module 19d, a battery 19e, an indicator 19b, and a motor 19c.

The processor 11 may drive, for example, an operating system or an application so as to control a plurality of hardware or software components connected thereto, and may also perform various data-processing and arithmetic operations. The processor 11 may be implemented by, for example, a System-on-Chip (SoC). According to one embodiment, the processor 11 may further include a Graphic Processing Unit (GPU) and/or an image signal processor. The processor 11 may include at least some components (e.g., the cellular module 12a) among the components illustrated in FIG. 1. The processor 11 may load a command or data received from at least one of the other components (e.g., nonvolatile memory) into volatile memory to process the command and data, and may store various data in nonvolatile memory.

The communication module 12 may include, for example, a cellular module 12a, a Wi-Fi module 12b, a Bluetooth module 12c, a GNSS module 12d (e.g., a GPS module, a GLONASS module, a BeiDou module, or a Galileo module), an NFC module 12e, and a Radio-Frequency (RF) module 12f.

The cellular module 12a may provide, for example, a voice call, a video call, a message service, or an internet service through, for example, a communication network. According to one embodiment, the cellular module 12a may perform discrimination and authentication of the electronic device 10 within the communication network using the subscriber identification module (e.g., a SIM card) 12g. According to one embodiment, the cellular module 12a may perform at least some of the functions that may be provided by the processor 11. According to one embodiment, the cellular module 12a may include a Communication Processor (CP).

Each of the Wi-Fi module 12b, the Bluetooth module 12c, the GNSS module 12d, and the NFC module 12e may include, for example, a processor to process data transmitted/received through a corresponding module. According to a certain embodiment, at least some (e.g., two or more) of the cellular module 12a, the Wi-Fi module 12b, the Bluetooth module 12c, the GNSS module 12d, and the NFC module 12e may be incorporated in a single Integrated Chip (IC) or an IC package.

The RF module 12f may transmit/receive, for example, a communication signal (e.g., an RF signal). The RF module 12f may include, for example, a transceiver, a Power Amp Module (PAM), a frequency filter, a Low-Noise Amplifier (LNA), or an antenna. According to another embodiment, at least one of the cellular module 12a, the Wi-Fi module 12b, the Bluetooth module 12c, the GNSS module 12d, and the NFC module 12e may transmit/receive an RF signal through one or more separate RF modules.

The subscriber identification module 12g may include, for example, a card that includes a subscriber identification module and/or an embedded SIM, and may also include intrinsic identification information (e.g., an Integrated Circuit Card IDentifier (ICCID)) or subscriber information (e.g., an International Mobile Subscriber Identity (IMSI)).

The memory 13 (e.g., the memory 11c) may include, for example, internal memory 13a or external memory 13b. The internal memory 13a may include at least one of, for example, volatile memory (e.g., Dynamic RAM (DRAM), Static RAM (SRAM), or Synchronous DRAM (SDRAM)), and nonvolatile memory (e.g., One-Time Programmable ROM (OTPROM), Programmable ROM (PROM), Erasable and Programmable ROM (EPROM), Electrically Erasable and Programmable ROM (EEPROM), mask ROM, flash ROM, flash memory (e.g., NAND flash memory or NOR flash memory), a hard drive, or a Solid-State Drive (SSD)).

The external memory 13b may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 13b may be functionally and/or physically connected to the electronic device 10 through various interfaces.

For example, the sensor module 14 may measure a physical quantity or may sense an operating status of the electronic device 10, and may then convert the measured or sensed information into electric signals. The sensor module 14 may include at least one of, for example, a gesture sensor 14a, a gyro sensor 14b, an atmospheric pressure sensor 14c, a magnetic sensor 14d, an acceleration sensor 14e, a grip sensor 14f, a proximity sensor 14g, a color sensor 14h (e.g., an RGB (Red, Green, Blue) sensor), a biometric sensor 14i, a temperature/humidity sensor 14j, an illuminance sensor 14k, and an Ultra-Violet (UV) sensor 14l. Additionally or alternatively, the sensor module 14 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 14 may further include a control circuit for controlling one or more sensors incorporated therein. In a certain embodiment, the electronic device 10 may further include a processor configured to control the sensor module 14 as a part of the processor 11 or separate from the processor 11 so as to control the sensor module 14 while the processor 11 is in the sleep state.

The input device 15 may include, for example, a touch panel 15a, a (digital) pen sensor 15b, a key 15c, or an ultrasonic input device 15d. As the touch panel 15a, at least one of, for example, a capacitive-type touch panel, a resistive-type touch panel, an infrared-type touch panel, and an ultrasonic-type panel may be used. In addition, the touch panel 15a may further include a control circuit. The touch panel 15a may further include a tactile layer so as to provide a tactile reaction to a user.

The (digital) pen sensor 15b may be, for example, a portion of the touch panel, or may include a separate recognition sheet. The key 15c may include, for example, a physical button, an optical key, or a keypad. The ultrasonic input device 15d may sense, through a microphone (e.g., a microphone 18*d*), ultrasonic waves that are generated by an input tool so as to confirm data corresponding to the sensed ultrasonic waves.

The display 16 may include a panel 16*a*, a hologram device 16*b*, or a projector 16*c*. The panel 16*a* may be implemented to be flexible, transparent, or wearable. The panel 16*a* may be configured as a single module together with the touch panel 15*a*. For example, the panel 16*a* may include a pressure sensor (or a force sensor) capable of measuring the intensity of pressure of a user's touch. The pressure sensor may be integrally implemented with the touch panel 15*a*, or may be implemented by one or more sensors separately from the touch panel 15*a*. The hologram device 16*b* may show a stereoscopic image in the air using light interference. The projector 16*c* may project light onto a screen so as to display an image. The screen may be located, for example, inside or outside the electronic device 10. According to one embodiment, the display 16 may further include a control circuit to control the panel 16*a*, the hologram device 16*b*, or the projector 16*c*.

The interface 17 may include, for example, a High-Definition Multimedia Interface (HDMI) 17*a*, a Universal Serial Bus (USB) 17*b*, an optical interface 17*c*, or a D-subminiature (D-sub) interface 17*d*. Additionally or alternatively, the interface 17 may include, for example, a Mobile High-definition Link (MHL) interface, a Secure Digital (SD) card/Multi-Media Card (MMC) interface, or an Infrared Data Association (IrDA) standard interface.

The audio module 18 may bidirectionally convert, for example, sound and electric signals. The audio module 18 may process sound information input or output through, for example, a speaker 18*a*, a receiver 18*b*, an earphone 18*c*, or a microphone 18*d*.

The camera module 19*a* is a device that is capable of photographing, for example, a still image and a video. According to one embodiment, the camera module 19*a* may include one or more image sensors (e.g., a front sensor or a rear sensor), a lens, an Image Signal Processor (ISP), or a flash (e.g., LED or xenon lamp).

The power management module 19*d* may manage, for example, the electric power of the electronic device 10. According to one embodiment, the power management module 19*d* may include a Power Management Integrated Circuit (PMIC), a charger Integrated Circuit (IC), or a battery or fuel gauge. The PMIC may be configured as a wired and/or wireless charging type. The wireless charging type may include, for example, a magnetic-resonance type, a magnetic-induction type, or an electromagnetic-wave type, and may further include an additional circuit for wireless charging (e.g., a coil loop, a resonance circuit, or a rectifier). The battery gauge may measure the remaining charge of the battery 19*e*, and a voltage, a current, or a temperature while charging. The battery 19*e* may include, for example, a rechargeable battery and/or a solar battery.

The indicator 19*b* may indicate a specific status of the electronic device 10 or of a part thereof (e.g., the processor 11), such as a booting status, a message status, or a charge status. The motor 19*c* may convert an electric signal into a mechanical vibration, and may generate, for example, a vibration or a haptic effect. Although not illustrated, the electronic device 10 may include a processor (e.g., a GPU) to support a mobile TV. The processor to support a mobile TV may process media data according to the standards of, for example, Digital Multimedia Broadcasting (DMB), Digital Video Broadcasting (DVB), or MediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 11), may cause the one or more processors to execute the function corresponding to the instruction. The computer-readable storage medium may be, for example, the memory 11.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 2:
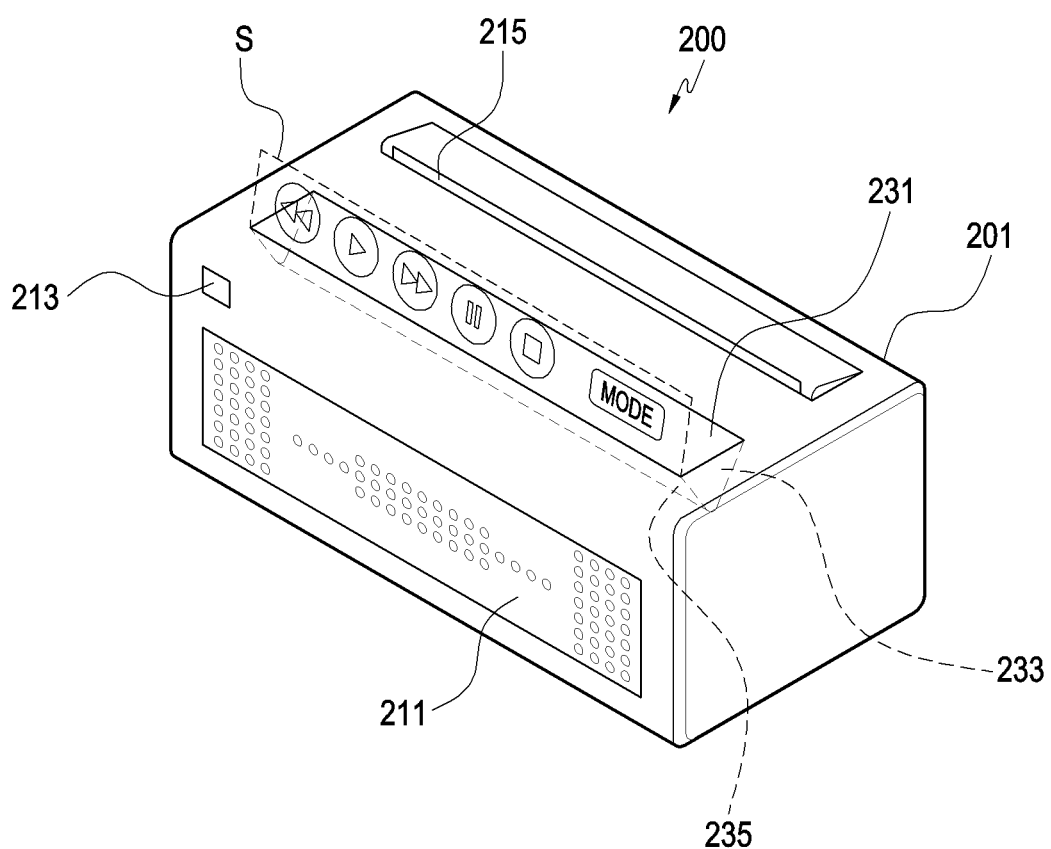
FIG. 2 is a perspective view illustrating an electronic device according to one of various embodiments of the present disclosure.

FIG. 2 is a perspective view illustrating an electronic device 200 according to a first one of various embodiments of the present disclosure.

Referring to FIG. 2, the electronic device 200 (e.g., the electronic device 10 of FIG. 1) may include a half mirror 231, a retroreflective member 233, and/or a display panel 235 (e.g., the display 16 or the panel 16a of FIG. 1).

The half mirror 231 may transmit a part of an incident image and/or the light amount of the image, and may reflect the remaining part. For example, the half mirror 231 may have a transmittance of 50% and a reflectance of 50%. In one embodiment, the half mirror 231 may have a shape and size corresponding to the display panel 235.

The retroreflective member 233 is a member that reflects light in the incident direction again, for example, when light is incident thereon, and may be provided in the form of a sheet or a film. The retroreflective member 233 may be disposed on one side of the half mirror 231 so as to be inclined with respect to the half mirror 231. For example, the retroreflective member 233 may be disposed to face one surface of the half mirror 231 in an inclined state with respect to the half mirror 231.

The display panel 235 may output an image, a video, or the like (hereinafter, referred to as an "output image"), and may be disposed to be inclined with respect to the half mirror 231 at one side of the half mirror 231. For example, the display panel 235 may be disposed to face one surface of the half mirror 231 in an inclined state with respect to the half mirror 231.

According to various embodiments, the half mirror 231, the retroreflective member 233, and/or the display panel 235 may be disposed to be inclined with respect to each other and to form a substantially triangular shape when viewed from the side. In another embodiment, at least one of the retroreflective member 233 and the display panel 235 may be inclined at a 45 degree angle with respect to the half mirror 231. If the retroreflective member 233 and the display panel 235 are both disposed to be inclined at a 45 degree angle with respect to the half mirror 231, the half mirror 231, the retroreflective member 233, and the display panel 235 may form a rectangular equilateral triangular shape when viewed from the side.

In one embodiment, the half mirror 231 may reflect a part of the output image of the display panel 235 (and/or the light amount of the output image) so as to be incident on the retroreflective member 233. The retroreflective member 233 may reflect the incident output image (and/or the light amount of the output image) so as to be incident on the half mirror 231 again. At least a part of the output image (and/or the light amount of the output image) reflected by the retroreflective member 233 may be transmitted through the half mirror 231, and may form an image in the space of the other side of the half mirror 231. Hereinafter, an image formed in the space of the other side of the half mirror 231 will be referred to as an "aerial image". According to various embodiments, the aerial image may be formed at a position symmetrical to the display panel 235 with respect to the half mirror 231. For example, an image-forming plane S (or region) of the aerial image and an image-forming plane (or region) of the display panel 235 may be positioned symmetrically to each other with respect to the half mirror 231.

The configuration in which the aerial image is formed by the half mirror 231 or the like will be described in more detail with reference to FIG. 4 and the like.

According to various embodiments, the electronic device 200 may further include a housing 201 and may be a sound device (e.g., an audio device) having a speaker device (e.g., a voice-coil-motor-type or piezoelectric-type speaker device) embedded therein. The housing 201 may accommodate at least one of the half mirror 231, the retroreflective member 233, and the display panel 235.

The housing 201 may include a porous member 211 disposed on the front surface thereof which corresponds to the speaker device embedded therein. For example, sound generated by the speaker device may be output to the outside through the porous member 211. In some embodiments, when the speaker device has a piezoelectric-type configuration, the housing 201 may not include the porous member 211. In one embodiment, the half mirror 231 may be disposed on the upper surface of the housing 201, and the retroreflective member 233 and the display panel 235 may be accommodated in the housing 201. For example, the plane S and/or the region (space) on which the aerial image is formed may be located outside (e.g., above) the housing 201.

In one embodiment, the electronic device 200 may be a sound device provided with functions such as a music file playback function and a radio broadcast reception function. The electronic device 200 may output an image representing functions such as a playback function, a stop function, a rewind function, and a fast-forward function, through the display panel 235. In another embodiment, the display panel 235 may output an image representing the function of switching an operation mode (e.g., a playback mode or a broadcast mode) of the electronic device 200. In another embodiment, when the electronic device 200 is playing back music, the display panel 235 may output an image displaying various pieces of information about the music file that is being played back (e.g., the singer, album title, title of the music that is being played back, etc.). As described above, the image output from the display panel 235 may be formed on the image-forming plane S on the housing 201.

According to various embodiments, the electronic device 200 may include a first sensor 213 disposed in the housing 201. The first sensor 213 may be a sensor that detects the operating environment of the electronic device 200, such as a proximity sensor or an illuminance sensor (e.g., the proximity sensor 14g or the illuminance sensor 14k in FIG. 1), and may detect the position of the user with respect to, for example, an aerial image formed on the electronic device 200 and/or the housing 201. In one embodiment, when it is determined that there is no user in the vicinity of the electronic device 200 based on information detected through the first sensor 213, the electronic device 200 (e.g., the processor 11) may output information about the music file, which is being played back through the display panel 235, or information about the received broadcast channel or program. In another embodiment, when it is determined that the user has approached the electronic device 200 based on information detected through the first sensor 213, the electronic device 200 (e.g., the processor 11) may output an image representing a function for playing back a music file through the display panel 235 or an image representing an operation mode switching function.

As described above, the image output through the display panel 235 is formed as an aerial image on the image-forming plane S (image-forming region and/or image-forming space) positioned symmetrically with respect to the half mirror 231, so that the user can visually recognize the aerial image. For example, a device for inexpensively providing a stereoscopic image using the half mirror 231 and the retroreflective member 233 may be provided, and a two-dimensional image may be converted into an aerial image or a three-dimensional image. According to one embodiment, the image may be processed and output through image processing in order to improve the visibility of the formed aerial image (for displaying the aerial image to be visually well-confirmed or to be similar to the original image to be displayed). For example, by processing the image through image processing, it is possible to increase the contrast, adjust the thickness, compensate the brightness, and compensate the color of the aerial image, and various kinds of image effect filters may be used in such image processing.

In one embodiment, the electronic device 200 may further include a second sensor 215 (e.g., the gesture sensor 14a of FIG. 1). For example, the second sensor 215 may include an infrared sensor or an ultrasonic sensor and may detect object motion or the like in the image-forming plane S (image-forming region and/or image-forming space). According to various embodiments, the electronic device 200 may include an input device configured by combining the aerial image formed on the image-forming plane S (image-forming region and/or image-forming space) and the second sensor 215. For example, when an image representing the music playback function is formed on the image-forming plane S, the second sensor 215 detects whether an object (e.g., the user's finger) enters a position corresponding to the image, and the function represented by the corresponding image of the electronic device 200 (e.g., the processor 11 of FIG. 1) may be executed depending on whether or not the object has entered. In another embodiment, the second sensor 215 is generally deactivated, and may be activated when the first sensor 213 senses that the user approaches the electronic device 200.

According to various embodiments, the first sensor 213 and/or the second sensor 215 may further include a camera (e.g., the camera module 19a of FIG. 1) having at least one image sensor. The electronic device 200 may use both the first sensor 213 and the second sensor 215, or may selectively use a sensor which has low power consumption depending on, for example, an operating state such as the battery charge level.

As described above, the electronic device 200, according to various embodiments of the present disclosure, may further include a sensor (e.g., the first sensor 213 described above) that detects an operating environment or the like, thereby switching an image output through the display panel 235, an image formed on the image-forming plane S or the like. In another embodiment, the electronic device 200 may detect that the user approaches or comes into contact with the aerial image using a sensor combined with the aerial image formed in the image-forming plane S (e.g., the second sensor 215 described above), and may generate an input signal or execute a function and/or an application corresponding thereto.

Figure 3:
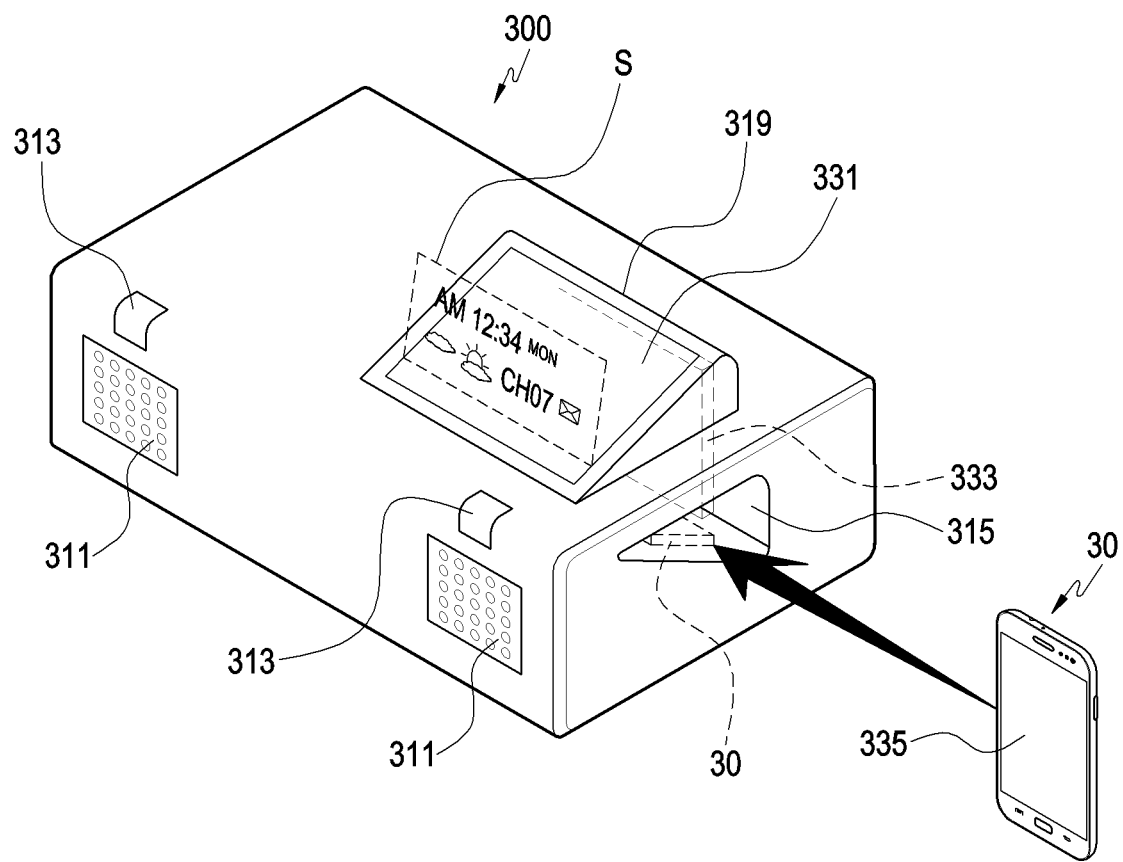
FIG. 3 is a perspective view illustrating a stereoscopic image device according to one of various embodiments of the present disclosure.

FIG. 3 is a perspective view illustrating a stereoscopic image device 300 according to one of various embodiments of the present disclosure.

The stereoscopic image device 300 according to the present embodiment may be configured to mount thereon an electronic device 30 (e.g., a mobile communication terminal) including a display panel 335, and may convert an image output through the display panel 335 of the electronic device 30 so as to form an aerial image.

Referring to FIG. 3, the stereoscopic image device 300 may include a half mirror 331 and a retroreflective member 333. Since the half mirror 331 and the retroreflective member 333 have been described with reference to FIG. 2, a detailed description thereof will be omitted in the present embodiment.

In one embodiment, the stereoscopic image device 300 may include a housing 301 accommodating the retroreflective member 333 therein, and the half mirror 331 may be disposed on the top surface of the housing 301 so as to face the retroreflective member 333 at an oblique angle. An opening 315 may be formed in the side surface of the housing 301 so that the electronic device 30 may be mounted inside the housing 301 through the opening 315. For example, the electronic device 30 may be disposed to face the half mirror 331 and/or the retroreflective member 333 at an oblique angle.

In another embodiment, in the state where the electronic device 30 is mounted inside the housing 301, an image output through the display panel 335 is formed in a space above the housing 301, for example, in the image-forming plane S. The image formed on the image-forming plane S may be disposed symmetrically to the display panel 335 of the electronic device 30 mounted inside the housing 301, for example, symmetrical to the half mirror 331. In one embodiment, the stereoscopic image device 300 may include a protrusion 319 formed on the top surface of the housing 301, in consideration of the user's convenience in mounting the electronic device 30 or the external appearance of the stereoscopic image device 300, and the half mirror 331 may be disposed on the protrusion 319 to be inclined with respect to the top surface or the front surface of the housing 301.

The electronic device 30 may transmit/receive data to/from the stereoscopic image device 300 through nearfield wireless communication, such as Bluetooth, or a data cable. For example, the electronic device 30 may operate in a multimedia playback mode, and a sound signal output from the electronic device 30 may be provided to the stereoscopic image device 300 and may be output by operating a speaker embedded in the stereoscopic image device 300. A porous member 311, or the like, capable of emitting sound may be disposed on the front surface of the housing 301.

In one embodiment, a touch panel (e.g., the touch panel 15a of FIG. 1) may be integrated with the display panel 335. For example, the display panel 335 may also be used as an input device. When the touch panel is capable of detecting a proximity touch input (e.g., hovering) and the image-forming plane S is located within a region in which a proximity touch input (e.g., hovering) to the touch panel is allowed, an input device may be formed through the combination of the image formed on the image-forming plane S and the touch panel.

In another embodiment, the stereoscopic image device 300 may include a sensor 313 configured to detect the operating environment of the stereoscopic image device 300 or the like. For example, the sensor 313 may detect whether or not the user is approaching the stereoscopic image device 300, and may transmit the detected information to the electronic device 30. The information detected by the sensor 313 or the like may be provided to the electronic device 30 in a wired manner using, for example, a data cable, or in a wireless manner using, for example, Bluetooth.

According to various embodiments, the stereoscopic image device 300 may be utilized as a docking station of the electronic device 30. For example, the stereoscopic image device 300 may be utilized as an auxiliary device of the electronic device 30 for the purpose of, for example, improving the sound performance of the electronic device 30 or for providing a charging function. As described above, the stereoscopic image device 300 is capable of transmitting/ receiving data to/from the electronic device 30 in a wireless manner and/or a wired manner. In one embodiment, the charging function provided by the stereoscopic image device 300 may be executed in a wireless manner and/or a wired manner. For example, the stereoscopic image device 300 may be provided with a wireless power transmission function, and an electronic device provided with a wireless power reception function may be mounted on the stereoscopic image device 300 so as to charge the battery.

In another embodiment, the combination of the stereoscopic image device 300 and the electronic device 30 may perform the same function as the electronic device 200 illustrated in FIG. 2. For example, an output image (and/or an aerial image) may be switched depending on whether or not a user is approaching. In another embodiment, the combination of the stereoscopic image device 300 and the electronic device 30 may detect that the user (or the user's body) approaches the region on which an aerial image is formed (e.g., the image-forming plane S) so as to generate an input signal or to execute a predetermined function or application. The sensor that detects the approach of the user or the user's body may be constituted with a touch panel mounted on the display panel 335. In another embodiment, the sensor that detects that the approach of the user or the user's body may include an ultrasonic sensor or an infrared sensor (e.g., the second sensor 215 of FIG. 2) mounted on the housing 301.

In a specific embodiment of the present disclosure, a stereoscopic image device or an electronic device is disclosed as an example of outputting sound or providing a charging function, but the present disclosure is not limited thereto. For example, the stereoscopic image device according to various embodiments of the present disclosure can be mounted on home appliances such as microwave ovens, washing machines, refrigerators, or electric ovens. Typically, household appliances are provided with an operation panel that allows the user to adjust the settings of the products. A stereoscopic image device according to various embodiments of the present disclosure may be mounted such that an additional operating panel is provided or such that a conventional operating panel is replaced. In one embodiment, the stereoscopic image device mounted on the household appliance may form an aerial image representing the operating state of the household appliance. For example, the remaining operating time of a microwave oven, the operating phase of a washing machine, the current temperature of a refrigerator, the operating temperature of an electric oven, and the like, may be provided as an aerial image by the stereoscopic image device according to various embodiments of the present disclosure.

Figure 4:
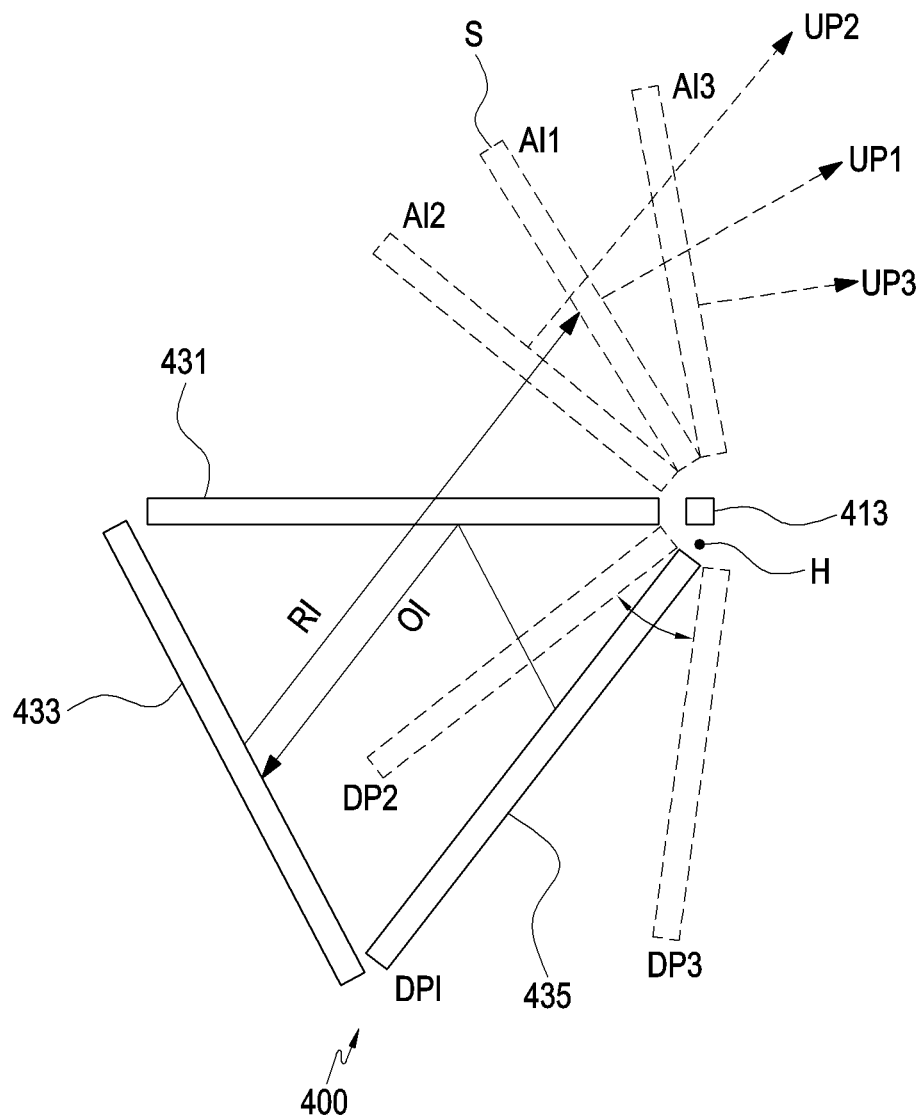
FIG. 4 is a view for explaining the operation of a stereoscopic image device and/or an electronic device according to various embodiments of the present disclosure.

FIG. 4 is a view for explaining the operation of a stereoscopic image device and/or an electronic device 400 according to various embodiments of the present disclosure.

Referring to FIG. 4, the stereoscopic image device and/or the electronic device 400 according to various embodiments of the present disclosure may include a half mirror 431, a retroreflective member 433, and/or a display panel 435. The retroreflective member 433 and/or the display panel 435 may be disposed at one side of the half mirror 431 such that it is inclined with respect to the half mirror 431. In one embodiment, the half mirror 431, the retroreflective member 433, and/or the display panel 435 may be disposed to face each other in an inclined state with respect to each other when viewed from a side. For example, the half mirror 431, the retroreflective member 433, and/or the display panel 435 may be disposed in a substantially triangular shape when viewed from the side.

According to various embodiments, the display panel 435 may be a portion of the stereoscopic image device and/or the electronic device 400 (e.g., the embodiment illustrated in FIG. 2), or may be detachably provided to the stereoscopic image device and/or the electronic device 400 (e.g., the embodiment illustrated in FIG. 3). For the sake of brevity, in the following detailed description of this embodiment, the stereoscopic image device and/or the electronic device 400 will be denoted by reference numeral "400" and will be referred to as an "electronic device".

FIG. 4 illustrates the advancing route of an image output from the display panel 435 as "OI" and the advancing route of an image reflected by the retroreflective member 433 as "RI". The display panel 435 may be disposed such that an output image is incident on the half mirror 431. An image or light output by the display panel 435 may be incident on the half mirror 431. As described above, the half mirror 431 may transmit a part of the incident output image and/or the light amount of the output image and may reflect the remaining part thereof. The output image reflected by the half mirror 431 may be incident on the retroreflective member 433. The retroreflective member 433 may reflect the incident output image so as to cause the output image to be incident on the half mirror 431 again. As described above, the retroreflective member 433 reflects the light again in the incident direction, so that the image reflected by the retroreflective member 433 can be reflected by the half mirror 431 substantially in the reverse direction with respect to the advancing route of the output image reflected by the half mirror 431.

According to various embodiments, part or all of the image reflected by the retroreflective member 433 and/or the light amount of the reflected image may be transmitted through the half mirror 431 so as to be incident on and to form an aerial image in the other region (or space) of the half mirror 431. In one embodiment, the image-forming plane S of the aerial image (the image-forming region and/or image-forming space) is located symmetrically to the display panel 435 (or the image-forming plane of the display panel) with respect to the half mirror 431.

According to various embodiments, when the image-forming plane S is located at a fixed position, the size of an aerial image and the like may be different depending on the position from which the user views the image-forming plane S. The electronic device, according to various embodiments of the present disclosure, may further include a sensor 413 that detects the position of the user, and may adjust the position and/or the inclination angle of the display panel 435 relative to the half mirror 431 so as to correspond to the position of the user detected through the sensor 413. In one embodiment, the inclination angle of the display panel 435 relative to the half mirror 431 can be adjusted by rotating the display panel 435 about the rotation axis H provided at one end side adjacent to the half mirror 431. Although not illustrated, the electronic device 400 may further include a driving device (e.g., a step motor, a servo motor, or the like) that rotates the display panel 435.

For example, when the user is located at the position indicated by "UP1", the display panel 435 may be disposed at a first position DP1 inclined at an angle of about 45 degrees relative to the half mirror 431. When the display panel 435 outputs an image at the first position DP1, an aerial image is formed at a first image-forming position AI1 symmetrical to the first position DP1 with respect to the half mirror 431.

When the sensor 413 detects that the user moves to the position indicated by "UP2", the electronic device 400 (e.g., the processor 11 of FIG. 1) rotates the display panel 435 so as to be disposed at the second position DP2. At the second position DP2, the display panel 435 may be inclined at an angle of, for example, about 30 degrees relative to the half mirror 431. When the sensor 413 detects that the user moves to the position indicated by "UP3", the electronic device 400 (e.g., the processor 11 of FIG. 1) rotates the display panel 435 to move to the third position DP3. At the third position DP3, the display panel 435 may be inclined at an angle of, for example, about 60 degrees relative to the half mirror 431.

Even in the case of the same image, the size and shape thereof may differ depending on the direction of the user's visual line. As such, the electronic device 400, according to various embodiments of the present disclosure, may detect the position of the user and form an aerial image suitable for that position. In a specific embodiment of the present disclosure, for the sake of brevity, a configuration for adjusting the inclination angle of the display panel 435 relative to the half mirror 431 is illustrated, but the present disclosure is not limited thereto. For example, with respect to the display panel 435, the half mirror 431 may be set to be rotated, or the retroreflective member 433 may be set to rotated. According to various embodiments, a plurality of rotation axes (e.g., the rotation axis H) of the display panel 435 may be provided, and depending on the position of the user detected through the sensor 413, the display panel 435 may rotate about at least one rotation axis selected from among a plurality of rotation axes.

FIG. 5 is a view for explaining an image output example of a stereoscopic image device and/or an electronic device according to various embodiments of the present disclosure.

In the embodiment illustrated in FIG. 4, an example of forming an aerial image suitable for the user's position by adjusting the inclination angle of the display panel or the like according to the user's position has been described. Referring also to FIG. 5, the display panel 435 may be fixed at a predetermined position (e.g., the position indicated by "DP1"), and may adjust an image output therefrom so as to form an aerial image suitable for the user's position.

For example, when the display panel 435 is positioned to be inclined at an angle of about 45 degrees relative to the half mirror 431 (e.g., the position indicated by "DP1" in FIG. 4) and the user is located at the first position (e.g., the position indicated by "UP1" in FIG. 4), the aerial image may be formed to have the same size as the output image. Since the display panel 435 is fixed at the position indicated by "DP1", the image-forming plane S of the aerial image may be fixed at the first image-forming position AI1.

When the user moves to the second user position indicated by "UP2", the aerial image formed at the first image-forming position AI1 may appear smaller than when viewed from the first user position UP1. The electronic device 400, according to various embodiments of the present disclosure, may detect the change in the position of the user through the sensor 413, and may magnify the output image such that the aerial image may be viewed even from the second user position UP2 in the same size as that of the aerial image when viewed from the first user position UP1.

When the user moves to the third user position indicated by "UP3", the aerial image formed at the first image-forming position AI1 may appear larger than when viewed from the first user position UP1. The electronic device 400, according to various embodiments of the present disclosure, may detect the change in the position of the user through the sensor 413, and may reduce the output image such that the aerial image may be viewed even from the third user position UP3 in the same size as that of the aerial image when viewed from the first user position UP1.

As described above, the electronic device 400, according to various embodiments of the present disclosure, is capable of providing an aerial image suitable for a user position by adjusting the aerial image by magnifying or reducing the output image depending on the position of the user. In a specific embodiment of the present disclosure, a simple example of adjusting the aerial image through magnification/reduction of the output image has been disclosed, but the present disclosure is not limited thereto. For example, the output image may be magnified or reduced by varying the magnification/reduction ratios of the left and right sides of the output image (or the magnification/reduction ratios of the upper and lower sides) depending on the position of the user.

Figure 6:
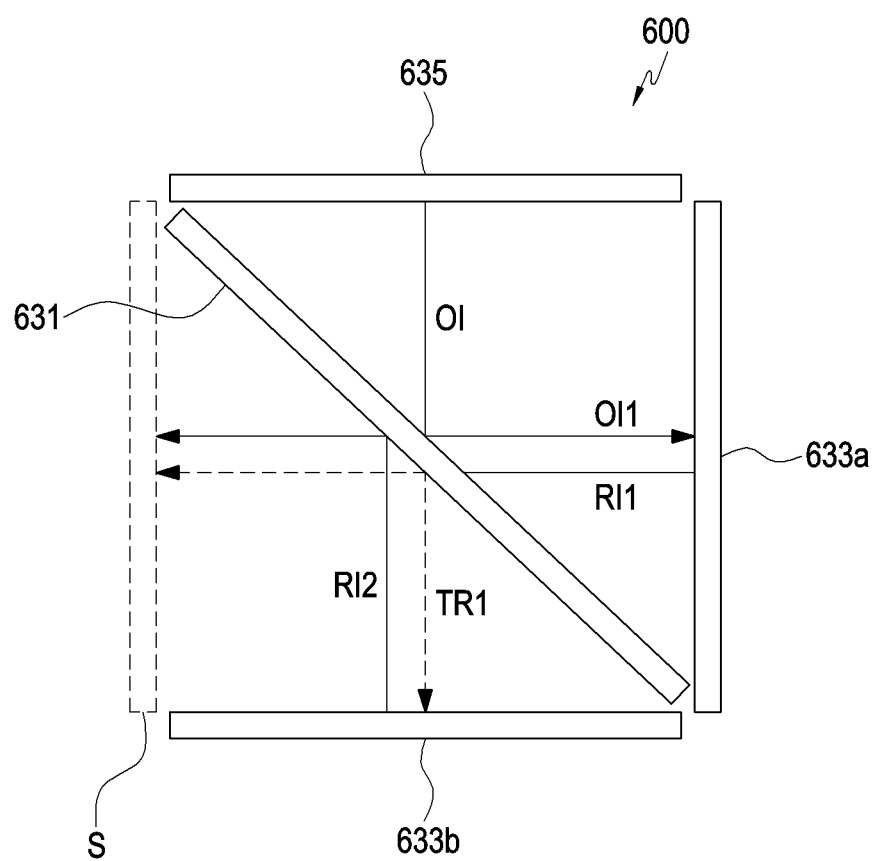
FIG. 6 is a view for explaining the operation of a stereoscopic image device and/or an electronic device according to another one of various embodiments of the present disclosure.

FIG. 6 is a view for explaining the operation of a stereoscopic image device and/or an electronic device 600 according to another one of various embodiments of the present disclosure.

According to various embodiments of the present disclosure, the stereoscopic image device and/or the electronic device 600 may further include a second retroreflective member 633*b*. For the sake of brevity, in the following detailed description of this embodiment, the stereoscopic image device and/or the electronic device 600 will be denoted by reference numeral "600" and will be referred to as an "electronic device".

The half mirror (e.g., the half mirror 431 in FIG. 4) of the above-described embodiment may transmit a part of the light amount of the incident light or image and may reflect the remaining light amount. A part of the image reflected by the half mirror or transmitted through the half mirror and/or the light amount of the image may be lost, and may thus not contribute to the formation of the aerial image. For example, the resolution of a formed aerial image may be lower than the resolution of the image output from the display panel. The electronic device 600, according to the present embodiment, may at least partially compensate for the loss of light amount due to the half mirror by utilizing the second retroreflective member 633*b*.

Referring to FIG. 6, the second retroreflective member 633*b* may be disposed to face the display panel 635 with the half mirror 631 interposed therebetween. For example, the display panel 635 may be disposed on one side of the half mirror 631 together with the first retroreflective member 633*a*, and the second retroreflective member 633*b* may be disposed on the other side of the half mirror 631.

An image OI and/or a part OI1 of the light amount of the image output from the display panel 635 may be reflected by the half mirror 631 and the remaining part TR1 of the light amount of the image may be transmitted through the half mirror 631. Of the output image OI, the image and/or the light amount OI1 reflected by the half mirror 631 may be incident on the first retroreflective member 633*a* so as to be reflected. Part or all of the image and/or the light amount RI1 reflected by the first retroreflective member 633*a* is transmitted through the half mirror 631 so as to form an aerial image on the image-forming plane S (image-forming region and/or image-forming space) located in the space on the other side of the half mirror 631.

The remaining part of the output image and/or the light amount, for example, the image and/or the light amount TR1 transmitted through the half mirror 631 in the output image OI may be reflected by the second retroreflective member 633*b* so as to be incident on the half mirror 631. Part or all of an image and/or the light amount RI2 reflected by the second retroreflective member 633*b* is transmitted through the half mirror 631 so as to form an aerial image on the image-forming plane S. For example, the electronic device 600 may combine a part or all of an image and/or the light amount RI2 reflected by the first retroreflective member 633*a* and a part or all of an image and/or the light amount RI1 reflected by the second retroreflective member 633*b* so as to form an aerial image on the image-forming plane S.

As described above, since the electronic device 600, according to various embodiments of the present disclosure, may further include the second retroreflective member 633*b* of the output image OI, a part or all of the image and/or the light amount TR1 transmitted through the half mirror 631 may contribute to forming an aerial image. For example, the electronic device 600 including the second retroreflective member 633*b* is capable of compensating for the loss of the image and/or the light amount due to the transmission or reflection of the half mirror 631.

Figure 7:
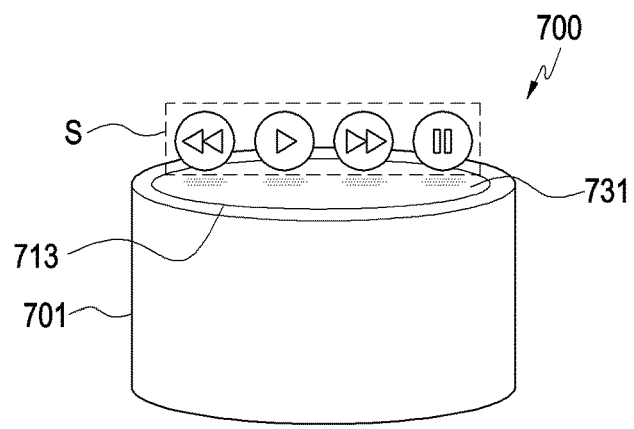
FIG. 7 is a perspective view illustrating an electronic device according to still another one of various embodiments of the present disclosure.
Figure 8:
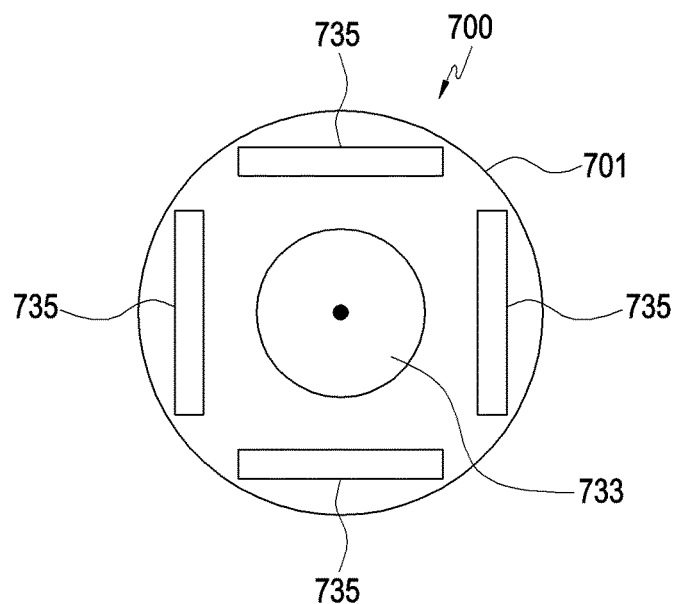
FIG. 8 is a plan view illustrating an electronic device according to still another one of various embodiments of the present disclosure.
Figure 9:
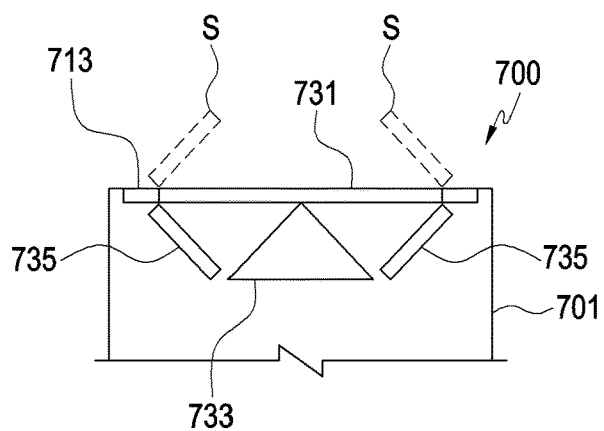
FIG. 9 is a cross-sectional view illustrating the configuration of an electronic device according to still another one of various embodiments of the present disclosure.

FIG. 7 is a perspective view illustrating the electronic device 700 according to another one of the various embodiments of the present disclosure. FIG. 8 is a plan view illustrating the configuration of the electronic device 700 according to another one of the various embodiments of the present disclosure. FIG. 9 is a cross-sectional view illustrating the configuration of an electronic device 700 according to another one of the various embodiments of the present disclosure.

Referring to FIGS. 7 to 9, the electronic device 700 may form an aerial image above the housing 701. In one embodiment, most of the top surface of the housing 701 may be formed of a half mirror 731, and a sensor 713 may be disposed along the edge of the half mirror 731 so as to detect the user position or the movement of an object in a region in which an aerial image is formed.

The housing 701 may have a cylindrical shape, and at least one display panel 735 and at least one retroreflective member 733 may be disposed inside the housing 701. The retroreflective member 733 may have a cone shape, a polygonal pyramid shape, a truncated cone shape, or a pyramidal shape, and a plurality of display panels 735 may be disposed around the retroreflective member 733. The display panels 735 and the outer peripheral surface of the retroreflective member 733 may be generally inclined relative to the half mirror 731. In one embodiment, an image outputted from the display panels 735 is sequentially reflected by the half mirror 731 and the retroreflective member 733 and then transmitted through the half mirror 731 to the housing 701, thereby forming an aerial image above the housing 701. The image-forming plane S of the aerial image may be positioned symmetrically to the display panel 735 with respect to the half mirror 731.

According to various embodiments, the outer peripheral surface of the retroreflective member 733 is a curved surface. Thus, the output image of the display panels 735 and the aerial image formed on the image-forming plane S may be different from each other. For example, when the output image of the display panels 735 is seen as a planar shape, the image-forming plane S may have a curved shape. As discussed in the above-described embodiment, it is possible to adjust the aerial image seen by the user by adjusting the output image depending on the position of the user. In one embodiment, considering that the reflective surface of the retroreflective member 733 is a curved surface, an aerial image formed on the image-forming plane S may have a planar shape when the image output through the display panels 735 is partially magnified or reduced.

In one embodiment, the sensor 713 may detect the position of the user relative to the housing 701 or the movement of an object in the image-forming plane S (image-forming area or image-forming space) so as to switch the operation mode of the electronic device 700, an aerial image formed on the image-forming plane S, or the like.

Figure 10:
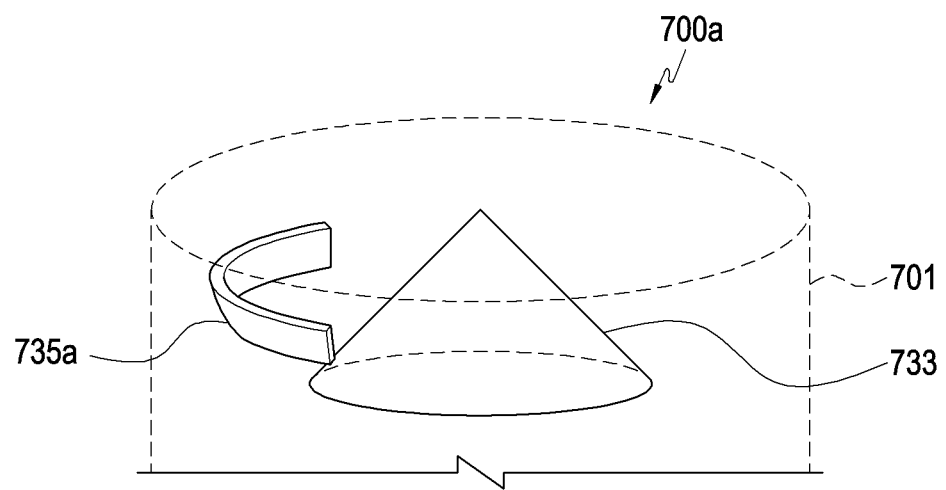
FIG. 10 is a view for explaining a modified example of an electronic device according to still another one of various embodiments of the present disclosure.

FIG. 10 is a view for explaining a modified example of an electronic device 700*a* according to another one of the various embodiments of the present disclosure.

The electronic device 700*a*, according to the present embodiment, is a modified example of the embodiment illustrated in FIGS. 7 to 9, and the constituent elements that can be easily understood through the preceding embodiments may be denoted by the same reference numerals, or the reference numerals may be omitted. The descriptions of the constituent elements may also be omitted.

Referring to FIG. 10, part or all of the display panel 735*a* of the electronic device 700*a* may include a curved portion. For example, the display panel 735*a* may be a curved display panel. The curved surface, the curvature, or the like of the display panel 735*a* may be appropriately designed in consideration of the specifications (e.g., the height, the angle of inclination of the outer peripheral surface, the curvature of the outer peripheral surface, and the like) of the retroreflective member 735 and the shape of an aerial image to be formed above the housing 701, and the like.

Figure 11:
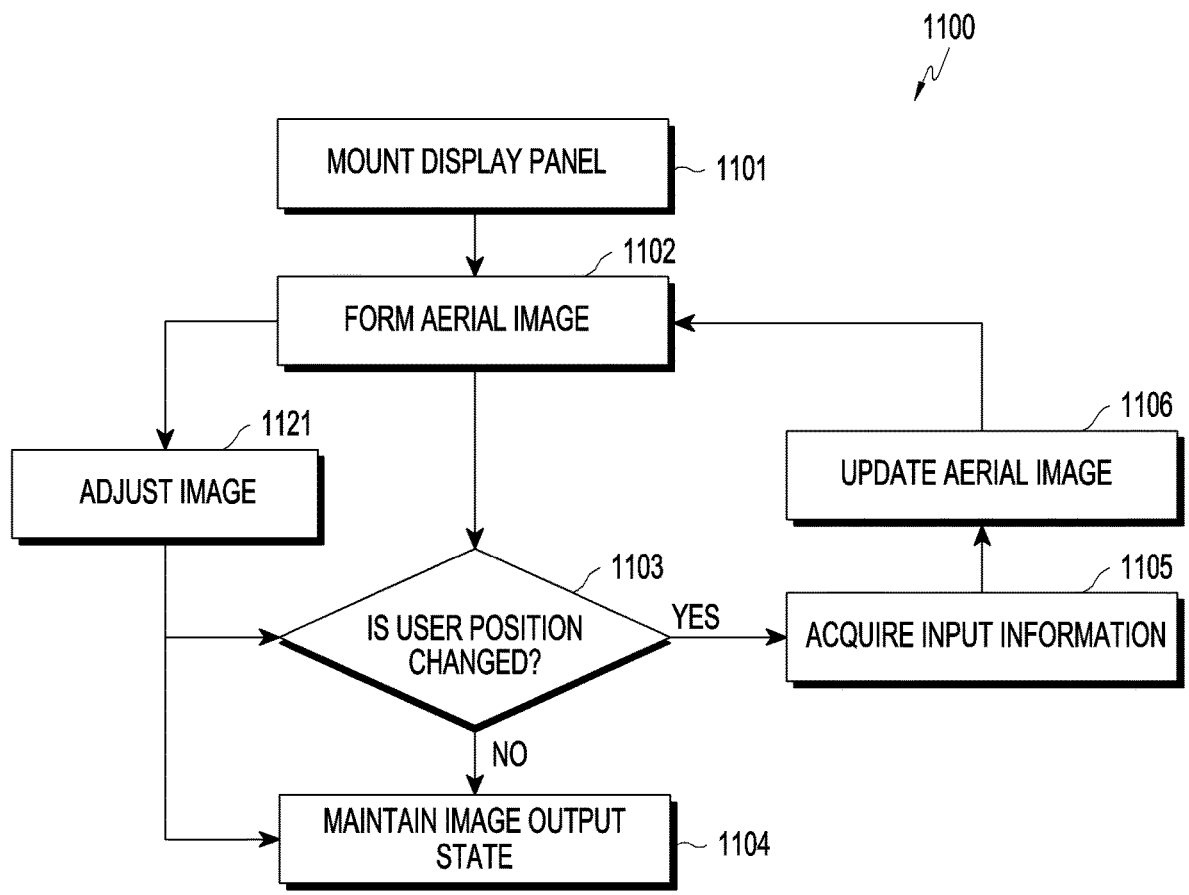
FIG. 11 is a flowchart for explaining an operating method of a stereoscopic image device and/or an electronic device according to various embodiments of the present disclosure.

FIG. 11 is a flowchart for explaining the operating method 1100 of a stereoscopic image device and/or an electronic device according to various embodiments of the present disclosure.

The operating method 1100 of a stereoscopic image device and/or an electronic device including the stereoscopic image device, according to various embodiments of the present disclosure, may update an aerial image depending on the operating environment such as the position of the user. Referring to FIG. 11, the operating method 1100 may form an aerial image and may update the aerial image formed depending on a change in the position of the user in the state in which the aerial image is formed.

In one embodiment, operation 1101 is an operation of mounting a display panel on a stereoscopic image device. For example, a mobile communication terminal may be mounted on a housing (or a cradle) on which a half mirror, a retroreflective member, or the like is mounted. In another embodiment, when a display panel is disposed in the stereoscopic image device, operation 1101 may be omitted.

In the following detailed description, it is assumed that a display panel is mounted on a stereoscopic image device and/or an electronic device, and operation method 1100 will be described while referring to FIG. 2 as well.

According to various embodiments, operation 1102 is an operation of forming an aerial image, wherein, when the electronic device 200 is activated, an image may be output from the display panel 235. The output image is sequentially reflected by the half mirror 231 and the retroreflective member 233 and then transmitted through the half mirror 231, thereby forming an aerial image above the electronic device 200. The image-forming plane S (image-forming region and/or image-forming space) of the aerial image may be positioned symmetrically to the display panel 235 with respect to the half mirror 231. The aerial image formed on the image-forming plane S may include information on the operation mode of the electronic device 200, information on the function or application that may be executed/switched in the current operation mode, information on the music file which is being played back, information on the received broadcast channel and broadcast program, or the like.

In one embodiment, after the aerial image is formed, the electronic device 200 may perform operation 1121 for adjusting the aerial image as needed. Operation 1121 may be performed when the electronic device 200 is activated, then the aerial image is formed for the first time. In another embodiment, during the operation of the electronic device 200, when the aerial image formed on the image-forming plane S is changed or switched, operation 1121 may be selectively performed.

According to various embodiments, after the aerial image is formed on the image-forming plane S, for example, after operation 1102 and/or operation 1121, the electronic device 200 may perform operation 1103 so as to monitor the change in the position of the user (e.g., approaching the electronic device 200, movement in a region adjacent to the electronic device 200, and the like) through the sensor 213. When it is determined that there is no change in the position of the user based on the information detected through the first sensor 213, the electronic device 200 performs operation 1104 so as to maintain the current image output state of the image output through the display panel 235.

When it is determined that the position of the user is changed based on the information detected through the first sensor 213 in operation 1103, the electronic device 200 may perform operation 1105 so as to acquire information on the user's position relative to the electronic device 200.

According to the information acquired in operation 1105, the electronic device 200 may perform operation 1106 so as to update the aerial image formed on the image-forming plane S. For example, when the user approaches the electronic device 200 in the state in which information on the music file, which is being played back, is displayed through the aerial image, the electronic device 200 performs operation 1105 so as to form an aerial image based on an image of a function key required for playing back music or an image of a function key for switching an operation mode. When the aerial image formed on the image-forming plane S reflects images of various function keys, the second sensor 215 may be activated so as to monitor movement or the like of an object in the region in which the aerial image is formed (e.g., the image-forming plane S).

In another embodiment, in performing operation 1103, the electronic device 200 may monitor the approach, entry, movement, or the like of an object (a finger of the user or the like) in the region where an aerial image is formed (e.g., the image-forming plane S) by using the second sensor 215. Based on the information on the movement of the object detected through the second sensor 215, the electronic device 200 may perform operations 1105 and 1106 so as to perform an update of the aerial image formed on the image-forming plane S or the like. According to another embodiment, based on information on the movement of the object detected through the second sensor 215, the electronic device 200 may change the operation mode or may execute a predetermined function and/or application.

Operations continued as operation 1103, operation 1105, and operation 1106 may vary depending on the operation mode of the electronic device 200. For example, when the user approaches the electronic device 200 in the state of operating in a broadcast reception mode, the electronic device 200 may provide broadcast channel or broadcast program information in a region of the image-forming plane S as an aerial image while providing an aerial image of a function key related to broadcast channel switching, operation mode switching, or the like in another region of the image-forming plane S. In some embodiments, the second sensor 215 may not yet be activated when at least a portion of the aerial image does not reflect an image of a function key, and the second sensor 215 may be activated at the time when the electronic device 200 detects that the user has approached, and may reflect the image of the function key in the at least a portion of the aerial image.

According to one embodiment, in a stereoscopic image device in which an electronic device including a display panel is mounted (e.g., the stereoscopic image device of FIG. 3), when the electronic device including the display panel further includes a touch panel, a proximity sensor, and a camera module, at least one of the touch panel, the proximity sensor, and the camera module may perform the functions of the first sensor 213 and/or the second sensor 215.

The stereoscopic image device, the electronic device including the stereoscopic image device, and/or an operating method thereof, according to various embodiments of the present disclosure, need not be limited by the above-described embodiments. For example, depending on whether or not a display panel is included, whether a display panel is mounted on a separate electronic device (e.g., a mobile communication terminal) and whether such an electronic device includes a touch panel or the like, as well as the types of functions (or applications) or the like provided in the stereoscopic image device and/or the electronic device, the stereoscopic image device, the electronic device including the stereoscopic image device, and the operation thereof, according to various embodiments of the present disclosure, may vary.

Figure 12:
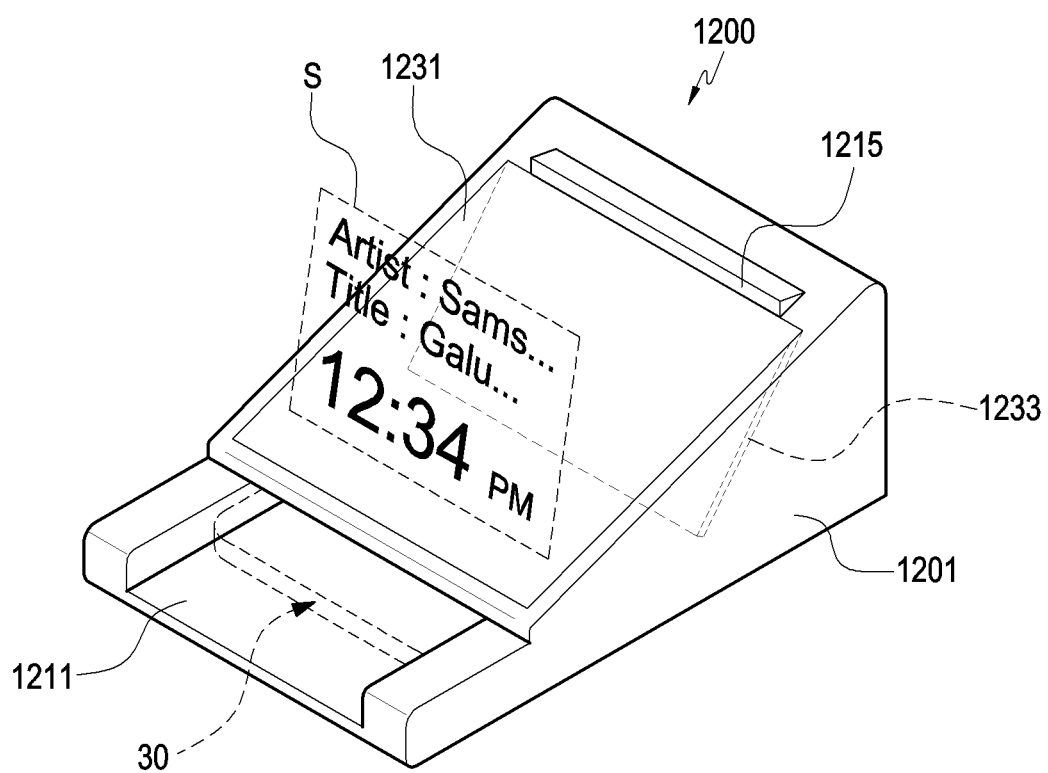
FIG. 12 is a perspective view illustrating a stereoscopic image device according to yet another one of various embodiments of the present disclosure.

FIG. 12 is a perspective view illustrating a stereoscopic image device 1200 according to another one of the various embodiments of the present disclosure.

Referring to FIG. 12, the stereoscopic image device 1200 may include a seating recess 1211 in which an electronic device 30 including a display panel (e.g., the display panel 335 of FIG. 3) is capable of being accommodated and mounted, and a portion of the top surface may be provided as a half mirror 1231. For example, the housing 1201 of the stereoscopic image device 1200 may be used as a cradle for mounting the electronic device 30 thereon, and a retroreflective member 1233 may be disposed inside the housing 1201 to face the inner surface of the half mirror 1231 in an inclined state relative to the half mirror 1231. When the electronic device 30 is disposed in the seating recess 1211, at least a portion of the display panel of the electronic device 30 may be positioned to face the inner surface of the half mirror 1231 at an oblique angle.

When the display panel of the electronic device 30 is activated while in the state of being disposed in the seating recess 1211, an image output from the display panel of the electronic device 30 is displayed on the outer surface of the half mirror 1231 as an aerial image. According to various embodiments, the stereoscopic image device 1200 may include a wireless power transmission function. When the electronic device 30 is capable of receiving power wirelessly, the battery of the electronic device 30 can be charged merely by disposing the electronic device 30 in the seating recess 1211.

In one embodiment, the electronic device 30 is capable of transmitting/receiving data to/from the stereoscopic image device 1200 in a wired manner using, for example, a data cable, or in a wireless manner using, for example, Bluetooth. For example, the stereoscopic image device 1200 may include a sensor 1215 that detects the movement of an object or the like on the image-forming plane S. Information on the movement of the object or the like detected from the sensor 1215 may be provided to the electronic device 30 through wired communication and/or wireless communication, and based on the information detected from the sensor 1215, the electronic device 30 may switch the operating mode or may update the output image and/or the aerial image.

In another embodiment, the stereoscopic image device 1200 may include a speaker device embedded therein, and may receive sound signals of a multimedia file, such as music played back by the electronic device 30, so as to output sound. While the sound is output through the stereoscopic image device 1200, the electronic device 30 may output information on the multimedia file which is being played back through the display panel, and an aerial image corresponding to the output image of the display panel of the display device 30 may be formed on the image-forming plane S.

In another embodiment, the region where the aerial image is formed (e.g., the image-forming plane S) may be located within the range within which the touch panel integrated in the display panel of the electronic device 30 is capable of detecting a proximity touch input (e.g., hovering). For example, when the user holds a finger or the like for a predetermined time or longer in a state of touching the aerial image formed on the image-forming plane S, the electronic device 30 is capable of recognizing the proximity touch input (e.g., hovering) and executing a function or an application corresponding thereto.

Figure 13:
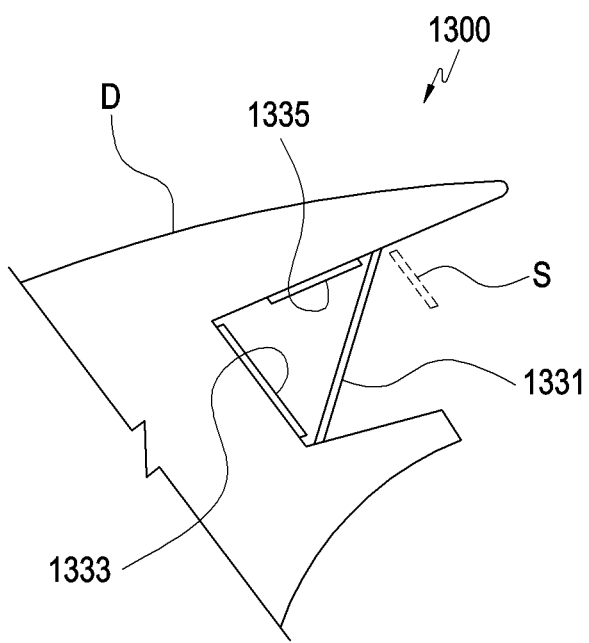
FIG. 13 is a cross-sectional view illustrating the configuration of an electronic device according to yet another one of various embodiments of the present disclosure.

FIG. 13 is a cross-sectional view illustrating the configuration of an electronic device 1300 according to another one of the various embodiments of the present disclosure.

Referring to FIG. 13, the electronic device 1300 may form a part or all of a dashboard D inside a vehicle. Although not illustrated, an information window may be disposed inside the dashboard D so as to display a speedometer, an RPM gauge, a fuel gauge, and vehicle status information. A protective window may be disposed on the front surface of the information window. The electronic device 1300 may form the protection window with a half mirror 1331.

According to various embodiments, the electronic device 1300 may include a retroreflective member 1333 and a display panel 1335. For example, inside the half mirror 1331, the retroreflective member 1333 and the display panel 1335 may be disposed to be inclined relative to each other and/or relative to the inner surface of the half mirror 1331. In one embodiment, the retroreflective member 1333 is disposed at an arbitrary position, such as the region between the speedometer and the RPM gauge, the region between the speedometer and the fuel gauge, or the like, so as to reflect an image and/the light amount reflected by the half mirror 133 to be incident on the half mirror 1331 again. In another embodiment, vehicle state information (e.g., an engine oil check lamp, an engine check lamp, a battery check lamp, etc.) may be replaced with an image output via the display panel 1335.

The display panel 1335 may output various pieces of information related to the vehicle operation in the form of an image. For example, information such as information on the amount of remaining fuel and corresponding gas station locations/prices, information on a scheduled destination arrival time input by the user, route and progress information to a destination, and various traffic conditions may be output. The image output through the display panel 1335 is reflected from the inner surface of the half mirror 1331 to be incident on the retroreflective member 1333. The retroreflective member 1333 reflects the incident image and/or the light amount so as to again be incident on the half mirror 1331. The half mirror 1331 may transmit at least a part of the image and/or the light amount reflected by the retroreflective member 1333 so that an aerial image can be formed in a space (e.g., an image-forming plane S) on the other side of the half mirror 1331. In one embodiment, the image-forming plane S may be positioned symmetrically to the display panel 1335 with respect to the half mirror 1331.

Figure 14:
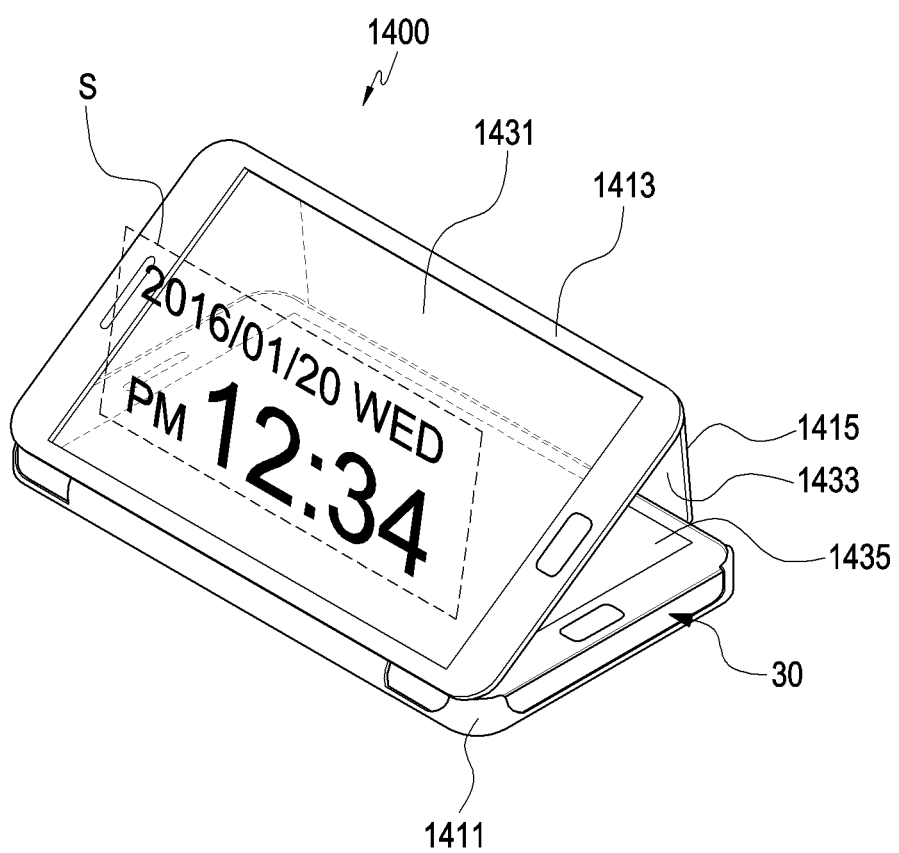
FIG. 14 is a perspective view illustrating a stereoscopic image device according to yet another one of various embodiments of the present disclosure.
Figure 15:
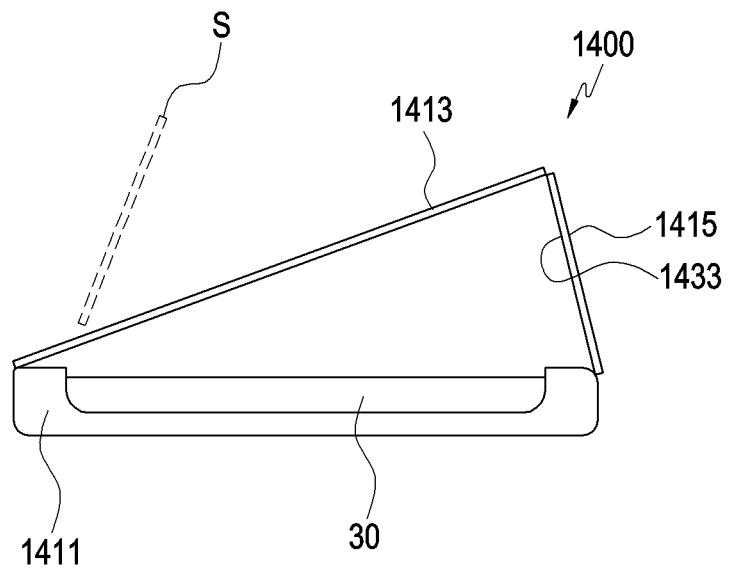
FIG. 15 is a side view illustrating the state in which a stereoscopic image device according to yet another one of various embodiments of the present disclosure operates.
Figure 16:
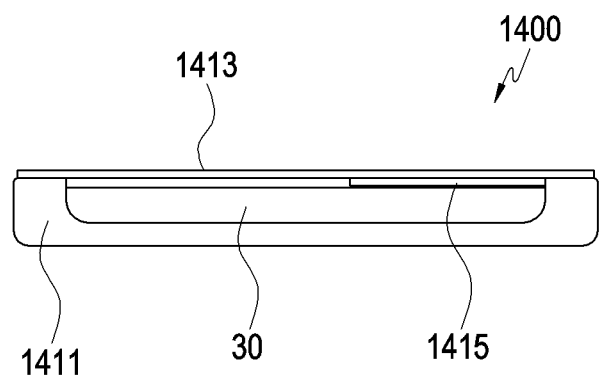
FIG. 16 is a side view illustrating the state in which a stereoscopic image device according to yet another one of various embodiments of the present disclosure is folded.

FIG. 14 is a perspective view illustrating a stereoscopic image device 1400 according to another one of the various embodiments of the present disclosure. FIG. 15 is a side view illustrating the state in which the stereoscopic image device 1400 according to another one of the various embodiments of the present disclosure operates. FIG. 16 is a side view illustrating the state in which the stereoscopic image device 1400, according to another one of the various embodiments of the present disclosure, is folded.

Referring to FIGS. 14-16, the stereoscopic image device 1400, according to various embodiments of the present disclosure, may take the form of a protective cover that is detachably provided in an electronic device 30 including a display panel 1435. For example, the stereoscopic image device 1400 may include a cover member 1411, a first flip cover 1413, and a second flip cover 1415.

In one embodiment, the cover member 1411 may be detachably provided on the rear surface of the electronic device 30 (e.g., the surface opposite the surface on which the display panel 1435 is mounted). For example, the cover member 1411 may be coupled to enclose at least a portion of each of the lateral and rear surfaces of the electronic device 30 so as to protect the electronic device 30 from an external impact or the like.

The first flip cover 1413 is rotatably coupled to one side of the cover member 1411, and part or all of the first flip cover 1413 may be formed of a half mirror 1431. In the state in which the cover member 1411 is coupled to the electronic device 30, the first flip cover 1413 is capable of opening/closing the front surface of the electronic device 30 (e.g., the display panel 1435) by rotating with respect to the cover member 1411. Even in the state in which the first flip cover 1413 closes the front surface of the electronic device 30, at least a part of an image output through the display panel 1435 can be seen through the half mirror 1431.

The second flip cover 1415 is rotatably coupled to the other end of the first flip cover 1413 such that the second flip cover 1415 can be folded to face the inner surface of the first flip cover 1413 or can be rotated to a position away from the inner surface of the first flip cover 1413. According to various embodiments, part or all of the second flip cover 1415 may be a retroreflective member 1433. In one embodiment, the retroreflective member 1433 may be a sheet and/or film attached to the inner surface of the second flip cover 1415. In another embodiment, in the state in which the first flip cover 1413 closes the front surface of the electronic device 30, the second flip cover 1415 is positioned between the electronic device 30 and the first flip cover 1413. For example, the first flip cover 1413 (and/or the half mirror 1431) can be folded to face the display panel 1435, with the second flip cover 1415 (and/or the retroreflective member 1433) interposed therebetween. 1411. For example, the first flip cover 1413 (and/or the half mirror 1431) can be folded to face the display panel 1435, with the second flip cover 1415 (and/or the retroreflective member 1433) interposed therebetween.

According to various embodiments, the other end of the second flip cover 1415 (and/or the retroreflective member 1433) may be supported and fixed to the other side of the cover member 1411. For example, as illustrated in FIG. 15, the other end of the second flip cover 1415 can be supported on one side of the electronic device 30 and/or on one side of the cover member 1411 in the state in which the second flip cover 1415 is rotated away from the inner surface of the first flip cover 1413. Because the second flip cover 1415 (and/or the retroreflective member 1433) is supported on and fixed to the other side of the cover member 1411, the first flip cover 1413 (and/or the half mirror 1431) may be disposed to be inclined with respect to the display panel 1435.

In the state in which the first flip cover 1413 (and/or the half mirror 1431) is disposed to be inclined with respect to the display panel 1435 and the second flip cover 1415 (and/or the retroreflective member 1433) is located at the other side of the cover member 1411, the stereoscopic image device 1400 (e.g., the protective cover of the electronic device 30) is capable of forming an image output through the display panel 1435 as an aerial image in the space outside the first flip cover 1413. The aerial image may vary depending on the operation mode of the electronic device 30 and the like. For example, when the electronic device 30 is in standby mode, information on the date, time, weather, etc. may be provided as an aerial image. When a message or the like is received in standby mode, the content of the received message may be provided as an aerial image. According to another embodiment, when the electronic device 30 is playing pack a multimedia file, information such as the author of the multimedia file, the title, or a video included in the multimedia file may be provided as an aerial image. In one embodiment, the aerial image may be formed at a position symmetrical to the display panel 1435 and/or a region where the display panel 1435 outputs an image with respect to the half mirror 1431.

According to various embodiments, the display panel 1435 may be a touch screen that incorporates a touch panel. When the display panel 1435 incorporates a touch panel and an aerial image formed outside the first flip cover 1413 is formed within a predetermined range, the electronic device 30 may include a proximity touch input function (e.g., hovering) using a combination of the display panel 1435 (e.g., the touch panel) and the aerial image. In another embodiment, when the electronic device 30 is further provided with a separate illumination device, the illumination device may illuminate a portion of the aerial image more brightly. For example, when the electronic device 30 is set such that proximity touch input (e.g., hovering) on a partial region of the aerial image is enabled, the illumination device may be used to more brightly illuminate the region where the proximity touch input (e.g., hovering) is enabled.

According to various embodiments, the input function, the operation mode switching function, and the like of the stereoscopic image device 1400 and/or the electronic device, as described above, may be provided by a combination of the aerial image and the various sensors provided in the stereoscopic image device and/or the electronic device. For example, when the electronic device 30 is equipped with a camera module, in the state in which an aerial image is formed, the camera module is capable of providing the basic information required for magnification and/or reduction of an output image by determining whether the user is approaching, whether the relative position of the user with respect to the electronic device 30 and/or the formed aerial image has changed, and so on.

Figure 17:
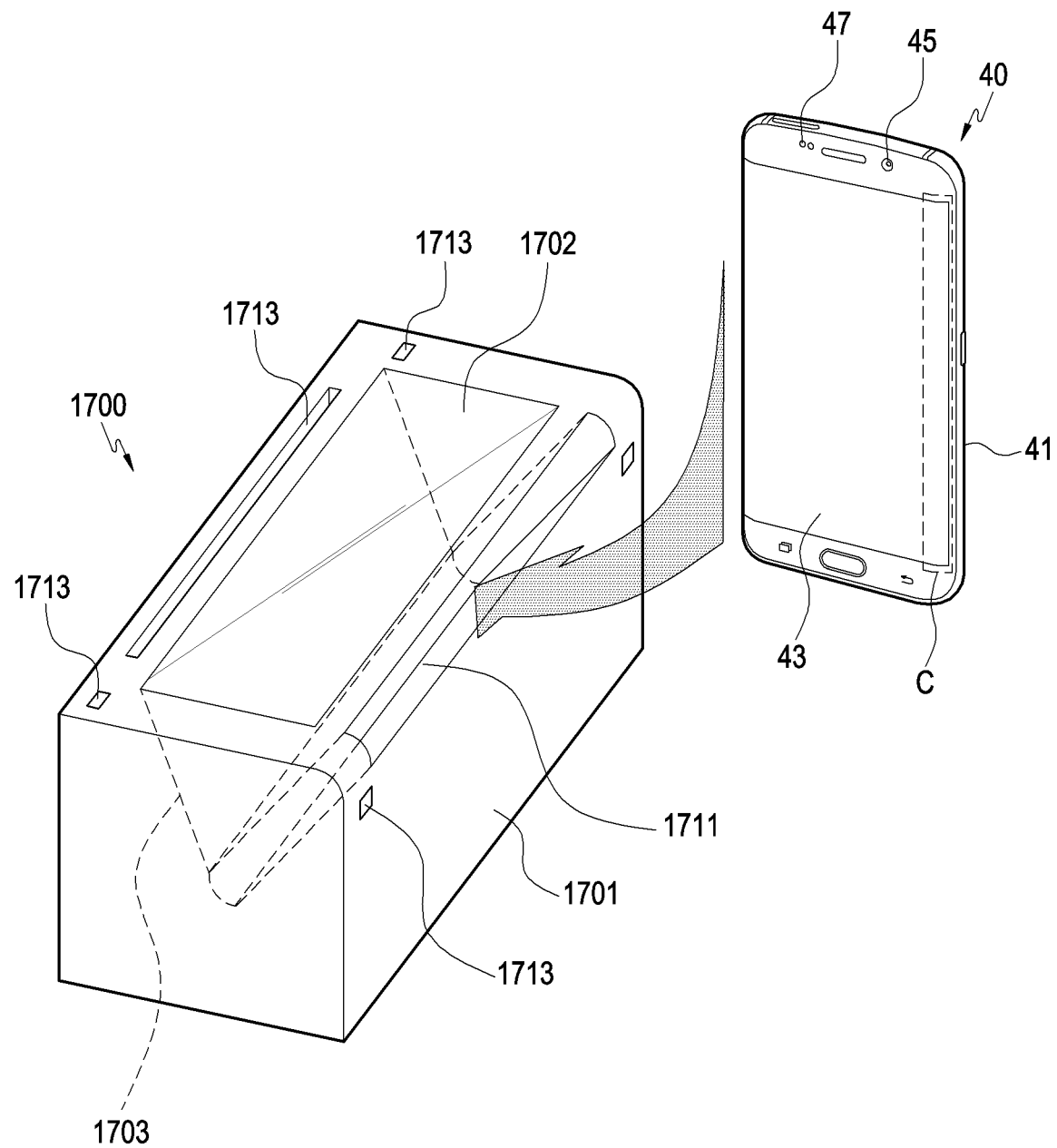
FIG. 17 is a perspective view illustrating a stereoscopic image device according to yet another one of various embodiments of the present disclosure.
Figure 18:
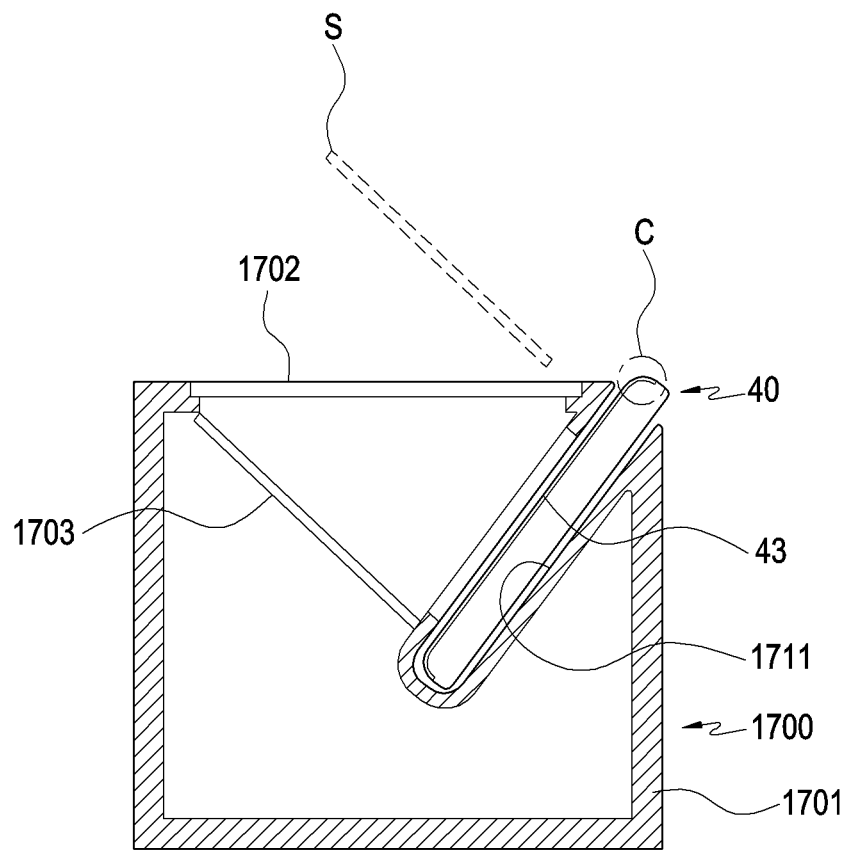
FIG. 18 is a cross-sectional view illustrating the configuration of a stereoscopic image device according to yet another one of various embodiments of the present disclosure.

FIG. 17 is a perspective view illustrating a stereoscopic image device 1700 according to another one of the various embodiments of the present disclosure. FIG. 18 is a cross-sectional view illustrating the configuration of the stereoscopic image device 1700 according to another one of the various embodiments of the present disclosure.

Referring to FIGS. 17 and 18, the stereoscopic image device 1700 according to another one of the various embodiments of the present disclosure may include a cradle 1701, a half mirror 1702, and a retroreflective member 1703.

In one embodiment, the cradle 1701 may provide a space, e.g., a slot 1711 configured to mount thereon an electronic device 40 including a display panel 43, and may include at least one sensor 1713. The sensor 1713 may include at least one of, for example, a camera module, an infrared sensor, a proximity sensor, and an illuminance sensor, and may be disposed at various positions on the cradle 1701. In some embodiments, the sensor(s) 1701 may detect the position of the user, the action of the user, etc. with respect to the cradle 1701, and may provide detected user position information and the like to the electronic device 40. For example, when a part of the user's body (e.g., a finger) has moved from a first position to a second position on the cradle 1701, the sensor(s) 1713 may detect the movement so as to provide information on the movement to the electronic device 40. The electronic device 40 is capable of executing a set command based on the received information (e.g., the information on the action of a part of the user's body). In another embodiment, the stereoscopic image device 1700 and/or the cradle 1701 may provide a wireless power transmission function, and when the electronic device mounted on the cradle 1701 is provided with a wireless power reception function, the battery or the like can be charged through the cradle 1701.

In some embodiments, the display panel 43 of the electronic device 40 may be disposed on the front side of the housing 41, and may include a curved region C in at least a portion thereof (e.g., at least one edge). In one embodiment, the electronic device 40 may further include a window member mounted on the housing 41, and the display panel 43 may be incorporated in the inner surface of the window member. However, in a specific embodiment of the present disclosure, the display panel 43 may include the window member, unless otherwise mentioned. In another embodiment, the curved region C may form a portion of a side surface of the electronic device 40 and/or the housing 41. A camera module 45, a proximity sensor, an illuminance sensor 47, and the like may be disposed on one side of the display panel 43 on the front surface of the housing 41. For example, sensors for detecting the usage environment of the electronic device 40 and/or the display panel 43 (e.g., the camera module 45, the proximity sensor, or the illuminance sensor 47) may be disposed in the periphery of the display panel 43. In some embodiments, when the touch panel is incorporated in the display panel 43, an image or icon representing a virtual keypad or various applications are capable of being output within the screen region of the display panel 43, and a desired function or command is capable of being executed through an action such as touching the image or icon. In addition, the electronic device 40 may include various input/output devices such as a keypad, a microphone, and a speakerphone, but a detailed description thereof will be omitted.

According to various embodiments, the half mirror 1702 may be mounted on one surface of the cradle 1701, for example, the top surface of the cradle 1701. When the electronic device 40 is mounted in the slot 1711, the display panel 43 may be inclined with respect to the half mirror 1702. The half mirror 1702 is capable of transmitting a part of incident light and reflecting the other part of the incident light.

According to various embodiments, the retroreflective member 1703 may be inclined with respect to the half mirror 1702 on the cradle 1701, for example, inside the mount 1701, and is capable of reflecting the incident light in the incident direction of the light. For example, the direction of light incident on the retroreflective member 1703 may be at least partially parallel to the advancing direction of the light reflected by the retroreflective member 1703. In some embodiments, the retroreflective member 1703 may be disposed to be inclined with respect to the display panel 43. For example, the retroreflective member 1703 and the display panel 43 of the electronic device 40 mounted in the slot 1711 are inclined with respect to each other and/or with respect to the half mirror 1702.

According to various embodiments, at one side of the half mirror 1702, an image output from the display panel 43 (hereinafter, referred to as a "first output image") may be reflected by the half mirror 1702 so as to be incident on the retroreflective member 1703. The retroreflective member 1703 may reflect light incident thereon (e.g., the first output image of the display panel 43) so as to be incident on the half mirror 1702, and the light incident on the half mirror 1702 from the retroreflective member 1703 may be transmitted through the half mirror 1702 so as to form the first aerial image at the other side of the half mirror 1702. In one embodiment, the first aerial image may be formed symmetrically to the display panel 43 with respect to the half mirror 1702.

According to various embodiments, when the electronic device 40 is mounted on the cradle 1701, e.g., in the slot 1711, at least a portion of the electronic device 40 may be exposed to the outside. For example, when the electronic device 40 is mounted in the slot 1711, at least the curved region C of the display panel 43 may be exposed to the outside. For example, when the electronic device 40 is mounted in the slot 1711, the curved region C may be exposed such that it is adjacent to the half mirror 1702 and/or adjacent to the image-forming plane S and/or the image-forming region on which the first aerial image is formed. When the touch panel is incorporated in the display panel 43, the user is capable of performing various touch inputs in a region exposed to the outside of the cradle 1701 (e.g., the curved region C) even in the state in which the electronic device is mounted on the cradle 1701. The first output image may be converted according to the user's input action, and the first aerial image may also be converted depending on the first output image.

In one embodiment, the stereoscopic image device 1700 may detect the user's movement around the cradle 1701 and/or the user's action on the first aerial image-forming plane S (and/or the image-forming region) through the sensor (2) 1713. Information on the user's action or the like may be provided to the electronic device 40. For example, the stereoscopic image device 1700 may be connected to the electronic device 40 in a wired manner or wireless manner using, for example, Bluetooth or NFC. The stereoscopic image device 1700 may detect the user's action or the like in the vicinity of the cradle 1701 and may provide information related to the user's action or the like to the electronic device 40. The sensor(s) 1713 may detect the user's action such as touch, push, pinch, drag, grip, stretch, pick up and drop, throw, lift, poke, or the like with respect the first aerial image on the image-forming plane S of the first aerial image, and/or an action in which two or more of the above-listed actions are combined. The electronic device 40 may include a command or an application corresponding to a user's action and may execute, based on information provided from the stereoscopic image device 1700 (information on the user's action), a command or an application corresponding to the information.

Figure 19:
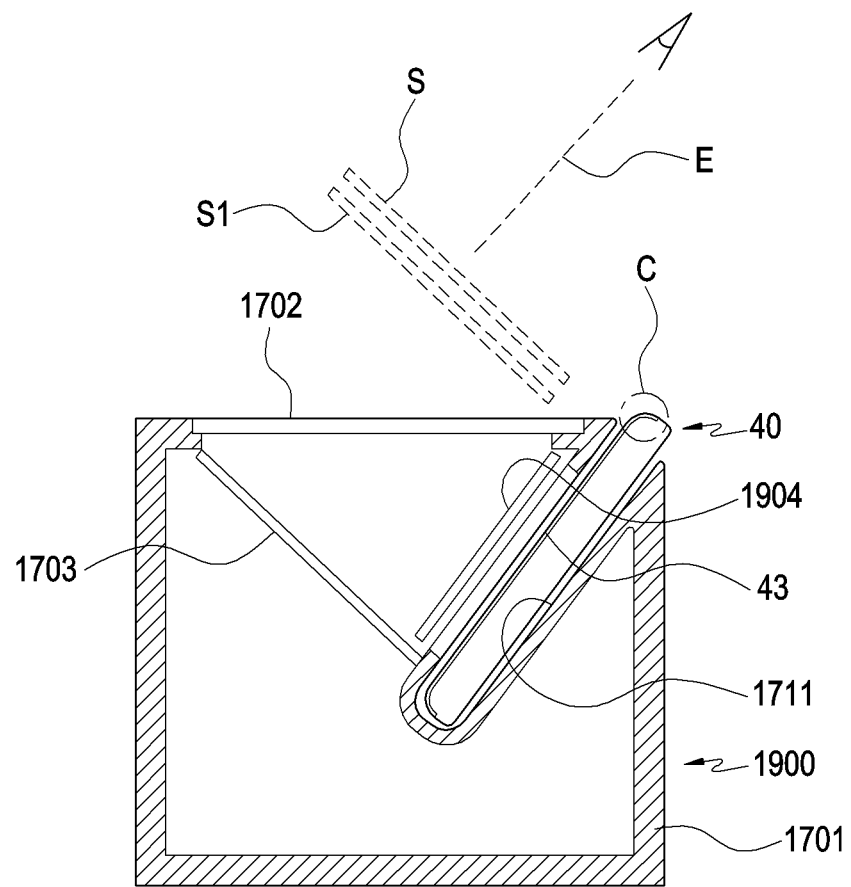
FIG. 19 is a cross-sectional view illustrating the configuration of a modified example of a stereoscopic image device according to yet another one of various embodiments of the present disclosure.

FIG. 19 is a cross-sectional view illustrating the configuration of a modified example of a stereoscopic image device 1900, according to another one of the various embodiments of the present disclosure.

The configuration of the stereoscopic image device 1900 illustrated in FIG. 19 may be different from that of the previous embodiments in that the stereoscopic image device 1900 further includes a display device 1904. Thus, in describing the present embodiment, the constituent elements that can be easily understood through the preceding embodiments may be denoted by the same reference numerals, or the reference numerals may be omitted. The descriptions of the constituent elements may also be omitted.

Referring to FIG. 19, the stereoscopic image device 1900 may include the display device 1904 mounted adjacent to the slot 1711 in which the electronic device 40 is mounted. The display device 1904 may be disposed in a manner such that one side thereof is disposed adjacent to the half mirror 1702 and the other side thereof is disposed adjacent to the retroreflective member 1703, and such that the display device 1904 is disposed so that it is inclined with respect to the half mirror 1702 and/or the retroreflective member 1703. An image output from the display device 1904 (hereinafter, referred to as a "second output image") may be reflected by the half mirror 1702 so as to be incident on the retroreflective member 1703, and the retroreflective member 1703 may reflect the incident image back to the half mirror 1702. The half mirror 1702 may transmit the image reflected by the retroreflective member 1703 so as to form an image in the space at the other side of the half mirror 1702, for example, in a space outside the stereoscopic image device 1900. Hereinafter, an image formed in the space at the other side of the half mirror 1702 to correspond to the second output image will be referred to as a "second aerial image".

According to various embodiments, when the electronic device 40 is mounted in the slot 1711, the display device 1904 may be disposed to overlap the display panel 43 of the electronic device 40. In one embodiment, the display device 43 may at least partially transmit the first output image output from the display panel 43. For example, the first output image may be formed as a first aerial image in the space at the other side of the half mirror 1702 by being sequentially reflected by the half mirror 1702 and the retroreflective member 1703 and the being transmitted again through the half mirror 1702. When viewed in the user's visual line E, the first aerial image and the second aerial image may at least partially overlap each other. Here, the term "overlap" means that, when viewed by the user, the respective regions in which the first aerial image and the second aerial image are displayed at least partially overlap, and 1) the respective image-forming planes S and S1 of the first aerial image and the second aerial image coincide with each other, or 2) the respective image-forming planes S and S1 of the first aerial image and the second aerial image are at different distances from the user's eye.

According to various embodiments, the first aerial image and/or the second aerial image may include an image or icon containing the meaning of an instruction or application provided in the electronic device 40, and the user may perform various actions in the image-forming planes S and S1 (and/or an image-forming region) of the first aerial image and/or the second aerial image. For example, the user may perform an action of touching, gripping/stretching, or picking up and dropping the icon or the like included in the first aerial image and/or the second aerial image. In one embodiment, the stereoscopic image device 1900 may detect the user's action through various sensors (e.g., sensors 1713 in FIG. 17) installed in the cradle 1701 and may provide information related to the user's action to the electronic device 40. The electronic device 40 is capable of executing a command or an application corresponding to the user's action based on the information provided by the stereoscopic image device 1900.

According to various embodiments, when the electronic device 40 is mounted in the slot 1711, a partial region of the display panel 43 in which the touch panel is incorporated (e.g., the above-mentioned curved region C) may be exposed adjacent to one side of the half mirror 1702. The user is capable of executing a command or an application provided in the electronic device 40 by directly manipulating (e.g., touching, dragging, or pinching) the curved region C. The images output through the display device 1904 and/or the display panel 43 (e.g., the first output image and/or the second output image) can be converted according to the user's action in the image-forming planes S and S1 of the first aerial image and/or the second aerial image or the user's manipulation in the curved region C. When the first output image and/or the second output image are converted, the corresponding first aerial image and/or second aerial image may also be converted.

In one embodiment, the second output image is output independently of the first output image but may include image information related to the first output image. For example, when music is being played back through the electronic device 40, the first output image may include an image corresponding to the music which is being played back, and the second output image may include information about the music which is being played back (e.g., a player, a conductor, a singer, the release year, etc.). In a partial region of the second output image, icons of various functions required for music playback (e.g., play, pause, rewind, fast forward, etc.) may be included. In another embodiment, the second output image may include the same image information as the first output image. For example, the second output image is capable of improving the resolution of aerial images directly viewed by the user (e.g., the first aerial image and/or the second aerial image) by including the same image information as the first output image.

Figure 20:
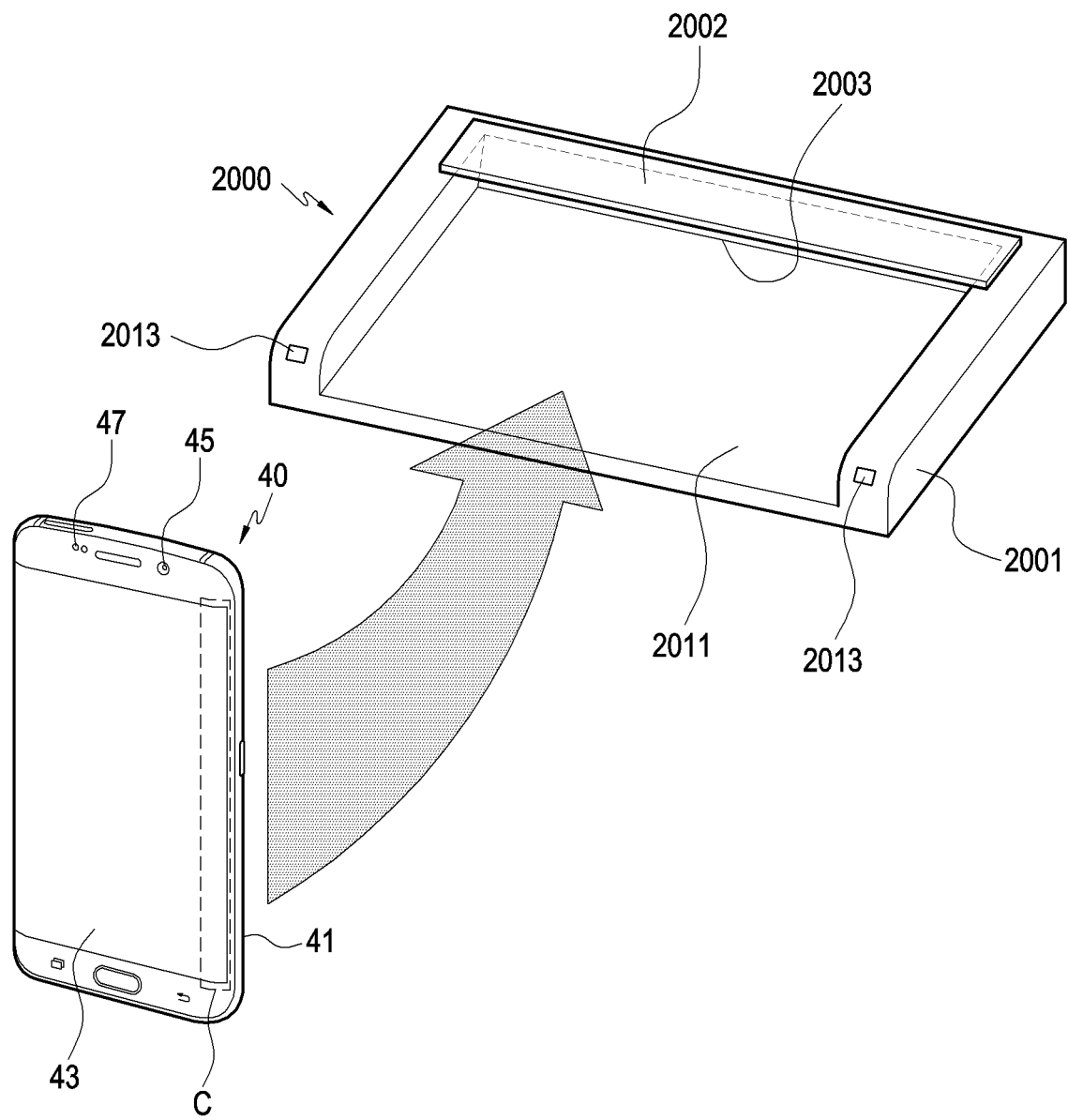
FIG. 20 is a perspective view illustrating a stereoscopic image device according to yet another one of various embodiments of the present disclosure.
Figure 21:
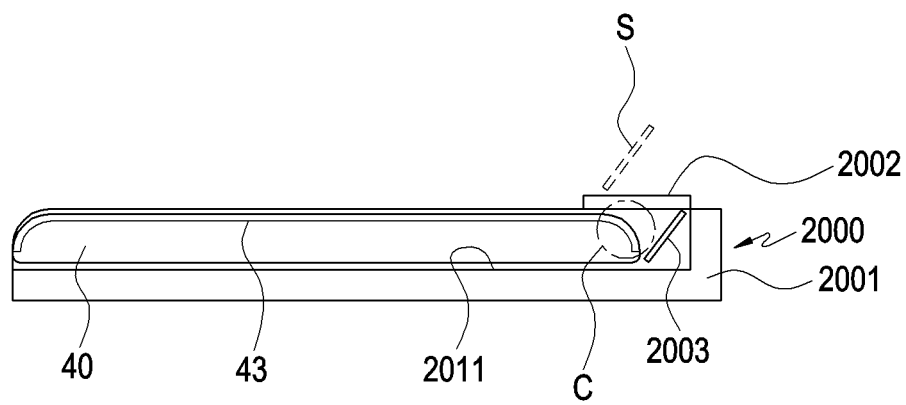
FIG. 21 is a cross-sectional view illustrating the configuration of a stereoscopic image device according to yet another one of various embodiments of the present disclosure.

FIG. 20 is a perspective view illustrating a stereoscopic image device 2000 according to another one of the various embodiments of the present disclosure. FIG. 21 is a cross-sectional view illustrating the configuration of the stereoscopic image device 2000 according to another one of the various embodiments of the present disclosure.

In describing the stereoscopic image device of the present embodiment, the configuration of the electronic device mounted on the stereoscopic image device 2000 can be easily understood through the electronic device of the preceding embodiments (e.g., the electronic device of FIG. 17). The constituent elements will be denoted by the same reference numerals in the drawings or will be omitted, and a detailed description thereof will be omitted.

Referring to FIGS. 20 and 21, the stereoscopic image device 2000 may include a cradle 2001, a half mirror 2002, and a retroreflective member 2003, and may form an image, which is output from the electronic device 40 (e.g., the display panel 43) mounted on the cradle 2001, as an aerial image.

According to various embodiments, the cradle 2001 may include a mounting recess 2011 formed in one surface thereof (e.g., the top surface) so as to mount the electronic device 40 therein. For example, the electronic device 40 may be mounted on the stereoscopic image device 2000 such that it is accommodated in the mounting recess 2011. In one embodiment, at least one sensor 2013 may be mounted in the vicinity of the mounting recess 2011, and the sensor 2013 may include at least one of a camera module, an infrared sensor, a proximity sensor, and an illuminance sensor. In one embodiment, the sensor 2013 may detect the use environment of the stereoscopic image device 2000, or may detect the user's action in the vicinity of the cradle 2001. Information detected through the sensor 2013 may be provided to the electronic device 40 mounted on the cradle 2001, and the electronic device 40 may change the operation mode or the output setting of the image, sound, or the like based on the information detected through the sensor 2013. In another embodiment, the stereoscopic image device 2000 and/or the cradle 2001 may provide a wireless power transmission function, and when the electronic device 40 includes a wireless power reception function, the electronic device 40 is capable of being provided with charging power through the stereoscopic image device 2000.

According to various embodiments, the half mirror 2002 may be disposed to cover a portion of the mounting recess 2011 at one side edge of the mounting recess 2011. The retroreflective member 2003 may be disposed between the bottom surface of the mounting recess 2011 and the half mirror 2002 so as to be inclined with respect to the half mirror 2002. In one embodiment, when the electronic device 40 is mounted in the mounting recess 2011, the curved region C of the display panel 43 may be disposed adjacent to the half mirror 2002 and/or the retroreflective member 2003. For example, the curved region C and the retroreflective member 2003 may be inclined with respect to each other and/or with respect to the half mirror 2002. In one embodiment, when the electronic device 40 is mounted in the mounting recess 2011, the other region of the display panel 43 may be exposed to one side of the half mirror 2002.

According to various embodiments, in the state in which the electronic device 40 is mounted in the mounting recess 2011, the output image of the curved region C may be sequentially reflected by the half mirror 2002 and the retroreflective member 2003, and may then be transmitted through the half mirror 2002 to be formed as an aerial image in the space outside the half mirror 2002 (and/or a virtual plane S inclined relative to the half mirror outside the half mirror 2002). The aerial image may include various pieces of information such as the remaining charge of the battery of the electronic device 40, the current time, weather information, whether a message is received, and the various information of the received message.

In some embodiments, when the user approaches the stereoscopic image device 2000 and/or the electronic device 40, the sensor(s) 2013 may sense the user's approach, and the stereoscopic image device 2000 may provide the electronic device 40 with information regarding the user's approach. Based on the information on the user's approach, the electronic device 40 may display an icon corresponding to a preset command or application in the curved region C and/or another region (e.g., a region of the display panel 43 exposed to one side of the half mirror 2002). In another embodiment, the electronic device 40, which recognizes that the user is approaching, may display icons related to instructions or applications expected to be executed by the user (e.g., message confirmation, detailed information about weather, a multimedia function such as playback of music or a video, etc.) in the curved region C and/or another region. For example, when the user recognizes the reception of a message via the aerial image and approaches the stereoscopic image device 2000, the electronic device may display the content of the message received through the curved region C and/or the aerial image, and may display an input device capable of preparing a response message, such as a keypad, in another region (e.g., the region of the display panel 43 exposed to one side of the half mirror 2002).

As described above, the stereoscopic image device (e.g., the stereoscopic image device of FIGS. 17 to 20) according to the various embodiments of the present disclosure is capable of providing various user experiences in the state in which the electronic device including a display panel is mounted thereon.

Figure 22:
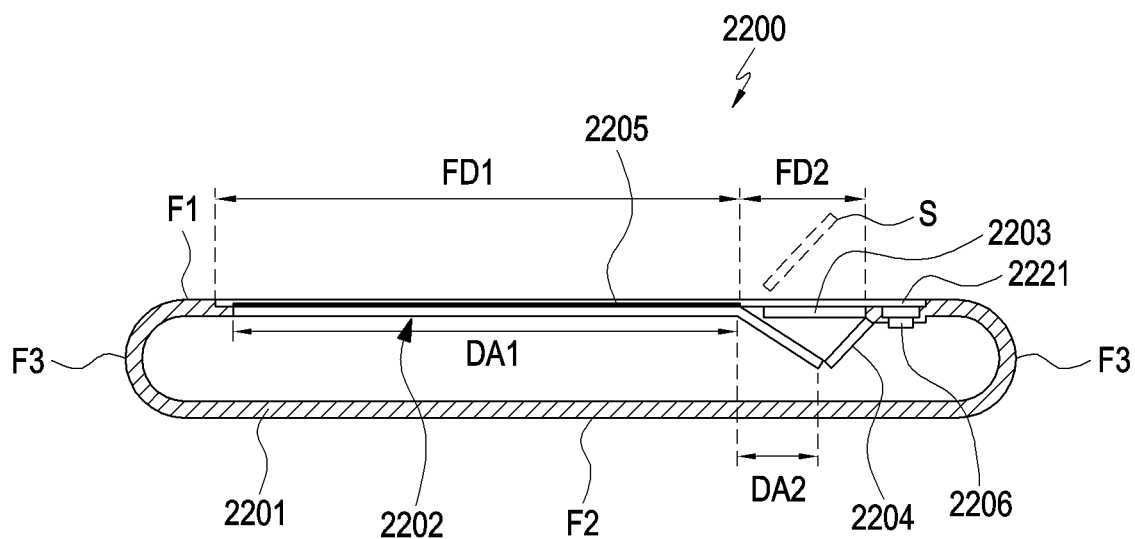
FIG. 22 is a cross-sectional view illustrating the configuration of an electronic device (including a stereoscopic image device) according to still another one of various embodiments of the present disclosure.

FIG. 22 is a cross-sectional view illustrating the configuration of an electronic device 2200 (including a stereoscopic image device) according to another one of the various embodiments of the present disclosure.

Referring to FIG. 22, the electronic device 2200 may include a housing 2201, a display panel 2202, a half mirror 2203, and/or a retroreflective member 2204.

According to various embodiments, the housing 2201 may include a front surface F1, a rear surface F2 opposite the front surface H, and a side wall F3 partially enclosing a space between the front surface F1 and the rear surface F2. The main circuit board, a support member, a battery, and the like (not illustrated) may be accommodated in the inner space of the housing 2201. A window member 2221 is mounted on the front surface of the housing 2201 in order to transmit an image output from the display panel 2202 and to isolate and protect the display panel 2202 from the external environment. For example, the housing 2201 may generally be made of a synthetic resin or metal, and a portion of the front surface may be made of the window member 2221, which is transparent. According to various embodiments of the present disclosure, a touch panel may be provided between the half mirror 2203 and the window member. The touch panel may sense various kinds of user input, such as a user's touch input and a proximity touch input (e.g., hovering).

According to various embodiments, the display panel 2202 may include a first display area DA1 and a second display area DA2. The first display area DA1 may be disposed to face the inner surface of the window member 2221 so as to correspond to a first area FD1 of the front surface F1, and the second display area DA2 may extend to be inclined from the first display area DA1 so as to be positioned inside the housing 2201. For example, the display panel 2202 is a bent and/or flexible panel, and may include an (Active Matrix) Organic Light-Emitting Diode ((AM) OLED) panel. In some embodiments, the electronic device 2200 may further include a touch panel 2205 incorporated in the display panel 2202. For example, the touch panel 2205 may be disposed to correspond to the first area FD1 and/or the first display area DA1.

In the present embodiment, an example in which the first display area DA1 and the second display area DA2 are set as different areas of the display panel 2202 is disclosed, but the present disclosure is not limited thereto. For example, although not illustrated, the display panel 2202 may include a first display panel corresponding to the first area FD1 and a second display panel independent of the first display panel, which may be disposed such that it is inclined inside the housing 2201. For example, an electronic device (e.g., the electronic device 2200), according to various embodiments of the present disclosure, may include a plurality of display panels independent of each other, which may be disposed to correspond to the first display area DA1 and the second display area DA2, respectively.

According to various embodiments, the half mirror 2203 may be disposed on the front surface of the housing 2201 and/or the front surface of the electronic device 2200 in a second area FD2 different from the first area FD1. For example, the half mirror 2203 may be disposed to face the window member 2221 in the second area FD2, and the second display area DA2 may be disposed such that it is inclined with respect to the half mirror 2203. In one embodiment, the retroreflective member 2204 may be disposed such that it is inclined with respect to the half mirror 2203 inside the housing 2201. For example, one side of the retroreflective member 2204 may be disposed adjacent to the end of the display panel 2202 (e.g., the second display area DA2), and the other side may be disposed adjacent to the half mirror 2203.

The electronic device 2200 may reflect an output image of the second display area DA2 by the half mirror 2203 so as to be incident on the retroreflective member 2204, and may transmit the light reflected by the retroreflective member 2204, thereby forming an aerial image corresponding to the output image in the space outside the housing 2201. The aerial image formed through the electronic device 2200 and/or the information included in the aerial image may be easily understood through the above-described embodiments.

In some embodiments, the half mirror 2203 may be replaced by an Aerial Imaging Plate (AIP) element and/or a Dihedral Corner Reflector Array (DCRA) element. The AIP element or the DCRA element itself is capable of forming an aerial image corresponding to an output image of the second display area DA2. For example, when the half mirror 2203 is replaced with the AIP element or the DCRA element, the retroreflective member 2204 is not necessarily installed.

According to various embodiments, the electronic device 2200 may further include at least one sensor 2206, and may detect the user's movement, action, or the like in the image-forming plane S (and/or the image-forming region) through the sensor(s) 2206. The sensor 2206 may include at least one of, for example, a camera module, an infrared sensor, a proximity sensor, and an illuminance sensor. The electronic device 2200 may execute a corresponding command or application based on information about the user's movement or the like detected from the sensor(s) 2206. For example, the electronic device 2200 may perform various input operations by sensing the approach, contact, movement, or the like of an object on the image-forming plane S of the aerial image, and when the touch panel 2205 is incorporated in the display panel 2202, the electronic device 2200 may perform various touch input operations through the display panel 2202 as well.

Figure 23:
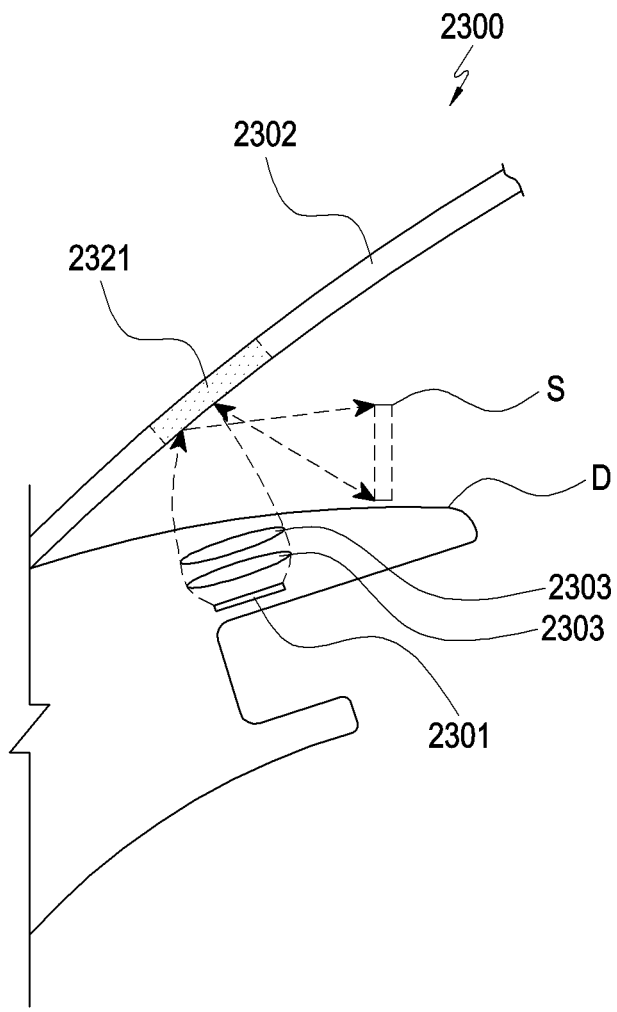
FIG. 23 is a cross-sectional view illustrating the configuration of an electronic device according to yet another one of various embodiments of the present disclosure.

FIG. 23 is a cross-sectional view illustrating the configuration of an electronic device 2300 according to another one of the various embodiments of the present disclosure.

The stereoscopic image device and/or the electronic device 2300, according to various embodiments of the present disclosure, may form a part or all of a dashboard D inside a vehicle, and may form an aerial image between the windshield 2302 and the driver of the vehicle due to the inclusion of a display panel 2301 and a half mirror 2321.

In the state of being disposed to be inclined with respect to the windshield 2302, the display panel 2301 may be disposed on the dashboard D or embedded in the dashboard D, and may output various pieces of information related to vehicle driving (e.g., speed, engine temperature, external temperature, vehicle progress information, etc.) as an image. A partial region or the entire region of the windshield 2302 may be formed by the half mirror 2321 and may reflect an output image of the display panel 2301 so as to form an aerial image on the dashboard D. For example, the aerial image may correspond to an output image of the display panel 2301. In some embodiments, the image-forming plane S of the aerial image may be formed between the windshield 2302 and the driver.

According to various embodiments, the electronic device 2300 may further include at least one relay lens 2303 disposed between the display panel 2301 and the windshield 2302. The relay lens 2303 may change the path or magnify/reduce the size of an output image of the display panel 2301 so as to cause the output image of the display panel 2301 to progress to a region where the half mirror 2321 is formed. The windshield 2302 (e.g., the region formed by the half mirror 2321) may reflect an image incident thereon so as to form an aerial image corresponding to the output image on the image-forming plane S. In one embodiment, when the electronic device 2300 includes the relay lens(es) 2303, the display panel 2301 and the aerial image may be disposed asymmetrically to each other with respect to the half mirror 2321 (and/or an optical axis perpendicular to one surface of the half mirror 2321).

According to various embodiments of the present disclosure, a stereoscopic image device may include:
- a cradle configured to mount thereon the electronic device including a display panel;
- a half mirror disposed on one surface of the cradle to face the display panel of the electronic device mounted on the cradle in an inclined state with respect to the display panel; and
- a retroreflective member disposed on the cradle such that it is inclined with respect to the half mirror.

The half mirror may reflect an image output from the display panel (hereinafter, referred to as a "first output image") to be incident on the retroreflective member and may transmit an image reflected by the retroreflective member,
- so as to form an image (hereinafter, referred to as a "first aerial image") corresponding to the first output image in a space at the other side of the half mirror.

According to various embodiments, the cradle may be provided as a cover member detachably provided to the electronic device on a surface opposite the display panel, one end of the half mirror may be rotatably coupled to one side of the cover member, and one end of the retroreflective member may be rotatably coupled to the other end of the half mirror.

According to various embodiments, in the state in which the cover member is coupled to the electronic device, 1) the half mirror may be folded to face the display panel with the retroreflective member interposed therebetween, and 2) the other end of the retroreflective member may be supported on the other side of the cover member, and the half mirror may be disposed such that it is inclined with respect to the display panel.

According to various embodiments, the electronic device may further include a touch panel incorporated in the display panel, and the stereoscopic image device may form the first aerial image in a region where the touch panel detects a proximity touch input (e.g., hovering).

According to various embodiments, the electronic device may further include a touch panel incorporated in the display panel, and the stereoscopic image device may expose a partial region of the display panel at one side of the half mirror.

According to various embodiments, the electronic device may include a curved region forming at least a portion of a side surface of the electronic device as a portion of the display panel, and in the state in which the electronic device is mounted on the cradle, the stereoscopic image device may expose at least the curved region to the one side of the half mirror.

According to various embodiments, the stereoscopic image device may form the first aerial image so as to be adjacent to the curved region.

According to various embodiments, the electronic device may include a curved region forming at least a portion of a side surface of the electronic device as a portion of the display panel, and in the state in which the electronic device is mounted on the cradle, the stereoscopic image device may form an image output through at least the curved region as the first aerial image and may expose another region of the display panel to the one side of the half mirror.

According to various embodiments, the stereoscopic image device may further include a first sensor configured to detect a user position with respect to the first aerial image and may provide information on the user position detected through the first sensor to the electronic device mounted on the cradle.

According to various embodiments, the first sensor may include at least one of a camera module, an infrared sensor, a proximity sensor, and an illuminance sensor.

According to various embodiments, the cradle may provide a wireless power transmission function.

According to various embodiments, the stereoscopic image device may further include a display device disposed on the cradle such that it is inclined with respect to the half mirror. The display device may be disposed in such a manner that one side thereof is placed adjacent to the half mirror and the other side is placed adjacent to the retroreflective member, and
- the half mirror may reflect an image output from the display device (hereinafter, referred to as a "second output image") to be incident on the retroreflective member, and may transmit an image reflected by the retroreflective member,
- so as to form an image (hereinafter, referred to as a "second aerial image") corresponding to the second output image in a space at the other side of the half mirror.

According to various embodiments, the display device may be disposed to overlap the display panel of the electronic device mounted on the cradle and may transmit at least a part of the first output image.

According to various embodiments, the stereoscopic image device may form the first aerial image and the second aerial image such that they overlap each other.

An electronic device according to various embodiments of the present disclosure may include part or all of the stereoscopic image device described above.

For example, the electronic device may include: a housing including a front surface, a rear surface opposite the front surface, and a side wall formed so as to at least partially enclose a space between the front surface and the rear surface;
- a display panel including a first display area disposed in a first area of the front surface and a second display area extending obliquely from the first display area to be positioned inside the housing;
- a half mirror disposed in a second area of the front surface and adjacent to the second display area; and
- a retroreflective member disposed inside the housing so as to be inclined with respect to the half mirror.

The half mirror may reflect an image output from the second display area (hereinafter, referred to as an "output image") to be incident on the retroreflective member and may transmit an image reflected by the retroreflective member, so as to form an aerial image corresponding to the image in a space outside the housing.

According to various embodiments, the electronic device may further include a touch panel incorporated in the display panel in at least the first display area.

According to various embodiments, the electronic device may further include a first sensor disposed on the front surface of the housing, and the first sensor may detect the approach, touch, or movement of an object with respect to a plane or space where the aerial image is formed.

According to various embodiments, the first sensor may include at least one of a camera module, an infrared sensor, a proximity sensor, and an illuminance sensor.

According to various embodiments, a stereoscopic image device may include a display panel mounted on or in the dashboard of a vehicle and a windshield of which at least a partial region is disposed on the dashboard.

The windshield may reflect an image output from the display panel so as to form an aerial image on the dashboard.

According to various embodiments, at least a partial region of the windshield may be formed as a half mirror, and the region formed as the half mirror may reflect the image output from the display panel.

According to various embodiments, the stereoscopic image device may further include at least one relay lens disposed between the display panel and the windshield, and the relay lens may cause the image output from the display panel to be incident on the region formed as the half mirror.

Figure 24A:
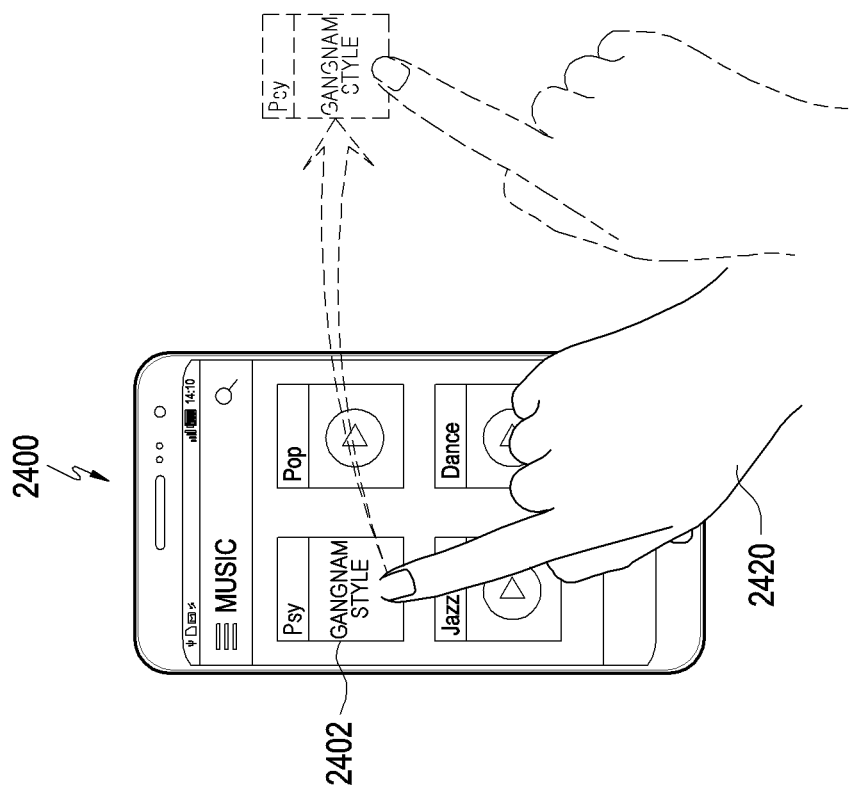
FIGS. 24A and 24B are views for explaining functions or operations for transmitting (in other words, moving) a specific (certain) object to an electronic device according to various embodiments of the present disclosure or functions or operations for executing the specific object through the electronic device.
Figure 24B:
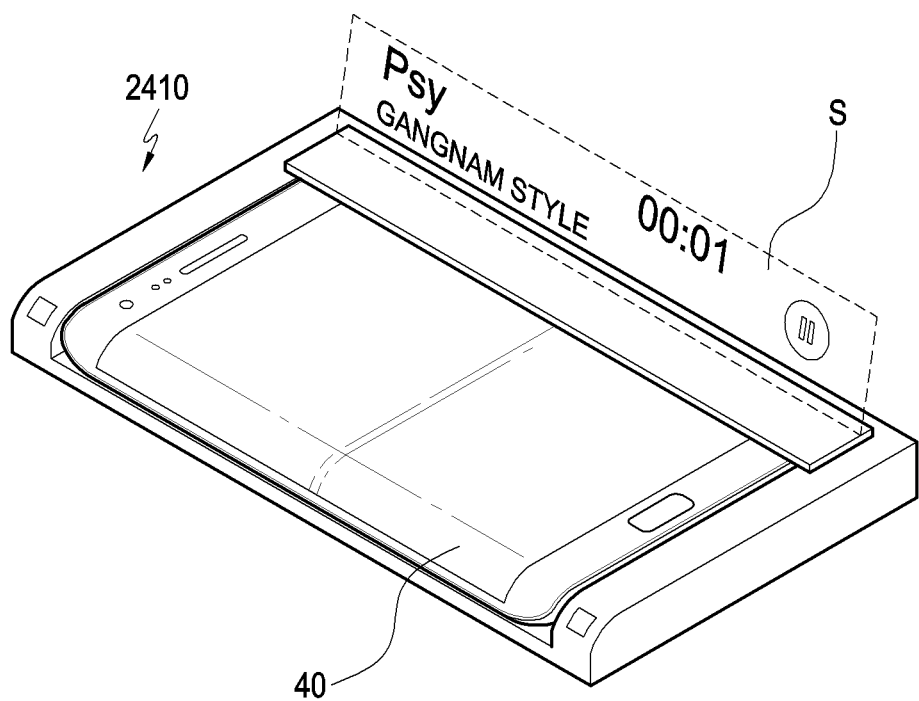

FIGS. 24A and 24B are views for explaining functions or operations for transmitting (in other words, moving) a specific (certain) object to an electronic device according to various embodiments of the present disclosure or functions or operations for executing the specific object through the electronic device.

The embodiments, which are illustrated in FIGS. 24A to 31D and will be described below, are illustrated by way of example on the stereoscopic image device illustrated in FIGS. 20 to 23. According to various embodiments of the present disclosure, the embodiments illustrated in FIGS. 24A to 31D may be executed based on the stereoscopic image devices/electronic devices according to various embodiments of the present disclosure illustrated in FIGS. 1 to 19.

Referring to FIG. 24A, a stereoscopic image device 2410 according to various embodiments of the present disclosure may be coupled with the electronic device 40 so as to provide an aerial image. The electronic device 40 may receive data related to a specific object directly from an external electronic device 2400 connected to the electronic device 40 through wired communication or wireless communication. Alternatively, according to various embodiments of the present disclosure, the electronic device 40 may receive the data related to the specific object from a data server (not illustrated) connected to the electronic device 40 and the external electronic device 2400. When receiving the data related to the specific object from the external electronic device 2400 or the data server, the electronic device 40 may control the specific object according to an attribute of the specific object. For example, when the specific object is a "music file 2402" as illustrated in FIG. 24A, the electronic device 40 may receive data related to the music file 2402 from the external electronic device 2400 or the data server, and may then execute (in other words, playback) the received music file. When the music file 2402 is executed, various pieces of information such as artist information, title information, and the playback time of the music file 2402 may be provided to the user as an aerial image on the image-forming plane S. According to various embodiments, the specific object may be a playlist (not illustrated). FIGS. 24A and 24B illustrate the state in which one electronic device 40 is connected to the external electronic device 2400 as an example. According to various embodiments of the present disclosure, transmission of the specific object may be performed or triggered according to a user's input, such as a drag gesture in a specific direction, as illustrated in FIG. 24A as an example. The specific direction is not limited to the direction in which the electronic device 40 or the stereoscopic image device 2410 is located, and may include any direction. According to various embodiments, when user input is performed in the direction from external electronic device 2400 to electronic device 40, the specific object may be transmitted. In another embodiment, when user input is performed in a direction opposite the direction from external electronic device 2400 to electronic device 40, the specific object already transmitted to the electronic device 40 may be deleted.

Figure 25A:
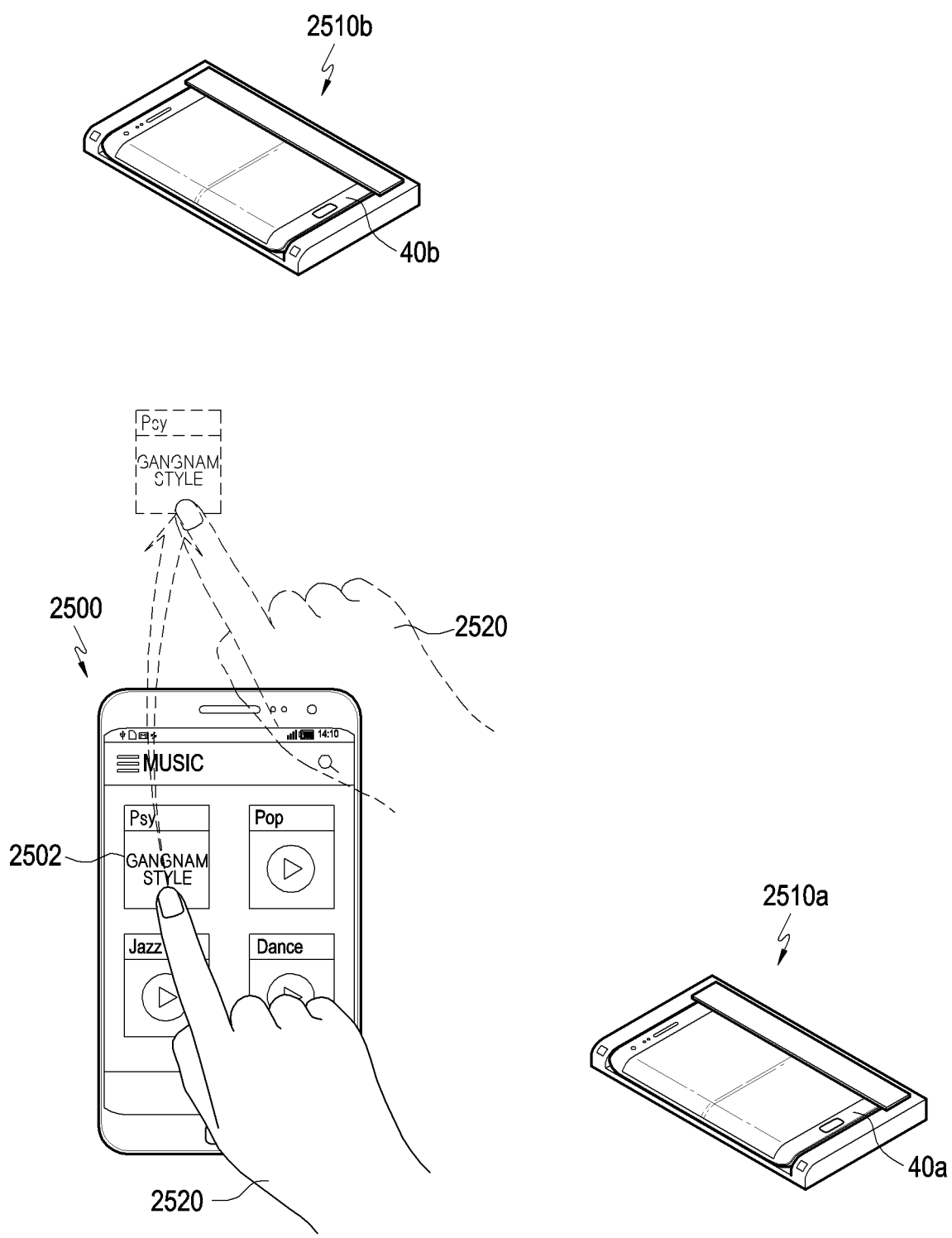
FIGS. 25A and 25B are views for explaining functions or operations for transmitting a specific object to a plurality of electronic devices according to various embodiments of the present disclosure or functions or operations for executing the specific object through the electronic devices in the case where there are a plurality of electronic devices according to various embodiments of the present disclosure.
Figure 25B:
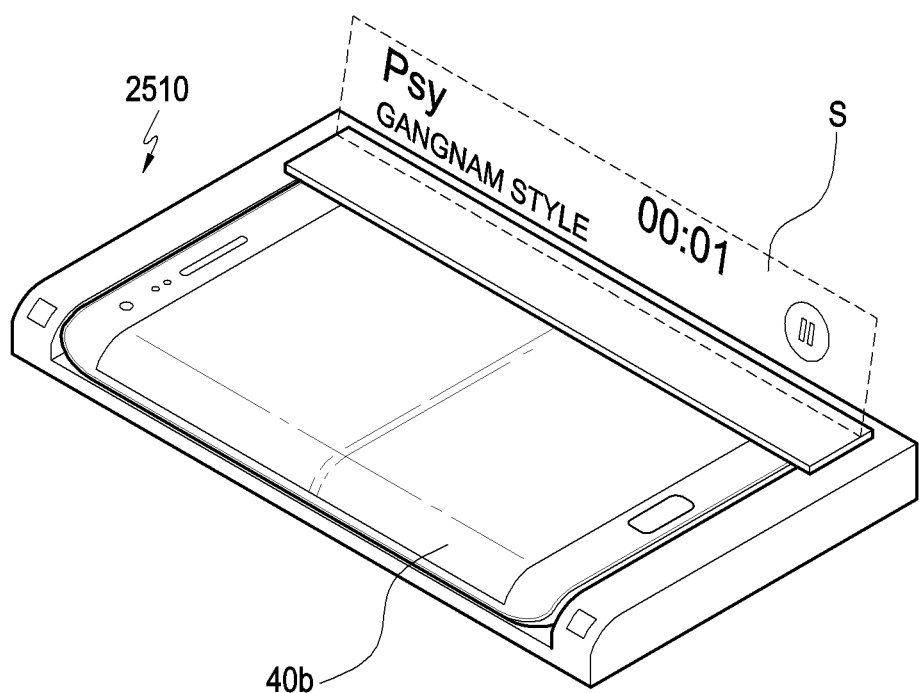

FIGS. 25A and 25B are views for explaining functions or operations for transmitting a specific object to a plurality of electronic devices, according to various embodiments of the present disclosure, or functions or operations for executing the specific object through the electronic devices in a case where there are a plurality of electronic devices, according to various embodiments of the present disclosure.

Referring to FIG. 25A, an external electronic device 2500, according to various embodiments of the present disclosure, may receive a transmission/execution request for a specific object (e.g., a music file 2502), which is input from a user 2520 (e.g., a drag gesture in a direction corresponding to the direction in which the stereoscopic image devices 2510a and 2510b are located). Electronic devices 40a and 40b, each of which is mounted (or inserted) in one of the stereoscopic image devices 2510a and 2510b, may include respective sensor modules (e.g., GPS modules) that generate position information thereof. The electronic devices 40a and 40b may transmit location information generated by the sensor modules to the external electronic device 2500 and/or a data server (not illustrated). The external electronic device 2500 may perform a control based on the position information of the electronic devices 40a and 40b in such a way that a specific object is transmitted to one of the electronic devices (e.g., the electronic device 40b) corresponding to the direction of the drag gesture of the user. For example, the external electronic device 2500 may directly transmit data for the specific object to any one electronic device, or when the data for the specific object is stored in the data server, the external electronic device 2500 may request that the data server send the data for the specific object to one of the electronic devices. Any one of the electronic devices, which receives the data for the specific object, is capable of executing the specific object. For example, when the specific object is a music file 2502, any one of the electronic devices 2502 may play back the music file 2502, as illustrated in FIG. 25B. The electronic devices 40a and 40b may be connected to the external electronic device 2500 and/or the data server through wired communication or wireless communication.

Figure 26A:
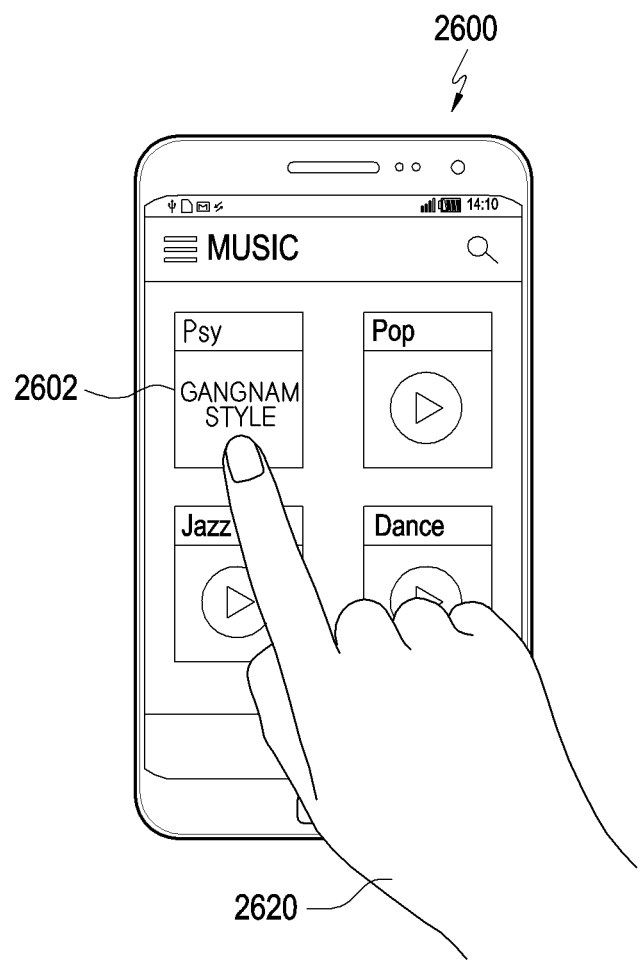
FIGS. 26A to 26C are views for explaining operations or functions of transmitting/executing a specific object based on positional information displayed on an external electronic device according to various embodiments of the present disclosure.
Figure 26B:
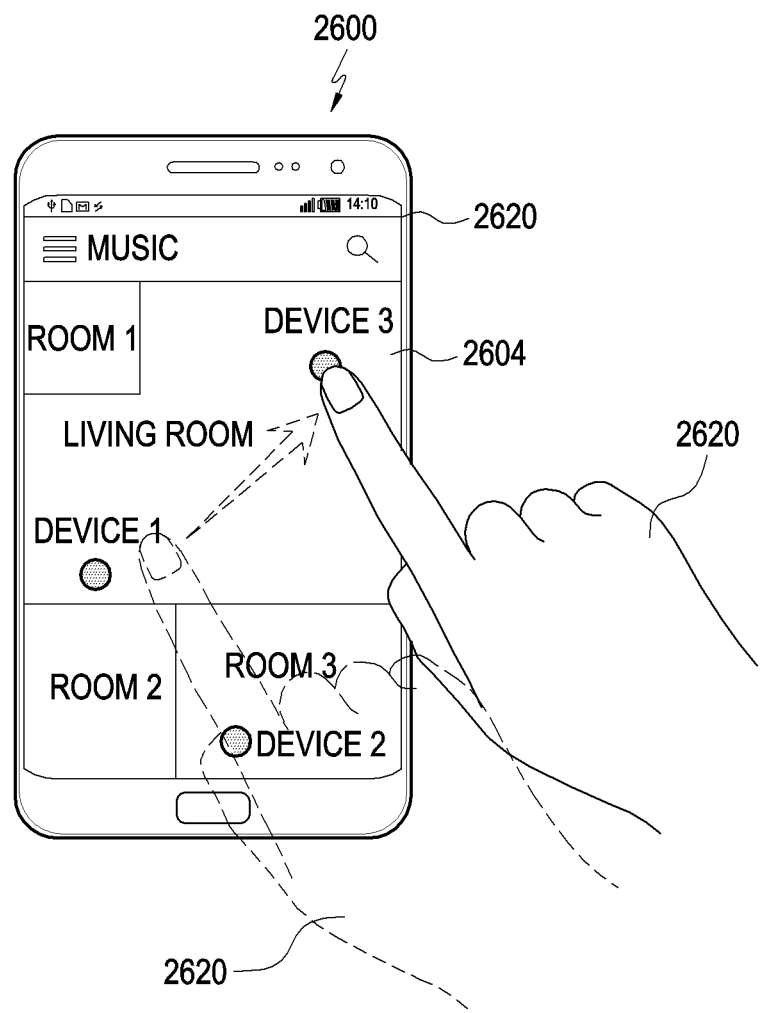
Figure 26C:
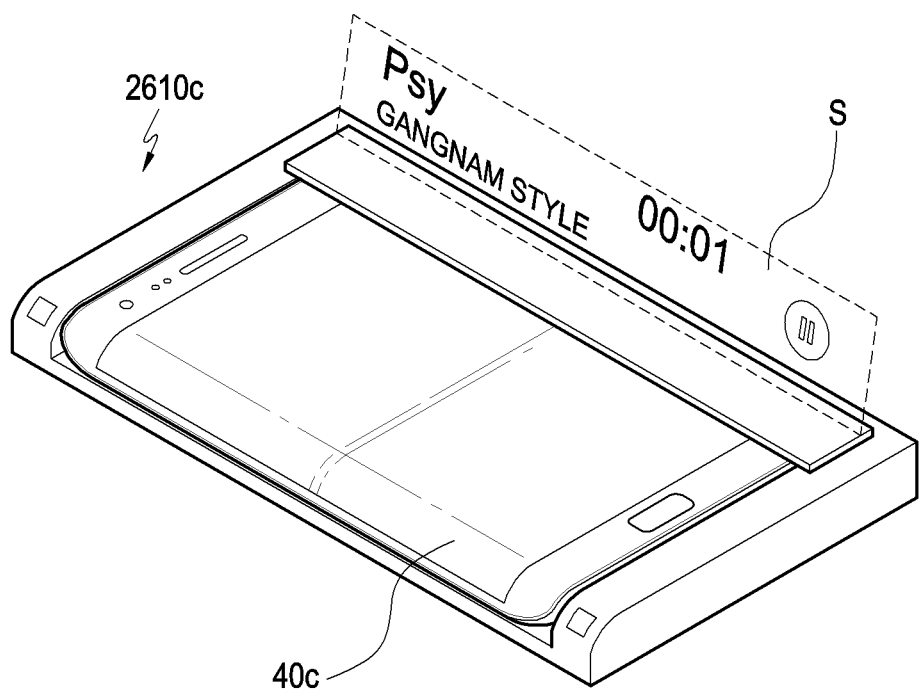

FIGS. 26A to 26C are views for explaining operations or functions of transmitting/executing a specific object based on positional information displayed on an external electronic device, according to various embodiments of the present disclosure.

With regards to FIGS. 26A to 26C, the description made above in reference to FIGS. 25A and 25B can be applied substantially equally. However, FIGS. 26A to 26C illustrate an embodiment in which the specific object can be transmitted/executed based on a position map 2604, on which position information related to an electronic device or a stereoscopic image device (e.g., "Device 1", "Device 2", and "Device 3") is indicated, for example, as illustrated in FIG. 26B. As illustrated in FIG. 26A, the external electronic device 2600 may receive a transmission request for the specific object (e.g., a music file 2602) input from a user 2620. The transmission request may include, for example, a touch/proximity touch input (e.g., hovering) of the user 2620. When receiving the transmission request, the external electronic device 2600 may display the position map 2604 for transmitting the music file 2602. The external electronic device 2600 may receive a transmission request, which is input from the user 2620, in the direction in which the electronic device/the stereoscopic image device for transmitting/executing the music file 2602 is located (e.g., a drag gesture). The external electronic device 2600 or a data server (not illustrated) may transmit data for the music file 2602 to the electronic device/the stereoscopic image device (e.g., "Device 3") corresponding to the input of the user 2620. Any one of the electronic devices 40c receiving the data for the music file 2602 may store or execute the music file 2602 through the stereoscopic image device 2610c, which is mounted with the electronic device 40c. FIG. 6C illustrates the case where the transferred music file 2602 is executed, as an example.

FIGS. 27A to 27D are views for explaining operations or functions for transmitting/executing a specific object among stereoscopic image devices, according to various embodiments of the present disclosure.

The stereoscopic image devices 2700a, 2700b, according to various embodiments of the present disclosure, may include a camera module (not illustrated) for sensing the movement of a user 2720. The image information obtained by the camera module may be transmitted to the electronic devices 40a and 40b mounted on the stereoscopic image devices 2700a and 2700b. The electronic devices 40a and 40b mounted on the stereoscopic image devices 2700a and 2700b may convert the motion of the user 2720 into three-dimensional coordinates based on the image information obtained by the camera module. The camera module may include a depth camera and/or multiple cameras configured to acquire depth information necessary for accurately detecting the movement of a finger or the like. However, according to various embodiments of the present disclosure, the depth camera and/or the multiple cameras are illustratively referred to for the description of the present disclosure. The depth information required for detecting the motion of the finger or the like may be obtained by various types of camera modules other than the depth camera and/or the multiple cameras. According to various embodiments of the present disclosure, the camera modules may be provided in the electronic devices 40a and 40b mounted on the stereoscopic image devices 2700a and 2700b. In this case, the image information may be acquired by the camera module provided in the electronic devices 40a and 40b. In some embodiments, the camera modules may be provided in the stereoscopic image devices 2700a and 2700b and the electronic devices 40a and 40b, respectively. In this case, the image information (e.g., depth information) may be acquired by a combination of the camera modules respectively provided in the stereoscopic image devices 2700a and 2700b and the electronic devices 40a and 40b.

Figure 27A:
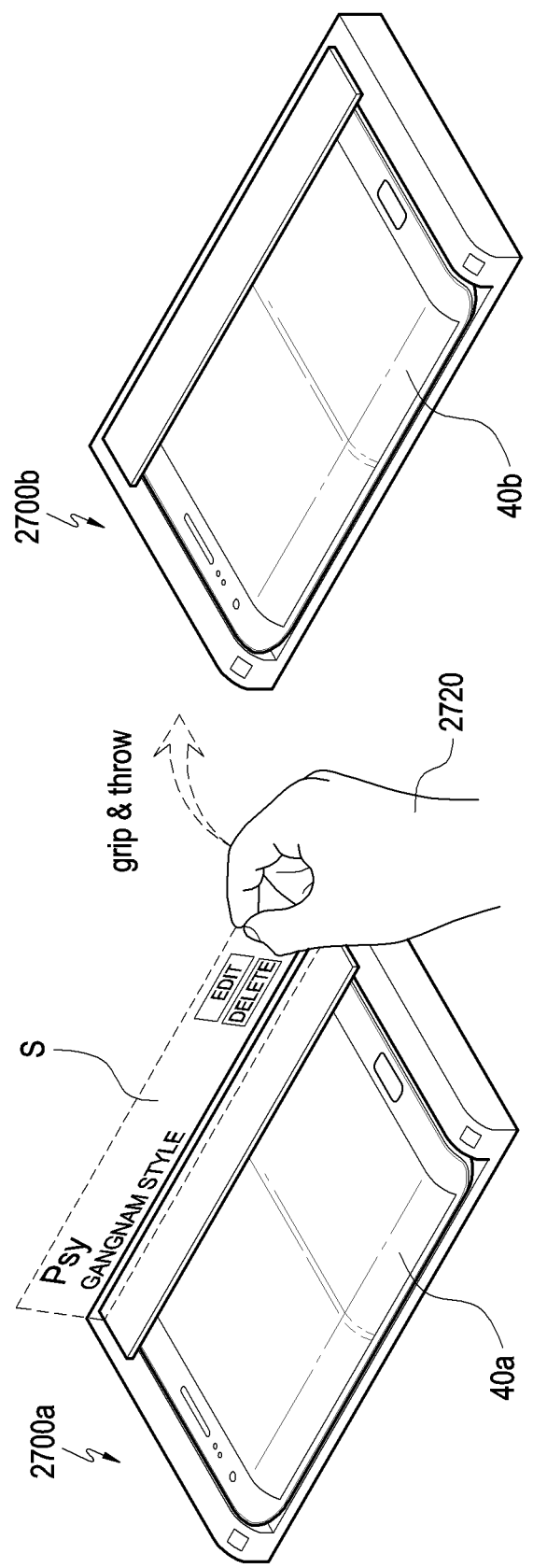
FIGS. 27A to 27D are views for explaining operations or functions for transmitting/executing a specific object among stereoscopic image devices according to various embodiments of the present disclosure.

Referring to FIG. 27A, a first electronic device 40a may transmit a specific object to a second electronic device 40b or may receive the input of the user 2720 to be executed through the second electronic device 40b. The input of the user 2720 may include a three-dimensional grip (in other words, holding) and throw of the user 2720 with respect to the image-forming plane S or an aerial image formed on the image-forming plane S, as illustrated in FIG. 27A. According to various embodiments of the present disclosure, the input of the user 2720 may further include various gestures such as a three-dimensional touch with respect to the image-forming plane S or the aerial image, a three-dimensional tap, a three-dimensional drag, etc. For example, referring to FIGS. 27C and 27D, a three-dimensional grip and a drag of the user 2720 with respect to the aerial image formed on the image-forming plane S or the image-forming plane S (in other words, holding) may be further included. According to the grip and drag actions of the user 2720 with respect to the image-forming plane S and/or the aerial image formed on the image-forming plane S, the image-forming plane S may move in the drag direction of the user 2720 (e.g., from the position illustrated in FIG. 27C to the position illustrated in FIG. 27D).

Figure 27B:
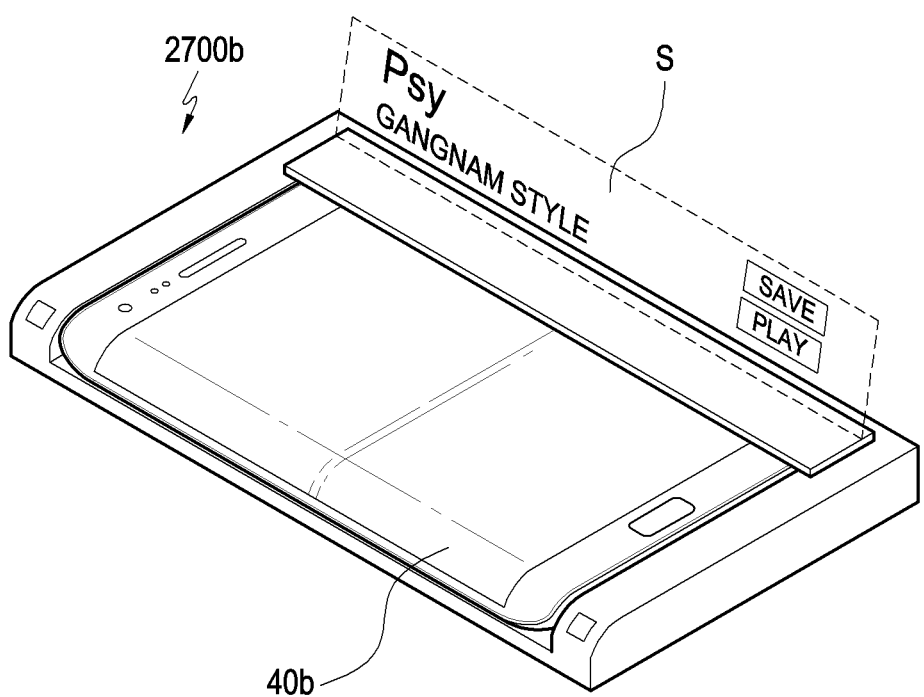
Figure 27C:
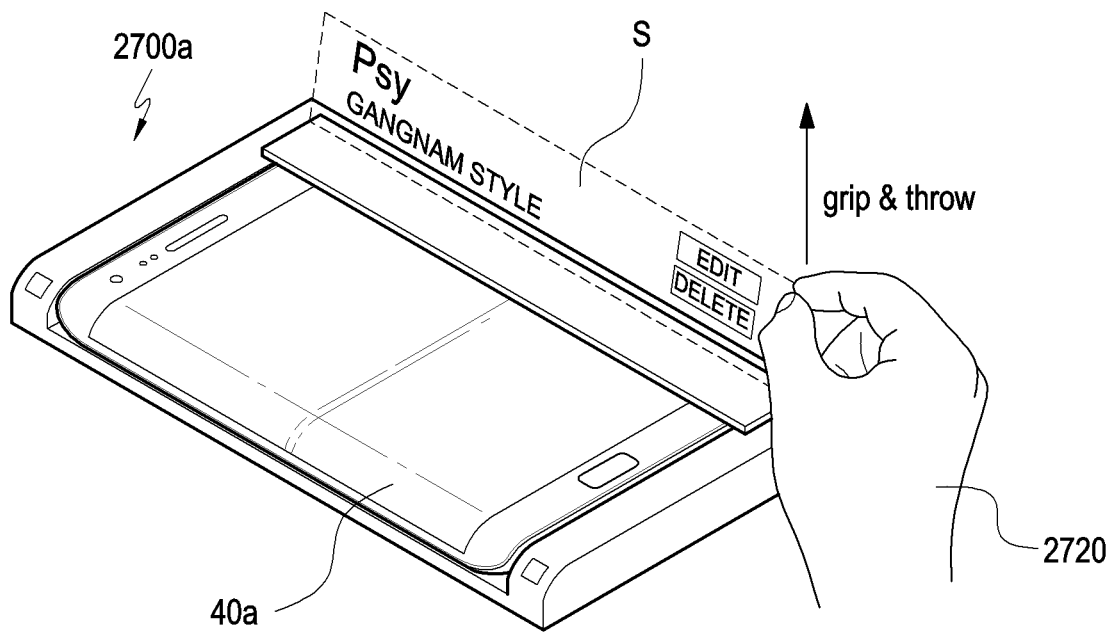
Figure 27D:
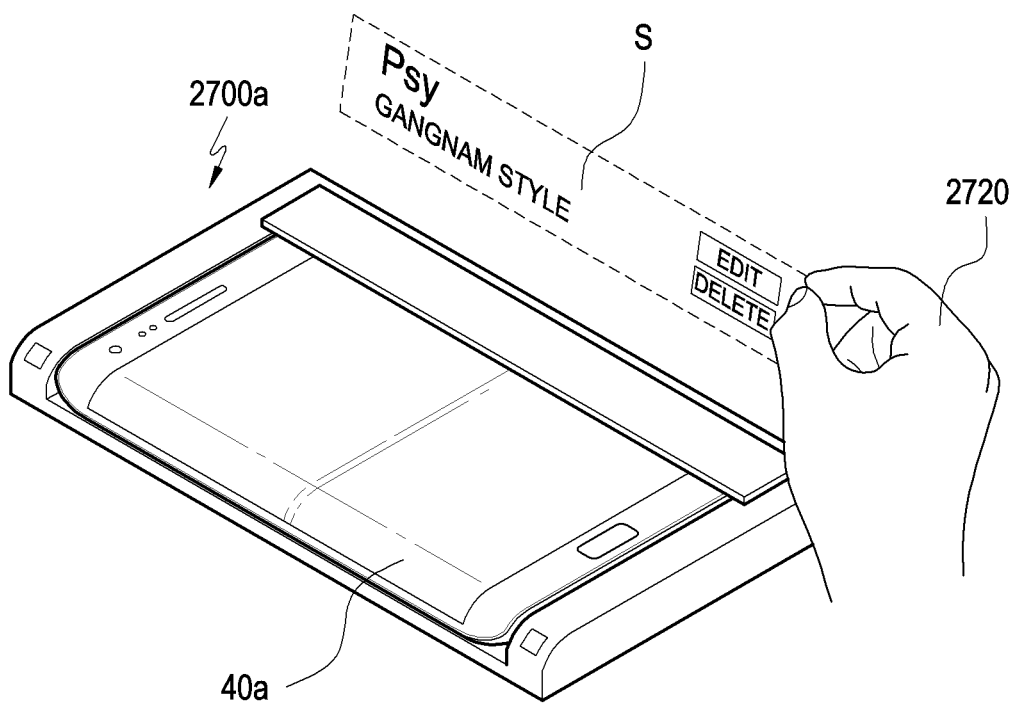

The first electronic device 40a may determine (in other words, calculate) the three-dimensional position coordinates of the user 2720 based on the image information of the motion of the user 2720. According to various embodiments of the present disclosure, the three-dimensional coordinates of the image-forming plane S and the three-dimensional coordinates of the aerial image formed on the image-forming plane S may be information which is known to the first electronic device 40a. Accordingly, based on the three-dimensional position coordinates of the user 2720, determined as described above, and the three-dimensional coordinate information of the image-forming plane S and/or the three-dimensional coordinate information of the aerial image formed on the image-forming plane S, the first electronic device 40a is capable of determining whether input of the user 2720, with respect to the aerial image, is received. For example, when a body part (e.g., a finger) of the user 2720 is located in at least a partial region of the image-forming plane S for a predetermined period of time or longer, the first electronic device 40a may determine that a three-dimensional touch or a three-dimensional grip is performed with respect to the aerial image. In the state in which the aerial image is gripped or touched by the user 2720, a motion of the body part of the user 2720 in a specific direction (in other words, a throwing gesture) may be sensed. The motion may be determined by the first electronic device 40a based on the image information of the user 2720, which is acquired by the camera modules. According to various embodiments of the present disclosure, the motion may be determined based on the image information acquired by the camera modules and data related to the motion of the user 2720, which is generated by a sensor module (e.g., an infrared sensor module, a proximity sensor module, or the like) provided in the first electronic device 40a or the first stereoscopic image device 2700a. When the sensor module is provided in the first stereoscopic image device 2700a, the generated motion data may be transmitted to the first electronic device 40a. When the motion is sensed, the first electronic device 40a may transmit data for a specific object corresponding to the aerial image to the second electronic device 40b. Alternatively, the first electronic device 40a may transmit a request message, which requests transmission of data related to the specific object to the second electronic device 40b, to the data server in which data related to the specific object is stored. As illustrated in FIG. 27B, the second electronic device 40b may perform a control such that an aerial image including a control menu related to the specific object is formed on the image-forming plane S through the second stereoscopic image device 2700b.

According to various embodiments of the present disclosure, a three-dimensional gesture such as a three-dimensional touch with respect to the image-forming plane S or the aerial image may also be performed through a proximity touch input (e.g., hovering). The proximity touch input may be sensed by the first electronic device 40a or the first stereoscopic image device 2700a.

Figure 28A:
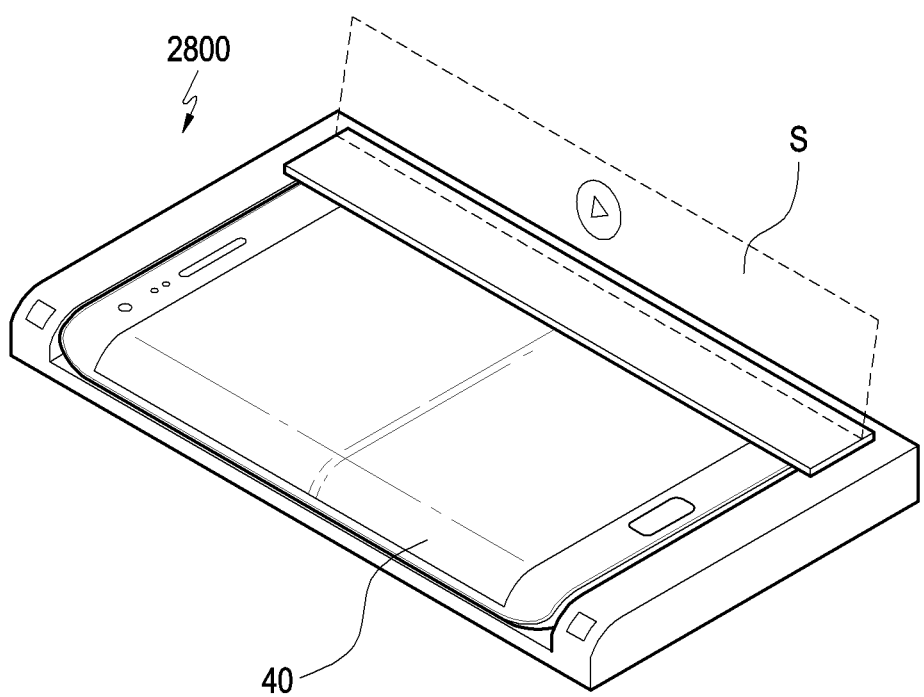
FIGS. 28A to 28C are views for exemplifying operations or functions of magnifying/reducing an aerial image according to various embodiments of the present disclosure through a three-dimensional pinch gesture.
Figure 28B:
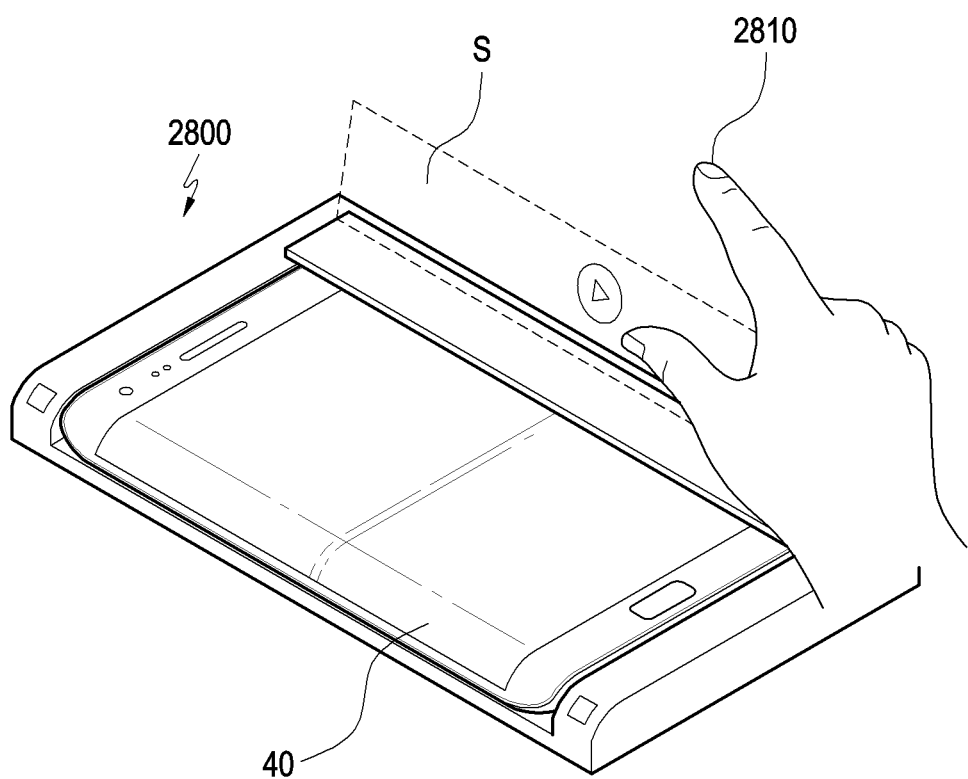
Figure 28C:
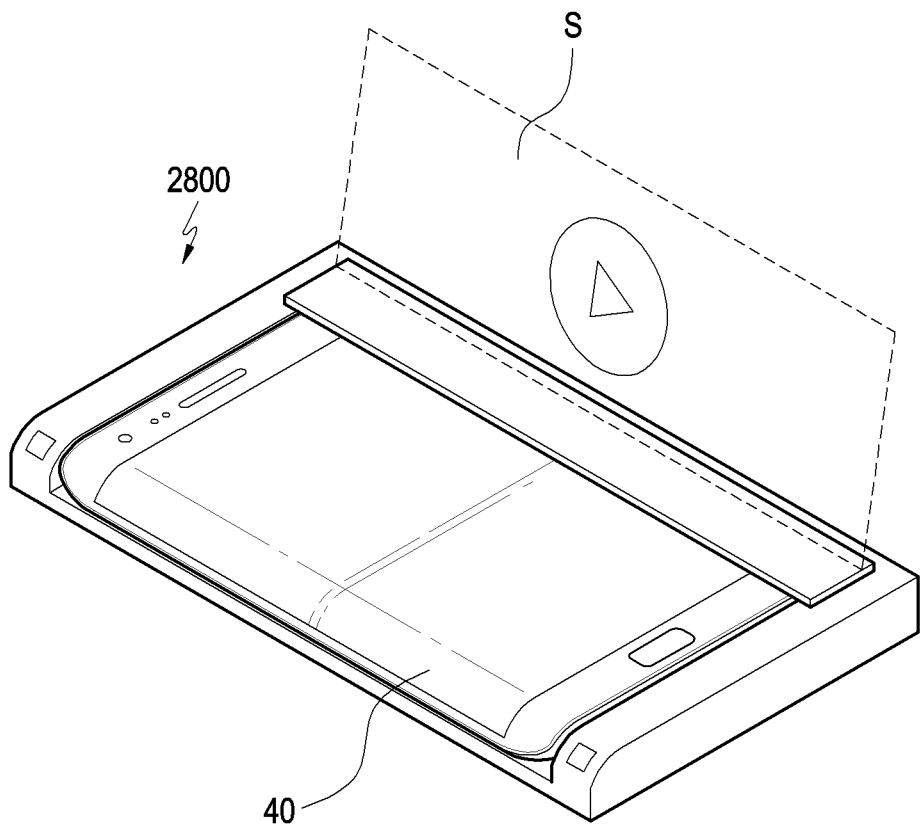

FIGS. 28A to 28C are views for exemplifying operations or functions of magnifying/reducing an aerial image according to various embodiments of the present disclosure through a three-dimensional pinch gesture.

Referring to FIG. 28A, a stereoscopic image device 2800 according to various embodiments of the present disclosure is capable of forming an aerial image on an image-forming plane S. An electronic device 40 mounted on the stereoscopic image device 2800 is capable of determining whether a three-dimensional pinch gesture of a user 2810 is input, as illustrated in FIG. 28B. The operation or function of determining whether the pinch gesture is input may be performed based on the motion of the user 2810, which is sensed by at least some of the camera modules and the sensor modules, as described above with reference to FIGS. 27A and 27B. When the 3D pinch gesture of the user 2810 is input (in other words, sensed), the electronic device 40 may perform a control such that a specific object (e.g., an icon), of which the image is formed on the image-forming plane S, is displayed in a magnified form, as illustrated in FIG. 28C. Conversely, though not illustrated, the specific object may be reduced and displayed through the 3D pinch gesture.

Figure 29A:
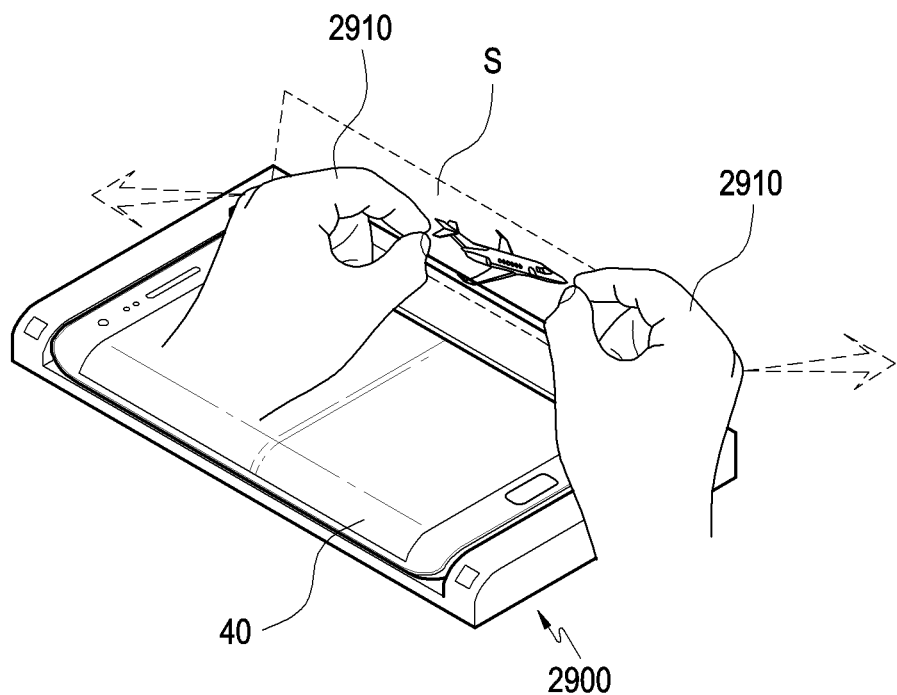
FIGS. 29A and 29B are views for explaining operations or functions of magnifying/reducing an aerial image according to various embodiments of the present disclosure through a three-dimensional stretch gesture.
Figure 29B:
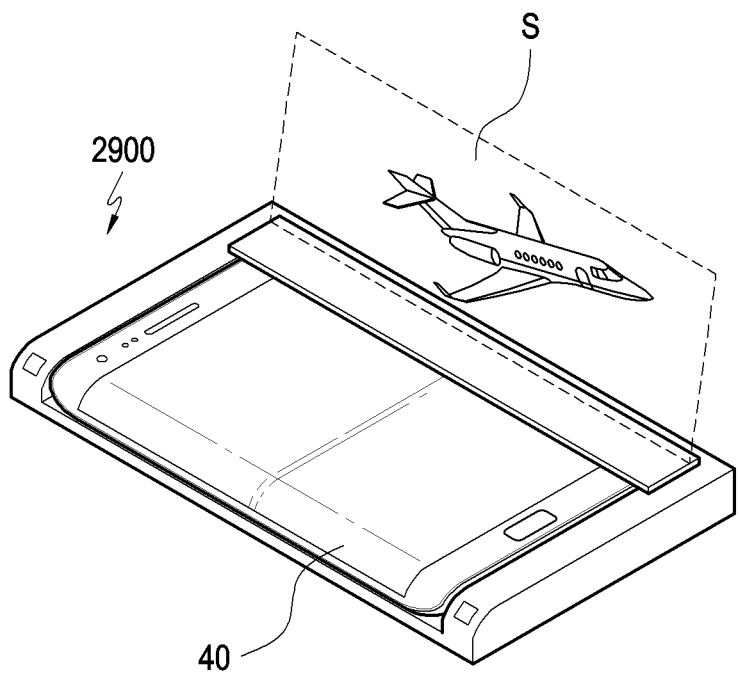

FIGS. 29A and 29B are views for explaining operations or functions of magnifying/reducing an aerial image according to various embodiments of the present disclosure through a three-dimensional stretch gesture.

Referring to FIG. 29A, an aerial image may be formed in an image-forming plane S. The electronic device 40 may sense a three-dimensional stretch gesture from a user 2910. Data for sensing the three-dimensional stretch gesture (e.g., image information by a camera module, proximity information of the user through a proximity sensor, and the like) may be acquired through the electronic device 40 and/or the stereoscopic image device 2900. When the three-dimensional stretch gesture is sensed, the electronic device 40 may perform a control such that the image of a specific object, which is formed on the image-forming plane S, is formed in a magnified size in response to the motion of the user 2910, as illustrated in FIG. 29B.

Figure 30A:
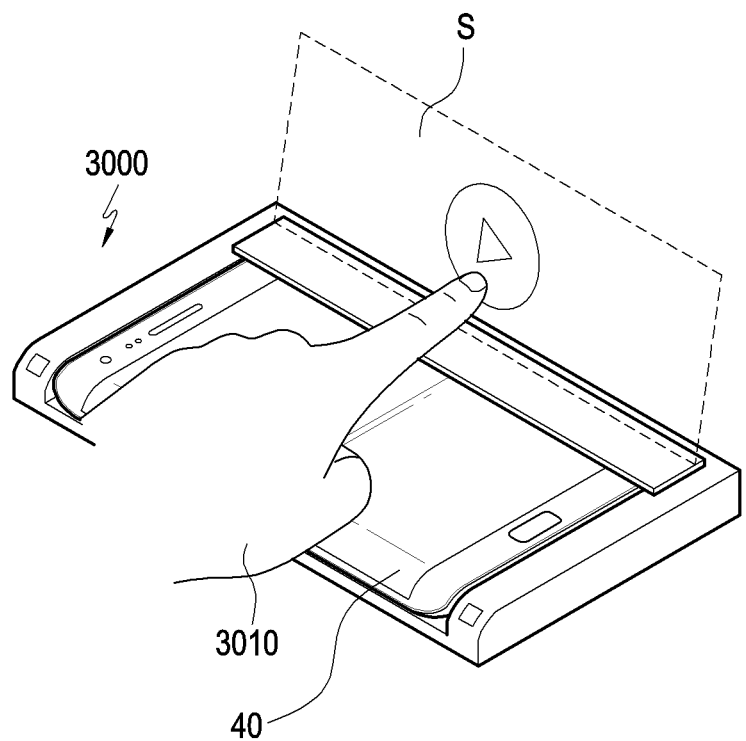
FIGS. 30A and 30B are views for explaining operations or functions of controlling the shape of a specific object displayed on an image-forming plane according to a user's three-dimensional touch input.
Figure 30B:
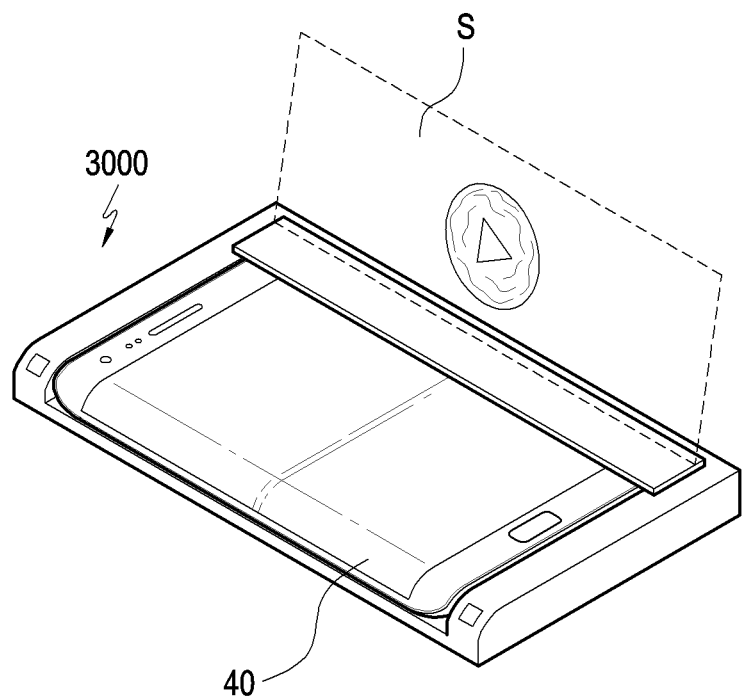

FIGS. 30A and 30B are views for explaining operations or functions of controlling the shape of a specific object displayed on an image-forming plane according to a user's three-dimensional touch input.

Referring to FIG. 30A, a specific object may be displayed on an image-forming plane S. An electronic device 40 mounted on a stereoscopic image device 3000, according to various embodiments of the present disclosure, may sense a three-dimensional touch input of a user 3010. When the three-dimensional touch input of the user 3010 is sensed, the electronic device 40 may change the shape of the specific object so as to display the specific object with the changed shape. As illustrated in FIG. 30B, for example, the change of the shape may be performed such that the shape of the specific object is changed into a moving wavy shape according to the touch input of the user 3010, thereby displaying the specific object with the changed shape.

FIGS. 31A to 31D are views for explaining functions or operations of transmitting/executing a specific object through an aerial image displayed on an image-forming plane.

Figure 31A:
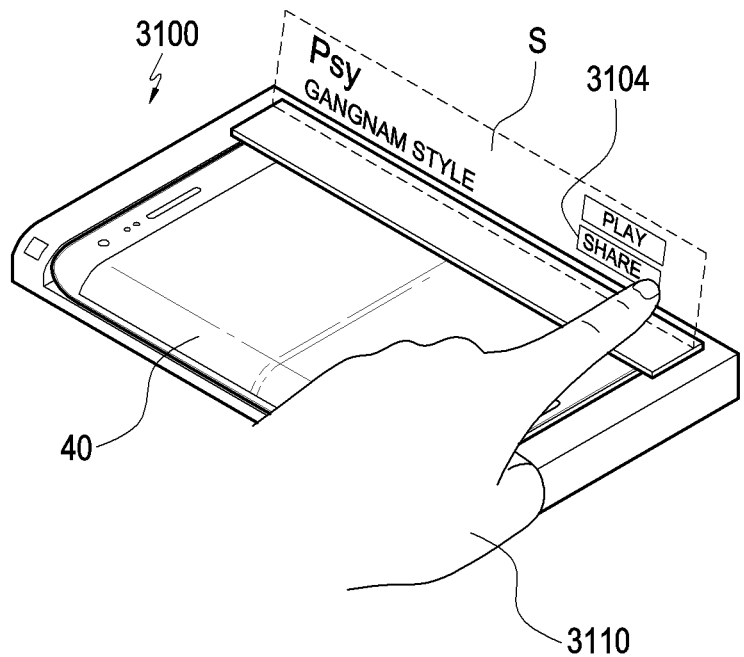
FIGS. 31A to 31D are views for explaining functions or operations of transmitting/executing a specific object through an aerial image displayed on an image-forming plane.
Figure 31B:
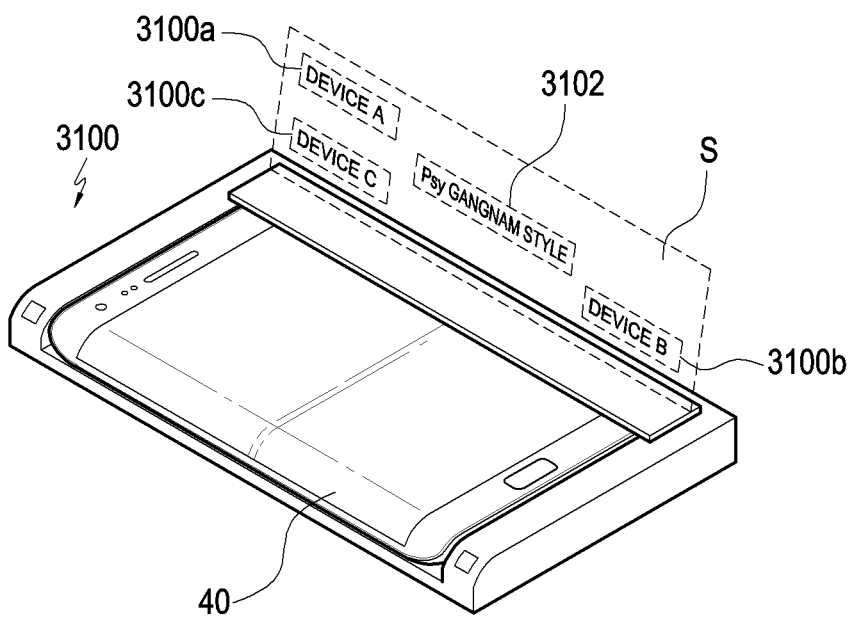
Figure 31C:
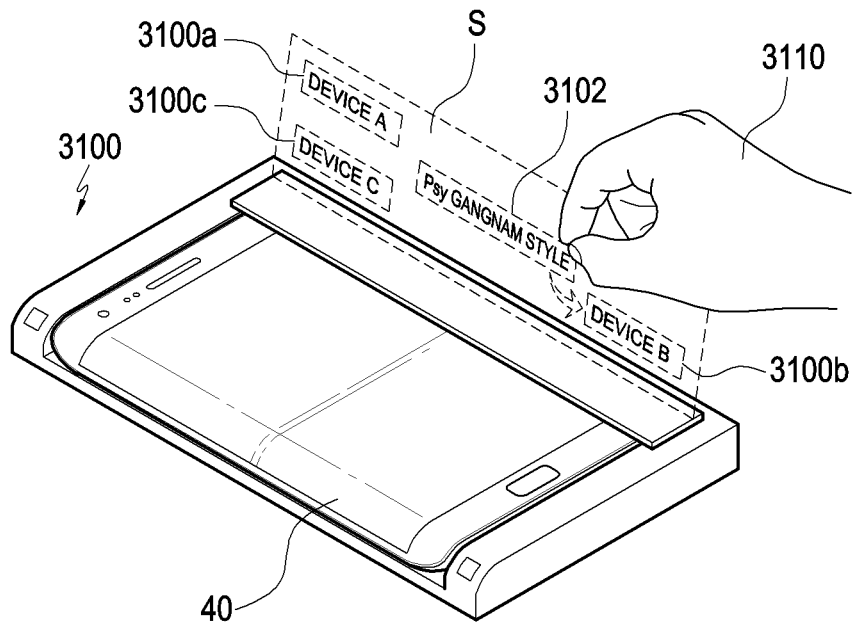
Figure 31D:
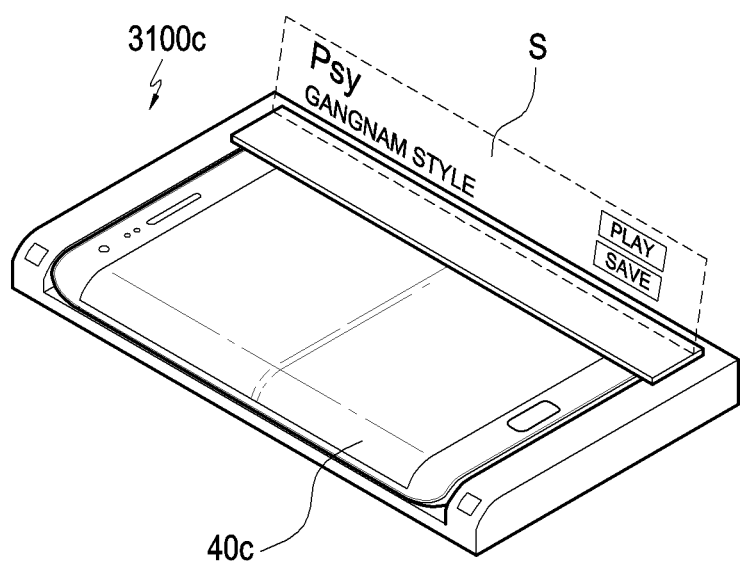

Referring to FIG. 31A, an image-forming plane S may be formed by a stereoscopic image device 3100, which is mounted with an electronic device 40 according to various embodiments of the present disclosure. An image of a menu item (e.g., a "playback" menu item, or a "share" menu item 3104) for controlling a specific object (e.g., a music file) may be formed on the image-forming plane S. When receiving a three-dimensional input with respect to any one of the menu items displayed on the image-forming plane S (e.g., "the share" menu item 3104 for transmitting a music file), the electronic device 40 may perform control such that aerial images for various devices (e.g., Device A 3100a, Device B 3100b, and Device C 3100c) connected to the electronic device 40 are displayed, as illustrated in FIG. 31B. The aerial images 3100a, 3100b, and 3100c displayed on the image-forming plane S may be formed at positions corresponding to the actual positions of respective devices based on the position of the electronic device 40. The position information for the devices may be provided from, for example, a server connected to the electronic device 40 and/or the stereoscopic image device 3100. As illustrated in FIG. 31C, when receiving a transmission request for the music file (e.g., a three-dimensional grip and throwing gesture for an aerial image 3102 corresponding to the music file) input from the user 3110, the electronic device 40 may transmit a request message for transmitting data for the music file to the server in order to transmit data for the music file to a device corresponding to the transmission request (e.g., Device C). When the server receives the request message, the server may transmit data for the music file to the device corresponding to the transmission request. When the music file is transmitted, the device that has received the data for the music file (e.g., the stereoscopic image device 3100c connected to the electronic device 40c) may perform a control such that images of menu items corresponding to the reception of the data (e.g., the "play" menu item and the "save" menu item) are formed on the image-forming plane S, as illustrated in FIG. 31D. The function or the operation of performing a control to form the menu items corresponding to the reception of data may be performed by, for example, a processor provided in the electronic device 40c or the stereoscopic image device 3100c.

At least some of a function/functions or an operation/operations performed by the electronic devices (e.g., electronic devices 40, 40a, 40b and 40c) described with reference to FIGS. 24A to 31D may be executed by various modules (e.g., a processor, a camera module, or the like) provided in the stereoscopic image devices (e.g., the stereoscopic image devices 2400, 2500, 2600, 2700, 2800, 2900, 3000, and 3100). Alternatively, at least some of a function/functions or an operation/operations performed by the stereoscopic image device, described with reference to FIGS. 24A to 31D, may be performed by various modules (e.g., a processor, a camera module, etc.) provided in the electronic device 40. To this end, the electronic device 40 and the stereoscopic image device may further include an additional module/modules, or some modules/modules may be omitted. At least one of the electronic device 40 and the stereoscopic image device may include a processor for performing various functions or operations according to various embodiments of the present disclosure.

Figure 32:
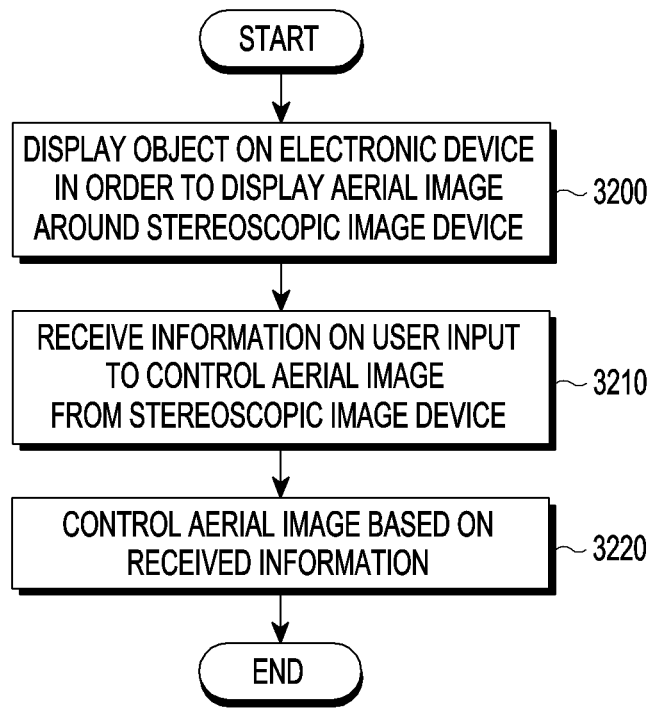
FIG. 32 is a flowchart for explaining a method of controlling a stereoscopic image device in accordance with a three-dimensional control command acquired from a user.

FIG. 32 is a flowchart for explaining a method of controlling a stereoscopic image device in accordance with a three-dimensional control command acquired from a user.

A method of controlling a stereoscopic image device according to various embodiments of the present disclosure may include an operation of displaying an object on an electronic device in order to display an aerial image around the stereoscopic image device (operation 3200).

The method of controlling a stereoscopic image device, according to various embodiments of the present disclosure, may include receiving information related to user input for controlling the aerial image from the stereoscopic image device (operation 3210).

The method of controlling a stereoscopic image device, according to various embodiments of the present disclosure, may include controlling the aerial image based on the received information (operation 3220).

Figure 33:
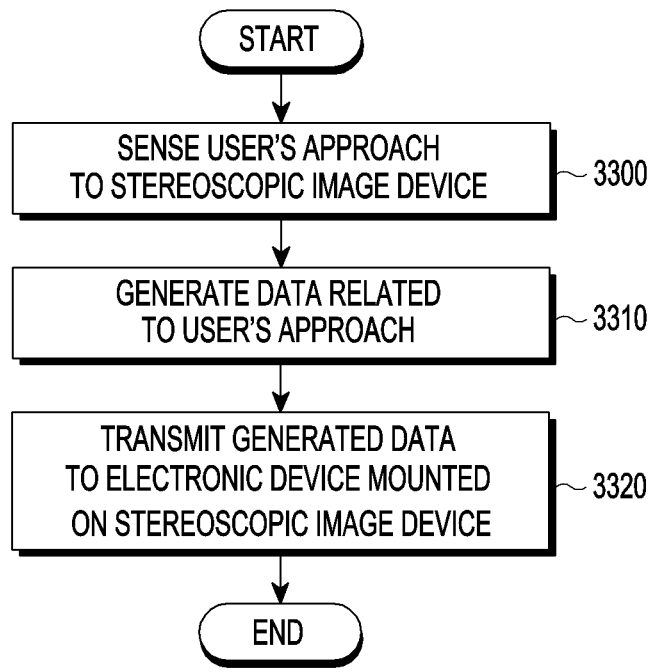
FIGS. 33 and 34 are flowcharts for explaining a method of controlling a stereoscopic image device and an electronic device according to a user's approach to a stereoscopic image device.
Figure 34:
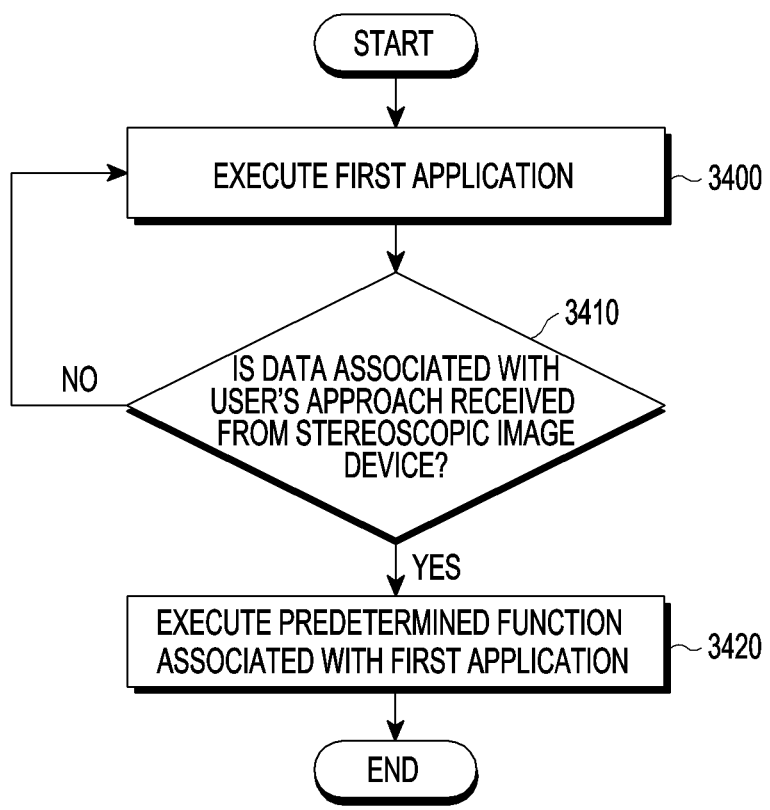

FIGS. 33 and 34 are flowcharts for explaining a method of controlling a stereoscopic image device and an electronic device according to a user's approach to a stereoscopic image device.

Referring to FIG. 33, a method for controlling a stereoscopic image device, according to various embodiments of the present disclosure, may include an operation of sensing a user's approach to the stereoscopic image device (operation 3300)

A method of controlling a stereoscopic image device, according to various embodiments of the present disclosure, may include an operation of generating data associated with the user's approach when the user's approach is detected (operation 3310).

The method of controlling a stereoscopic image device, according to various embodiments of the present disclosure, may include an operation of transmitting the generated data to an electronic device mounted on the stereoscopic image device (operation 3320).

Referring to FIG. 34, the method of controlling an electronic device 40, according to various embodiments of the present disclosure, may include an operation of executing a first application (operation 3400).

A method of controlling an electronic device 40, according to various embodiments of the present disclosure, may include an operation of determining whether data associated with the user's approach is received from the stereoscopic image device (operation 3410).

The method of controlling an electronic device 40, according to various embodiments of the present disclosure, may include an operation of performing a predetermined function associated with the first application when receiving data associated with a user's approach from the stereoscopic image device (operation 3420). According to various embodiments, the predetermined function may be edited or added by the user.

Additionally, the descriptions of the various electronic devices 40 or various stereoscopic image devices described in this disclosure can be equally applied to FIGS. 32 to 34.

While the present disclosure has been shown and described with reference to certain embodiments thereof, it will be understood by those skilled in the art that various changes in form and details may be made therein without departing from the spirit and scope of the present disclosure as defined by the appended claims.

The invention claimed is:

1. A stereoscopic image device comprising:
   a cradle configured to mount thereon an electronic device including a display panel;
   a half mirror disposed on one surface of the cradle to face the display panel of the electronic device mounted on the cradle and inclined with respect to the display panel at one side of the half mirror; and
   a retroreflective member disposed on the cradle to be inclined with respect to the half mirror at the one side of the half mirror,
   wherein the half mirror reflects a first output image output from the display panel to be incident on the retroreflective member and transmits a first reflected image reflected by the retroreflective member so as to form a first aerial image corresponding to the first output image in a first space at a side opposite the one side of the half mirror,
   wherein the electronic device further includes a touch panel incorporated in the display panel, and the stereoscopic image device is configured to form the first aerial image in a region where the touch panel detects a proximity touch input.

2. The stereoscopic image device of claim 1, wherein the electronic device further includes a touch panel incorporated in the display panel and the stereoscopic image device exposes a partial region of the display panel at the one side of the half mirror.

3. The stereoscopic image device of claim 2, wherein the display panel includes a curved region forming at least a portion of a side surface thereof, and
   in a state in which the electronic device is mounted on the cradle, the stereoscopic image device exposes at least the curved region to an outside of the cradle.

4. The stereoscopic image device of claim 3, wherein the stereoscopic image device forms the first aerial image to be adjacent to the curved region.

5. The stereoscopic image device of claim 2, wherein the display panel includes a curved region forming at least a portion of a side surface thereof, and
   in a state in which the electronic device is mounted on the cradle, the stereoscopic image device forms the first aerial image based on an image output through at least the curved region and exposes another region of the display panel to an outside of the cradle.

6. The stereoscopic image device of claim 1, further comprising:
   a display device disposed on the cradle to be inclined with respect to the half mirror wherein one side thereof is disposed adjacent to the half mirror and an other side is disposed adjacent to the retroreflective member,
   wherein the half mirror reflects a second output image output from the display device to be incident on the retroreflective member and transmits a second reflected image reflected by the retroreflective member so as to form a second aerial image corresponding to the second output image in a second space at the side opposite the one side of the half mirror.

7. The stereoscopic image device of claim 6, wherein the display device is disposed to overlap the display panel of the electronic device mounted on the cradle and transmits at least a part of the first output image.

8. The stereoscopic image device of claim 6, wherein the first aerial image and the second aerial image are formed to overlap each other.

9. A stereoscopic image device comprising:
   a cradle configured to mount thereon an electronic device including a display panel;

a half mirror disposed on one surface of the cradle to face the display panel of the electronic device mounted on the cradle and inclined with respect to the display panel at one side of the half mirror; and a retroreflective member disposed on the cradle to be inclined with respect to the half mirror at the one side of the half mirror, wherein the half mirror reflects a first output image output from the display panel to be incident on the retroreflective member and transmits a first reflected image reflected by the retroreflective member so as to form a first aerial image corresponding to the first output image in a first space at a side opposite the one side of the half mirror, and wherein the cradle is a cover member detachably provided to the electronic device on a surface opposite the display panel, one end of the half mirror is rotatably coupled to one side of the cover member, and one end of the retroreflective member is rotatably coupled to another end opposite to the one end of the half mirror.

10. The stereoscopic image device of claim 9, wherein, in a state in which the cover member is coupled to the electronic device, the half mirror is folded to face the display panel with the retroreflective member interposed therebetween, or the half mirror is disposed to be inclined with respect to the display panel such that the one end of the retroreflective member supports the other end opposite to the one end of the half mirror and another end opposite to the one end of the retroreflective member is supported on another side opposite to the one side of the cover member.

11. A stereoscopic image device comprising:
a cradle configured to mount thereon an electronic device including a display panel;
a half mirror disposed on one surface of the cradle to face the display panel of the electronic device mounted on the cradle and inclined with respect to the display panel at one side of the half mirror; and
a retroreflective member disposed on the cradle to be inclined with respect to the half mirror at the one side of the half mirror,
wherein the half mirror reflects a first output image output from the display panel to be incident on the retroreflective member and transmits a first reflected image reflected by the retroreflective member so as to form a first aerial image corresponding to the first output image in a first space at a side opposite the one side of the half mirror,
wherein the stereoscopic image device further comprises a first sensor configured to detect a user position with respect to the first aerial image, and
wherein the stereoscopic image device provides information on the user position detected through the first sensor to the electronic device mounted on the cradle.

12. The stereoscopic image device of claim 11, wherein the first sensor includes at least one of a camera module, an infrared sensor, a proximity sensor, and an illuminance sensor.

13. A stereoscopic image device comprising:
a cradle configured to mount thereon an electronic device including a display panel;
a half mirror disposed on one surface of the cradle to face the display panel of the electronic device mounted on the cradle and inclined with respect to the display panel at one side of the half mirror; and
a retroreflective member disposed on the cradle to be inclined with respect to the half mirror at the one side of the half mirror,
wherein the half mirror reflects a first output image output from the display panel to be incident on the retroreflective member and transmits a first reflected image reflected by the retroreflective member so as to form a first aerial image corresponding to the first output image in a first space at a side opposite the one side of the half mirror, and
wherein the cradle is configured to provide a wireless power transmission function.

14. An electronic device comprising:
a housing including a front surface, a rear surface opposite the front surface, and a side wall formed so as to at least partially enclose a space between the front surface and the rear surface;
a display panel positioned inside the housing and including a first display area disposed in a first area of the front surface and a second display area extending to be inclined from the first display area;
a half mirror disposed in a second area of the front surface and adjacent to the second display area; and
a retroreflective member disposed inside the housing, the retroreflective member being inclined with respect to the half mirror,
wherein the half mirror reflects an output image output from the second display area to be incident on the retroreflective member and transmits a reflected image reflected by the retroreflective member so as to form an aerial image corresponding to the output image in a space outside the housing.

15. The electronic device of claim 14, further comprising:
a touch panel incorporated in the display panel in at least the first display area.

16. The electronic device of claim 14, further comprising:
a first sensor disposed on the front surface of the housing,
wherein the first sensor detects an approach, a touch, or a movement of an object with respect to a plane or the space where the aerial image is formed.

17. The electronic device of claim 16, wherein the first sensor includes at least one of a camera module, an infrared sensor, a proximity sensor, and an illuminance sensor.

18. A stereoscopic image device comprising:
a display panel mounted on or in a dashboard of a vehicle; and
a windshield, at least a partial region of which is disposed to be inclined with respect to the dashboard,
wherein the windshield reflects an image output from the display panel so as to form an aerial image above the dashboard,
wherein at least a region of the windshield is formed as a half mirror, and
wherein the region formed as the half mirror reflects the image output from the display panel.

* * * * *